United States Patent
Araumi

(10) Patent No.: US 7,580,143 B2
(45) Date of Patent: Aug. 25, 2009

(54) IMAGE FORMING APPARATUS, IMAGE FORMING METHOD, AND INFORMATION PROCESSING APPARATUS FOR CONDUCTING PRINT INSTRUCTION THERETO

(75) Inventor: Yuichi Araumi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1104 days.

(21) Appl. No.: 10/802,845

(22) Filed: Mar. 18, 2004

(65) Prior Publication Data

US 2004/0239956 A1  Dec. 2, 2004

(30) Foreign Application Priority Data

| Mar. 19, 2003 | (JP) | ............................ 2003-076609 |
| Mar. 15, 2004 | (JP) | ............................ 2004-071990 |
| Mar. 15, 2004 | (JP) | ............................ 2004-071991 |

(51) Int. Cl.
    *G06F 15/00* (2006.01)
(52) U.S. Cl. .................. 358/1.15; 358/1.13; 358/1.14; 358/1.16; 709/203; 709/216; 709/218; 709/219
(58) Field of Classification Search ....... 358/1.12–1.15, 358/1.16, 434–439; 709/203, 214–219
    See application file for complete search history.

(56) References Cited

U.S. PATENT DOCUMENTS

| 6,009,243 | A | * | 12/1999 | Kim | .......................... 358/1.15 |
| 6,687,829 | B1 |   | 2/2004 | Miyamoto et al. |
| 7,283,267 | B2 | * | 10/2007 | Mitsubori et al. | ........... 358/1.15 |
| 2001/0049703 | A1 | * | 12/2001 | Miyoshi et al. | ............. 707/527 |
| 2004/0027601 | A1 |   | 2/2004 | Ito et al. |
| 2004/0190014 | A1 | * | 9/2004 | Ferlitsch | ...................... 358/1.5 |
| 2004/0239956 | A1 |   | 12/2004 | Araumi |

FOREIGN PATENT DOCUMENTS

| JP | 09-179704 | 7/1997 |
| JP | 09-259058 | 10/1997 |
| JP | 2001-117737 | 4/2001 |
| JP | 2001-216100 | 8/2001 |
| JP | 2002-29100 | 1/2002 |

OTHER PUBLICATIONS

U.S. Appl. No. 11/854,103, filed Sep. 12, 2007, Araumi.
U.S. Appl. No. 10/381,189, filed Sep. 21, 2001, Ito et al.
U.S. Appl. No. 09/407,768, filed Sep. 29, 1999, Maruyama et al.
U.S. Appl. No. 09/727,757, filed Dec. 4, 2000, Miyamoto et al.
U.S. Appl. No. 10/802,845, filed Mar. 18, 2004, Araumi.

\* cited by examiner

*Primary Examiner*—Chan S Park
(74) *Attorney, Agent, or Firm*—Oblon, Spivak, McClelland, Maier & Neustadt, P.C.

(57) ABSTRACT

In an image forming apparatus for forming an image, a process indication indicating an execution of a process is received from a requesting part; and the process is executed in accordance with a process instruction description specified by a instruction description identification indicated by the process instruction.

15 Claims, 56 Drawing Sheets

FIG.8

```
struct fileInfo{
    char DocumentName[64],    //DOCUMENT NAME
    time CreationDate,        //ACCUMULATED DATE AND TIME
    char Application,         //APPLICATION WHEN ACCUMULATED
    char PaperSize,           //PAPER SIZE
    char StaplePosition,      //STAPLE POSITION
    char PunchPosition,       //PUNCH POSITION
    char Duplex,              //DOUBLE SIDES INDICATION
    char Cover,               //COVER PAPER INDICATION
    char Sort                 //SORT INDICATION
}
```

FIG.9

```
struct printMode{
    char    CopyVolume,        //VOLUME
    char    PaperSize,         //PAPER SIZE
    char    FeedTray,          //FEED TRAY
    char    ExitTray,          //EXIT TRAY
    char    StaplePosition,    //STAPLE POSITION
    char    PunchPosition,     //PUNCH POSITION
    char    DuplexOpen,        //DOUBLE SIDES INDICATION
    char    CoverSheet,        //COVER PAPER INDICATION
    char    StackSort          //SORT INDICATION
}
```

FIG.10A

```
<volume>2</volume>
<size>A4</size>
<feedTray>tray1</feedTray>
<exitTray>shiftTray</exitTray>
<staple>top</staple>
<punch>top</punch>
<duplex>true</duplex>
<cover>true</cover>
<sort>true</sort>
<saveProperty>true</saveProperty>
```

```
<document>http://machineName.folderName.fileName1</document>   32a
<volume>2</volume>
<size>A4</size>
<feedTray>tray1</feedTray>
<exitTray>shiftTray</exitTray>
<staple>top</staple>
<punch>top</punch>
<duplex>true</duplex>
<cover>true</cover>
<sort>true</sort>
<saveProperty>true</saveProperty>
```

```
<document>http://machineName.folderName.fileName1</document>  ⎫
<document> http://machineName.folderName.fileName2</document> ⎬ 32a
<volume>2</volume>
<size>A4</size>
<feedTray>tray1</feedTray>
<exitTray>shiftTray</exitTray>
<staple>top</staple>
<punch>top</punch>
<duplex>true</duplex>
<cover>true</cover>
<sort>true</sort>
<saveProperty>true</saveProperty>
```

FIG.16A

5a — PRINT INFORMATION POSSIBLE TO BE OMITTED

- STAPLE
- PUNCH
- COVER PAPER/INSERTING PAPER/SECTION
- SORT/STACK
- STAMP PRINT
- DOUBLE SIDES

FIG.16B

5b — PRINT INFORMATION IMPOSSIBLE TO BE OMITTED

- PAPER SIZE
- VOLUME

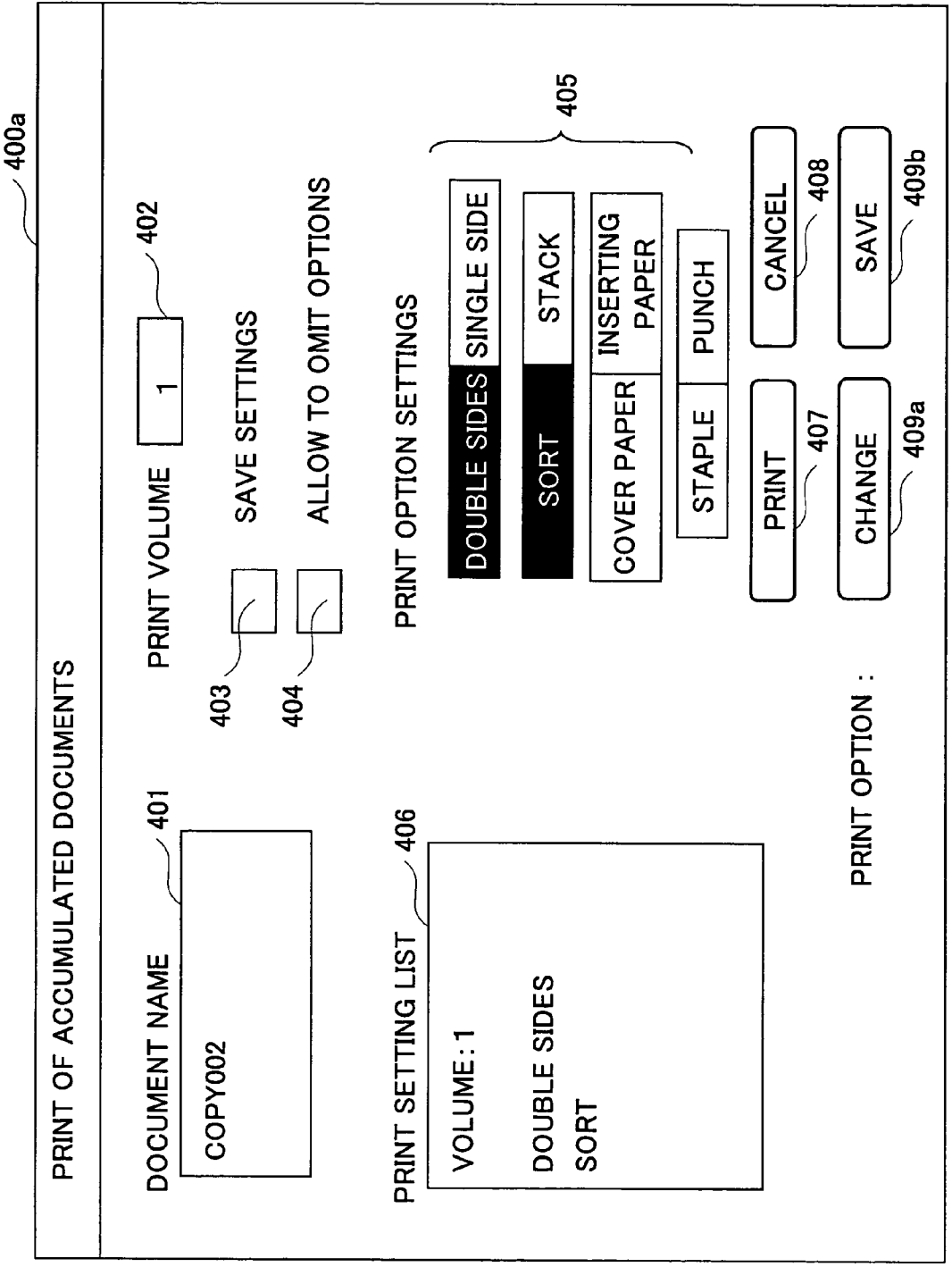

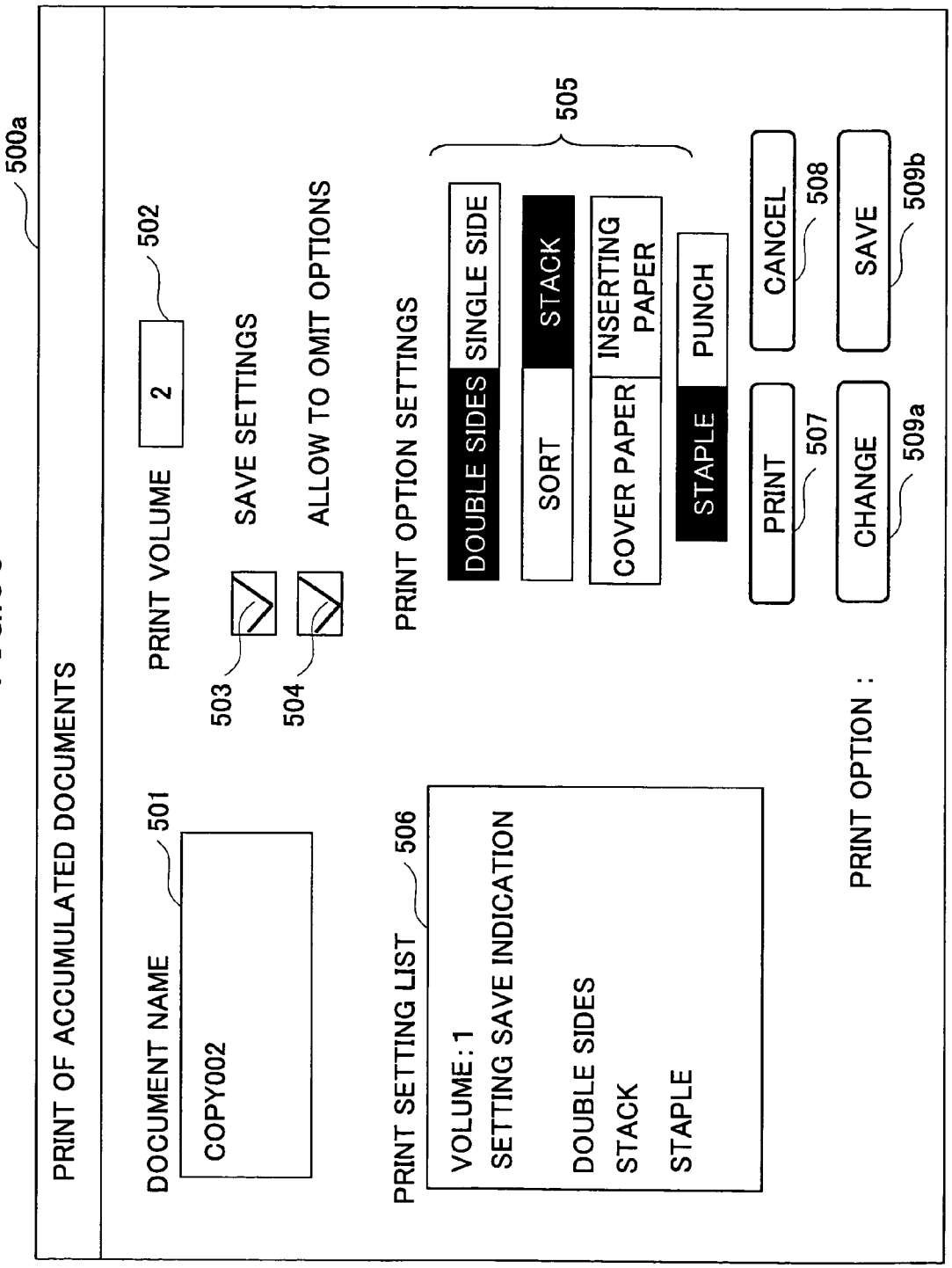

IMAGE FORMING APPARATUS, IMAGE FORMING METHOD, AND INFORMATION PROCESSING APPARATUS FOR CONDUCTING PRINT INSTRUCTION THERETO

BACKGROUND OF THE INVENTION

1. Field of the Invention

The present invention generally relates to an image forming apparatus, an image forming method, and an information processing apparatus for conducting print instruction thereto, in which the user using the information processing apparatus is not required to set print options and simply indicates a print instruction description to repeatedly utilize to conduct a printing process.

2. Description of the Related Art

Conventionally, when a printer function of an image forming apparatus is utilized from a client PC (Personal Computer) connected to the image forming apparatus through a network, after a user using the client PC indicates a documented to print out and sets printing method (print options), a printing process is conducted in accordance with the printing method desired by the user.

In this case, the document is retrieved from a storage area storing the document and both the document and the print options are transmitted through the network to print out every time. Recently, when the document storing in the image forming apparatus is printed out, the client PC obtains a ticket for using the document (image data) and instructs to print out with the ticket. Accordingly, the user simply sets the print options. Thus, the document can be printed out without transmitting the document. For example, Japanese Laid-Open Patent Application No. 2001-117737 discloses this technology.

However, in the conventional system using a ticket, since there is no function for managing print options set by the user by corresponding to the document directed to the printing process, the user is required to set the print options every time when the user desires to print out the document. In addition, even when the user needs the same print options as previously set, the user is required to set the same print options (print instruction description) while recalling the previous print options.

SUMMARY OF THE INVENTION

It is a general object of the present invention to provide an image forming apparatus, an image forming method, and an information processing apparatus for conducting print instruction thereto in which the above-mentioned problems are eliminated.

A more specific object of the present invention is to provide the image forming apparatus, the image forming method, and the information processing apparatus for conducting print instruction thereto, in which the user using the information processing apparatus is not required to set print options and simply indicates a print instruction description to repeatedly utilize to conduct a printing process.

The above objects of the present invention are achieved by an image forming apparatus for forming an image, including: a process indication receiving part receiving a process indication indicating an execution of a process from a requesting part; and a process executing part executing the process in accordance with a process instruction description specified by a instruction description identification indicated by the process instruction.

Alternatively, the above objects of the present invention are achieved by an image forming apparatus for forming an image, including: a process instruction receiving part receiving a process instruction indicating an execution of a process from a requesting part; an object data obtaining part obtaining an object data set specified by object data identification indicated by the process instruction from an object data storage area for storing at least one object data set directed to the process; an instruction description obtaining part obtaining a process instruction description specified by instruction description identification indicated by the process instruction from an instruction description storage area for storing a plurality of process instruction descriptions; and a process executing part executing the process to the object data set obtained by the object data obtaining part in accordance with the process instruction description obtained by the instruction description obtaining part.

In the image forming apparatus according to the present invention, the user is not required to set print options to conduct a process (printing process) and simply indicates a process instruction description (print instruction description).

The above objects of the present invention are achieved by an information processing apparatus, including: an identification obtaining part obtaining instruction description identification specifying a process instruction description from an apparatus for executing a process, the instruction description identification setting process items; and a process instruction sending part indicating the instruction description identification obtained from the identification obtaining part and sending a process instruction instructing an execution of the process.

Alternatively, the above objects of the present invention are achieved by an image forming method executable in an image forming system for executing a process in response to a request from a requesting part, including the steps of: (a) receiving a process instruction indicating an execution of the process from the requesting part; (b) obtaining an object data set specified by object data identification indicated by the process instruction from an object data storage area for storing at least one object data set directed to the process; (c) obtaining a process instruction description specified by instruction description identification indicated by the process instruction from an instruction description storage area for storing a plurality of process instruction descriptions; and (d) executing the process to the object data set obtained by said step (b) in accordance with the process instruction description obtained by said step (b).

In the image forming apparatus according to the present invention, without setting the print options, the user can instruct an apparatus capable of executing a process to execute the process (printing process) by simply setting a process instruction description (print instruction description).

The above objects of the present invention can be achieved by a program code for causing a computer to conduct processes described above in the information processing or by a computer-readable recording medium recorded with the program code.

BRIEF DESCRIPTION OF THE DRAWINGS

In the following, embodiments of the present invention will be described with reference to the accompanying drawings.

FIG. 8 is a diagram showing a structure of file information provided from a repository service execution part according to the first embodiment of the present invention;

FIG. 9 is a diagram showing a structure of a print information provided from a control service according to the first embodiment of the present invention;

FIG. 10 is a diagram showing a description example of properties of the print instruction description provided from the print service execution part in the second printing process according to the first embodiment of the present invention;

FIG. 14 is a diagram showing a description example of the print instruction description provided from the print service execution part according to the first embodiment of the present invention;

FIG. 16A is a diagram illustrating a table showing the settings of the print information possible to be omitted, according to the first embodiment of the present invention and FIG. 16B is a diagram illustrating a table showing the settings of the print information impossible to be omitted, according to the first embodiment of the present invention;

FIG. 55 is a diagram showing the print screen for the accumulated documents provided from the print service execution part according to the second embodiment of the present invention; and FIG. 56 is a diagram showing the print screen for the accumulated documents provided from the print service execution part when the values of the properties are changed, according to the second embodiment of the present invention.

DESCRIPTION OF THE PREFERRED EMBODIMENTS

In the following, embodiments of the present invention according will be described with reference to the accompanying drawings.

First Embodiment

Figure 1:
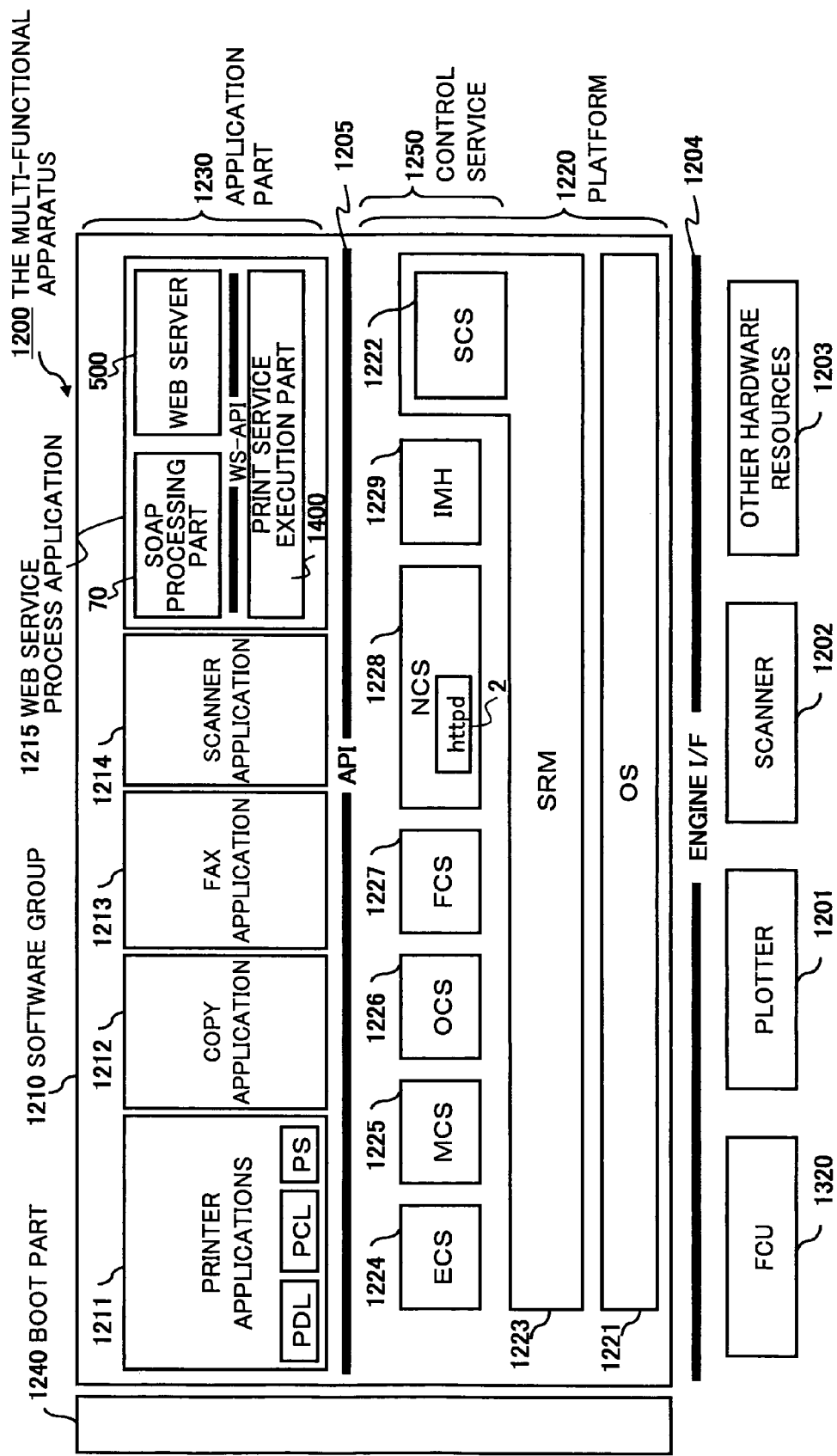
FIG. 1 is a block diagram showing a functional configuration of a multi-functional apparatus realizing various image forming functions according to a first embodiment of the present invention.

For example, an image forming apparatus (hereinafter, called a multi-functional apparatus) realizing various image forming functions according to a first embodiment of the present invention includes a function configuration as shown in FIG. 1. FIG. 1 is a block diagram showing a functional configuration of the multi-functional apparatus realizing various image forming functions according to the first embodiment of the present invention.

In FIG. 1, the multi-functional apparatus 1200 includes a plotter 1201, a scanner 1202, an FCU (Fax Control Unit) 1320, and other hardware resources 1203, and also includes a software group 1210 including a platform 1220 and an application part 1230, and a boot part 1240.

The boot part 1240 activates the platform 1220 and the application 1230 when the multi-functional apparatus 1200 is turned on.

The platform 1220 includes a control service 1250, an SRM (system resource manager) 1223, and an OS (Operating System) 1221.

The control service 1250 is formed by a plurality of service modules. In detail, the control service 1250 includes an SCS (System Control Service) 1222, an ECS (Engine Control Service) 1224, an MCS (Memory Control Service) 1225, an OCS (Operation panel Control Service) 1226, an FCS (Fax Control Service) 1227, an NCS (Network Control Service) 1228, and an IMH (Image Memory Handler) 1229. The platform 1220 includes an API (Application Program Interface) 1205 which can receive the process request from the application part 1230 by predefined functions.

The OS 1221 is an operating system such as UNIX™, and executes each of software programs of the platform 1220 and the application part 1230 in parallel as a process.

The SRM 1223 controls a system and manages resources with the SCS 1222.

The SCS 1222 conducts a plurality of functions such as an application management., an operation panel control, a system screen display (a job list screen, a counter display screen, and a like), an LED display, a resource management, an interruption application control, and alike.

The ECS 1224 controls engine parts such as the FCU 1320, the plotter 1201, the scanner 1202, and the other hardware resources 1203 through an engine I/F 1204.

The MCS 1225 conducts a memory control.

The OCS 1226 controls an operation panel being an information communicating part between an operator and the multi-functional apparatus.

The FCS 1227 conducts a facsimile transmission.

The NCS 1228 provides services utilized in common by applications needing a network I/O.

The NCS 1228 controls a data communication with a network device connected through the Internet by an httpd (Hypertext Transfer Protocol Daemon) 2 which one of the plurality of protocols, executes a plurality of Web services necessary for a process indicated in an HTTP request header by functions, and informs the process result by the plurality of Web services to the network device by an HTTP response. For example, the Web service is conducted in accordance with a message described in an XML (extensible Markup Language)

The IMH 1229 maps image data from a vertical memory area (user vertical space) to a physical memory.

The application 1230 includes a plurality of applications: a printer applications 1211 for a printer having a Page Description Language (PDL), PCL and Post Script (PS), a copy application 1212 for a copier, an FAX application 1213 for a facsimile, a scanner application 1214 for a scanner, and a Web service process application 1215 for processing a service.

Each of the applications 1211 through 1215 is executed by utilizing each process on the platform 1220.

The Web service process application 1215 includes an SOAP processing part 70 for conducting a message exchange in accordance with an SOAP (Simple Object Access Protocol), and a print service execution part 1400 as one of the Web service functions (WSF) for conducting a predetermined process by utilizing the control service 1250 via the API 1205 and for providing the service via a WS-API (Web Service Application Program Interface).

Moreover, the Web service process application 1215 can conduct a predetermined process by utilizing the control service 1250 through the API 1205 by the print service execution part 1400 and provide a process result as the Web service through the WS-API, by including a Web server 500 for processing an HTTP request of a GET method or a POST method and sending an HTTP response including an HTML (HyperText Markup Language).

As described above, the multi-functional apparatus 1200 centralizes and manages processes necessary in common by the applications 1211 through 1217.

Figure 2:
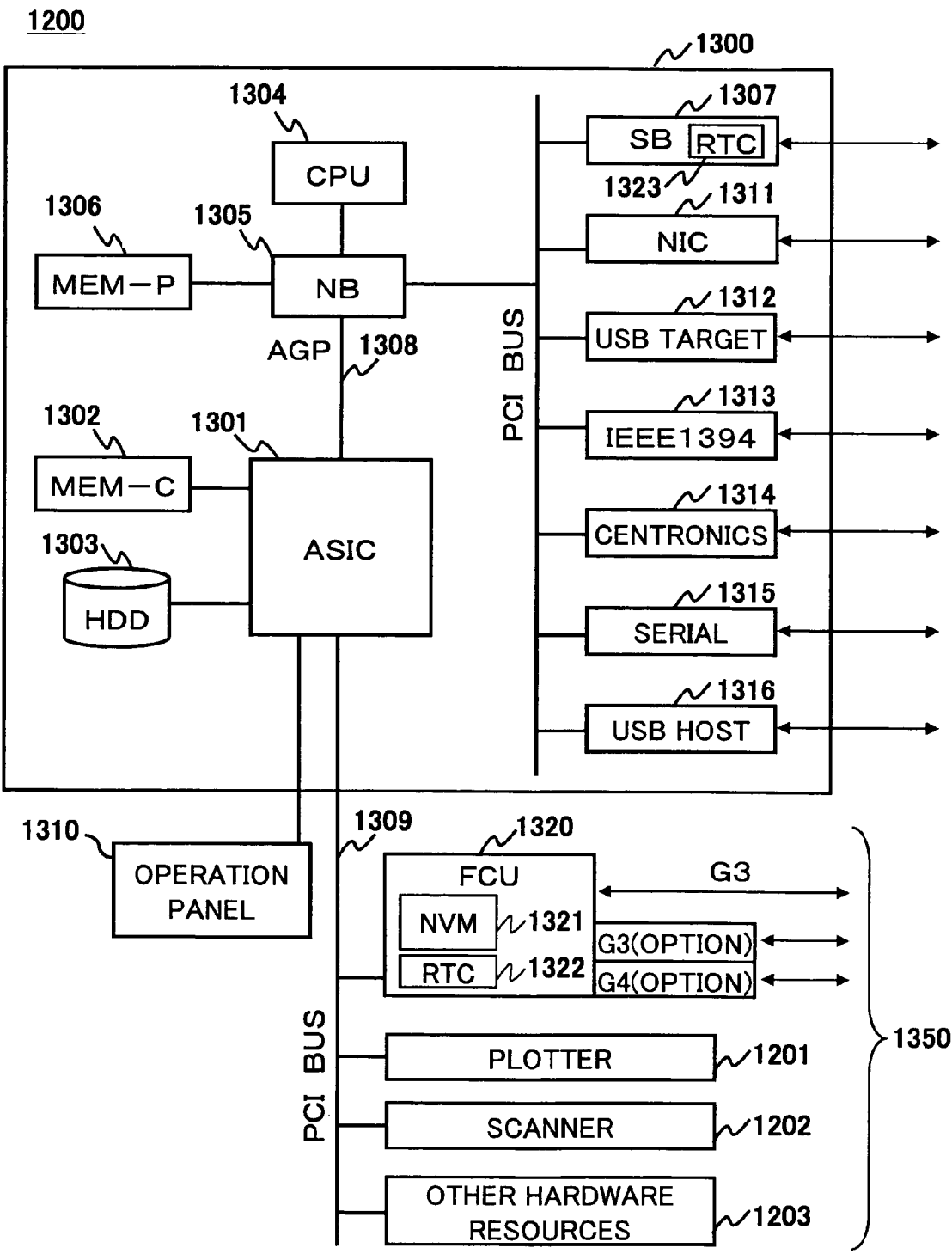
FIG. 2 is a block diagram showing a hardware configuration of the multi-functional apparatus in FIG. 1 according to the first embodiment of the present invention.

Next, a hardware configuration of the multi-functional apparatus 1200 will be described with reference to FIG. 2. FIG. 2 is a block diagram showing the hardware configuration of the multi-functional apparatus in FIG. 1 according to the first embodiment of the present invention. As shown in FIG. 2, in the multi-functional apparatus 1200, an operation panel 1310, a FAX control unit (FCU) 1320, an engine part 1350 including the plotter 1201, the scanner 1202, and other hardware resources 1203, and an ASIC 1301 of a controller 1300 are connected via a PCI (Peripheral Component Interconnect) bus 1309 and a like.

The FCU 1320 includes a non-volatile memory (NVM) 1321 for storing fax data received by fas and a RTC (Real Time Clock) 1322 for clocking time in the FCU 1320, and generally sends or receives the fax data in accordance with a G3 standard. The FCU 1320 may optionally include another G3 standard port and a G4 standard port.

In the controller 1300, the ASIC 1301 is connected to an MEM-C 1302 and the HDD (Hard Disk Drive) 1303 and the ASIC 1301 is also connected to a CPU 1304 via an NB 1305 of a CPU chipset, since an interface of the CPU 1304 has not been published.

The CPU 1304 controls the entire Multi-functional business apparatus 1200. In detail, the CPU 1304 activates and executes the SCS 1222, the SRM 1223, the ECS 1224, the MCS 1225, the OCS 1226, the FCS 1227, the NCS 1228, and the IMH 1229, all of which form the platform 1220 on the OS 1221, as processes, respectively. Also, the CPU 1304 activates and executes the printer application 1211, the copy application 1212, the FAX application 1213, the scanner application 1214, and the Web service process application 1215.

The NB 1305 serves as a bridge to connect the CPU 1304 with an MEM-P 1306, an SB 1307, and the ASIC 1301, respectively. The MEM-P 1306 is a system memory used as a drawing memory of the Multi-functional business apparatus 1200. The MEM-C 1302 serves as a local memory used as an image buffer for a copy and a coding buffer. The ASIC 1301 is an IC (Integrated Circuit) used for the image process including hardware elements.

NB 1305 connects with the SB 1307 through the PCI bus 1319. Also, NB 1305 connects with NIC 1311 (Network Interface Card) for controlling network communication, a USB (Universal Serial Bus) target 1312 capable of receiving data as a USB disk, an IEEE1394 1313 to be connected by a dedicate cable for IEEE1394, a centronics 1314 to be connected by a parallel cable, a serial port 1315 to be connected by a serial cable, a USB host 1316 capable of sending and receiving a large amount of image data by connecting with another USB target (for example, a personal computer).

The SB 1307 is a bridge to connect the NB 1305 with a ROM (Read Only Memory), a PCI device, and a peripheral device. SB 1307 includes an RTC (Real Time Clock) 1323 which measures a time in the controller 1300. Moreover, SB 1307 includes a USB host inside. For example, SB 1307 can receive image data by connecting a camera that supports a USB connection. Moreover, SB 1307 can also receive data from other USB targets.

In the multi-functional business apparatus 1200, data are sent and received through a plurality of ports: the SB 1307, the NIC 1311, the USB target 1312, the IEEE1394 1313, and the centronics 1314, the serial port 1315, the USB host 1316, the G3 standard, the G3 option, and G4 option of the FCU 1320. Then, the data are centralized and are managed in the HDD 1303.

The HDD 1303 is storage to store image data, programs, font data, forms, and a like. The operation panel 1310 is an operation part to receive an input operation from the operator and display information for the operator.

Therefore, in the ASIC 1301, a RAM interface to connect to the MEM-C 1302 and a hardware interface to connect to the HDD 1303 are provided. When the image data is input or output to or from the MEM-C 1302 or the HDD 1303, the ASIC 1301 switches to the RAM interface or the hardware interface.

The AGP 1308 is a bus interface for a graphic accelerator card, which is provided to improve a speed of a graphic process. The AGP 1308 can realize improved speed of the graphic accelerator card by directly accessing the system memory by a higher throughput.

Figure 3:
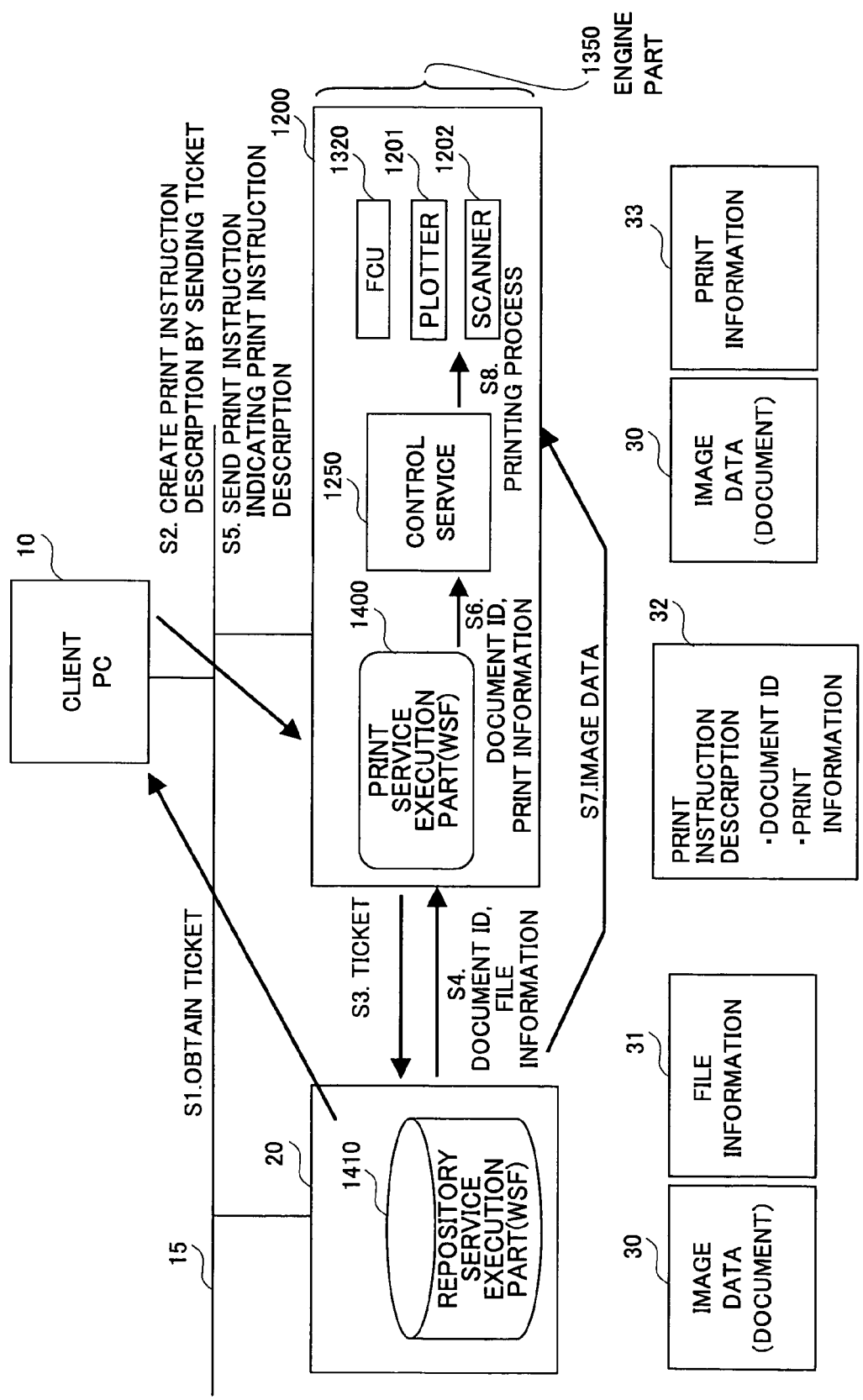
FIG. 3 is a block diagram showing a first network configuration capable of printing just by indicating a print instruction description according to the first embodiment of the present invention.

In the following, a printing process capable of printing just by indicating a print instruction description will be broadly described with reference to FIG. 3. FIG. 3 is a block diagram showing a first network configuration capable of printing just by indicating a print instruction description according to the first embodiment of the present invention. In FIG. 3, the multi-functional apparatus 1200 is connected to a client PC (Personal Computer) 10 and a repository apparatus 20 through a network. Communications among the multi-functional apparatus 1200, the client PC 10 as a computer terminal, and the repository apparatus 20 including a repository service execution part 1410 are controlled in accordance with the HTTP.

The repository apparatus 20 is a server computer for issuing a ticket to allow a user to utilize the image data 30 and providing the image data 30 to the user having the ticket as the Web service, by the repository service execution part 1410 for accumulating and managing the image data 30 and file information 31 concerning the image data 30.

In a case in that the client PC 10 requests the Web service in accordance with the SOAP, each of the multi-functional apparatus 1200 and the repository apparatus 20 provides the Web service in accordance with the SOAP. In a case in that the client PC 10 requests the Web service by using a Web browser, each of the multi-functional apparatus 1200 and the repository apparatus 20 provides the Web service by using HTML (Hypertext Transfer Markup Language).

The client PC 10 obtains a ticket for utilizing the image data 30 desired by the user from the repository service execution part 1410 of the repository apparatus 20 (step S1), and sends the ticket to the print service execution part 1400 of the multi-functional apparatus 1200 to requests to create the print instruction description 32 (step S2). The print service execution part 1400 requests a document ID identifying the image data 30 (the document) desired by the user and the file information 31 of the repository service execution part 1410 by using the ticket received from the client PC 10 (step S3).

In the repository apparatus 20, after the repository service execution part 1410 checks that the ticket received in the step S3 is the ticket issued in the step Si, the repository service execution part 1410 sends the document ID and the file information 31 to the print service execution part 1400 of the multi-functional apparatus 1200 (step S4). The print service execution part 1400 outputs the document ID and the file information ID obtained from the repository service execution part 1410 to the control service 1250. Then, the control service 1250 creates the print instruction description 32.

In the file information 31, a print condition is set when the image data 30 are accumulated. The print service execution part 1400 creates print information 33 by converting the file information 31 by the control service 1250, and creates the print instruction description 32 where the document ID and the print information 33 are included. The print service execution part 1400 informs a print instruction description ID identifying the print instruction description 32.

The client PC 10 sends the print instruction to the print service execution part 1400 by indicating the print instruction description. 32 by the print instruction description ID, which is received from the print service execution part 1400 (step S5). The print service execution part 1400 identifies the print instruction description 32 by the print instruction description ID, and sends the document ID and the print information 33 set in the print instruction description 32 to the control service 1250 (step S6).

The control service 1250 obtains the image data 30 from the repository service execution part 1410 of the repository apparatus 20 based on the document ID and the print information 33 received from the repository service execution part 1410 (step S7). In addition, the control service 1250 executes an image forming process based on the image data 30 in accordance with the print information 33 (step S8). That is, the control service 1250 controls the engine part 1350 (plotter 1201) to form an image on a predetermined medium and to output the medium forming the image.

Figure 4:
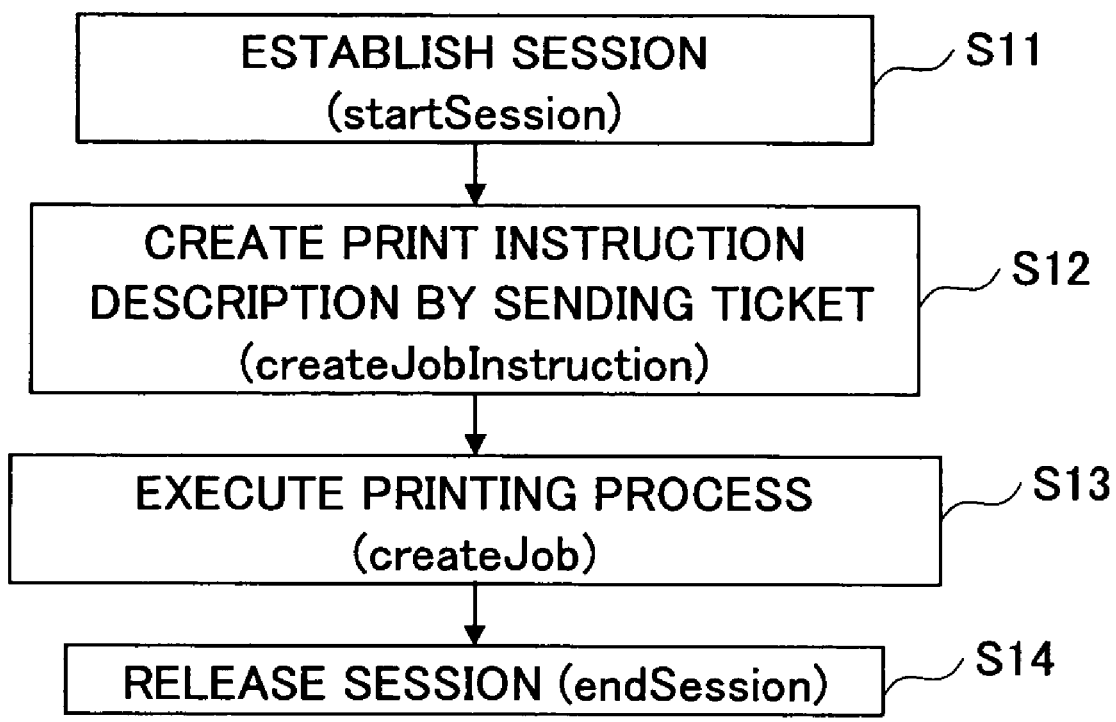
FIG. 4 is a flowchart for explaining a first printing process in a case in that print options are not changed, according to the first embodiment of the present invention.

Next, a printing process in a case in that the print options are not changed at the client PC 10 will be described with reference to FIG. 4. FIG. 4 is a flowchart for explaining a first printing process in a case in that the print options are not changed, according to the first embodiment of the present invention.

In FIG. 4, the client PC 10 sends a command startSession through the network 15 to establish a connection with the print service execution part 1400 of the multi-functional apparatus 1200 (step S11). After the connection is established, the client PC 10 sends a command createJobInstruction to provide the print service execution part 1400 the ticket obtained from the repository service execution part 1410 and requests to create the print instruction description 32 (step S12). Then, the client PC 10 sends a command creatJob to instruct the print service execution part 1400 to execute the printing process (step S13).

Subsequently, the client PC 10 sends a command endSession to release the session with the print service execution part 1400 of the multi-functional apparatus 1200 (step S14).

As described above, since the client PC 10 simply obtains the ticket for utilizing the image data 30 from the repository service execution part 1410 of the repository apparatus 20 and instructs the print service execution 1400 of the multi-functional apparatus 1200 to conduct the printing process, both the image data 30 and the print instruction description 32 can be reused and it is not required to transmit entities of the image data 30 (document) and the print instruction description 32 through the network 15. Therefore, the transmission to the multi-functional apparatus 1200 can be conducted effectively.

The client PC 10 is not required to physically connect to the network 15. For example, the client PC 10 may be connected by a wireless LAN (Local Area Network). Alternatively, since the entity of the image data 30 (document) is not necessary to be transmitted, the user may use a mobile phone or a like to connect to the print service of the multi-functional apparatus 1200 and the repository service execution part 1410 of the repository apparatus 20 through the Internets.

In FIG. 3 and FIG. 4, the case in that the print instruction description 32 being already used once is reused without any change will be described with the reference to FIG. 5 through FIG. 7.

Figure 5:
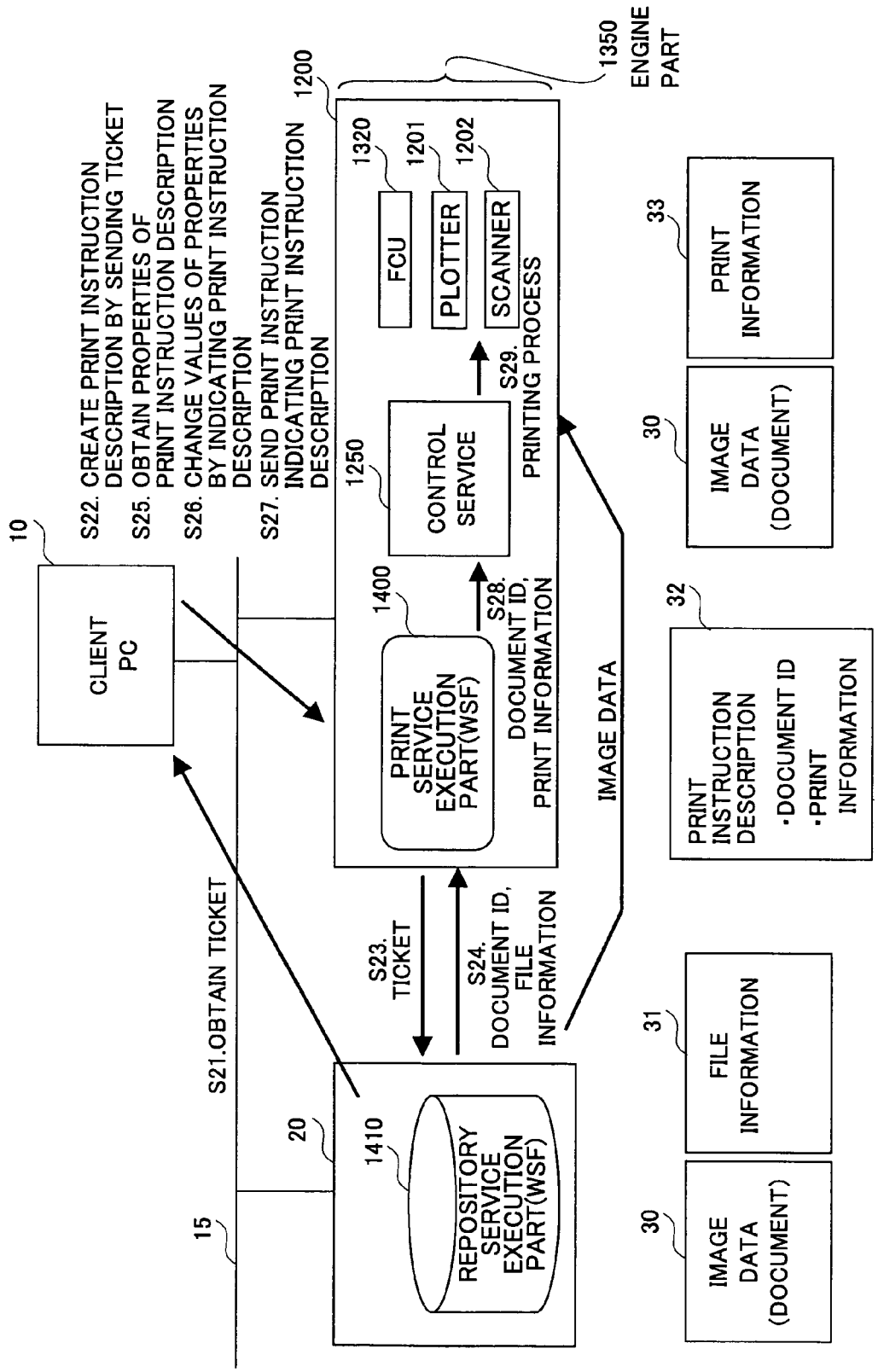
FIG. 5 is a diagram for broadly explaining a second printing process in a case in that the print options are changed, according to the first embodiment of the present invention.

FIG. 5 is a diagram for broadly explaining a second printing process in a case in that the print options are changed, according to the first embodiment of the present invention. In FIG. 5, the client PC 10 obtains the ticket for utilizing the image data 30 desired by the user from the repository service execution part 1410 of the repository apparatus 20 (step S21), and requests to create the print instruction description 32 by sending the ticket to the print service execution part 1400 of the multi-functional apparatus 1200 (step S22). The print service execution part 1400 requests the documents ID and the file information 31 of the repository service execution part 1410 by sending the ticket received from the client PC 10 (step S23).

In the repository apparatus 20, after the repository service execution part 1410 checks that the ticket received in the step S23 is the ticket issued in the step S21, the repository service execution part 1410 sends the document ID and the file information 31 to the print service execution part 1400 of the multi-functional apparatus 1200 (step S24). In the file information 31, the print condition is set when the image data 30 (document) is accumulated. The print service execution part 1400 creates the print information 33 by converting from the file information 31 by using the control service 1250, and creates the print instruction description 32 where the document ID and the print information 33 are included.

The client PC 10 obtains properties showing contents of the print instruction description 32 from the print service execution part 1400 of the multi-functional apparatus 1200 (step S25) The client PC 10 sends an instruction for changing values of the properties which the user changes, to the print service execution part 1400 (step S26). Subsequently, the client PC 10 sends the print instruction indicating the print instruction description 32 to the print service execution 1400 of the multi-functional apparatus 1200 (step S27). The print service execution part 1400 informs the document ID and the print information 32 to the control service 1250 based on the print instruction description 32 in which the values of the properties are changed (step S28).

The control service 1250 obtains the image data 30 from the repository service execution part 1410 of the repository apparatus 20 based on the document ID output from the print service execution part 1400 (step S29), and executes the image forming apparatus based on the image data 30 in accordance with the print information 33 (step S30). That is, the control service 1250 controls the engine part 1350 (plotter 1201) to form an image on the predetermined medium and output the medium forming the image.

In the second printing process in the step S26, the print service execution part 1400 may change the file information 32 based on the print instruction description 32 in which the values of the properties are changed. Accordingly, the file information 32 can be maintained to show the latest values of the properties by the repository service execution part 1410.

Next, in a case in that at the client PC 10, for example, the print options such as "with or without punches", "with or without staples", or a like are changed, a printing process will be described with reference to FIG. 6. FIG. 6 is a flowchart for explaining the second printing process in the case in that the print options are changed, according to the first embodiment of the present invention.

Figure 6:
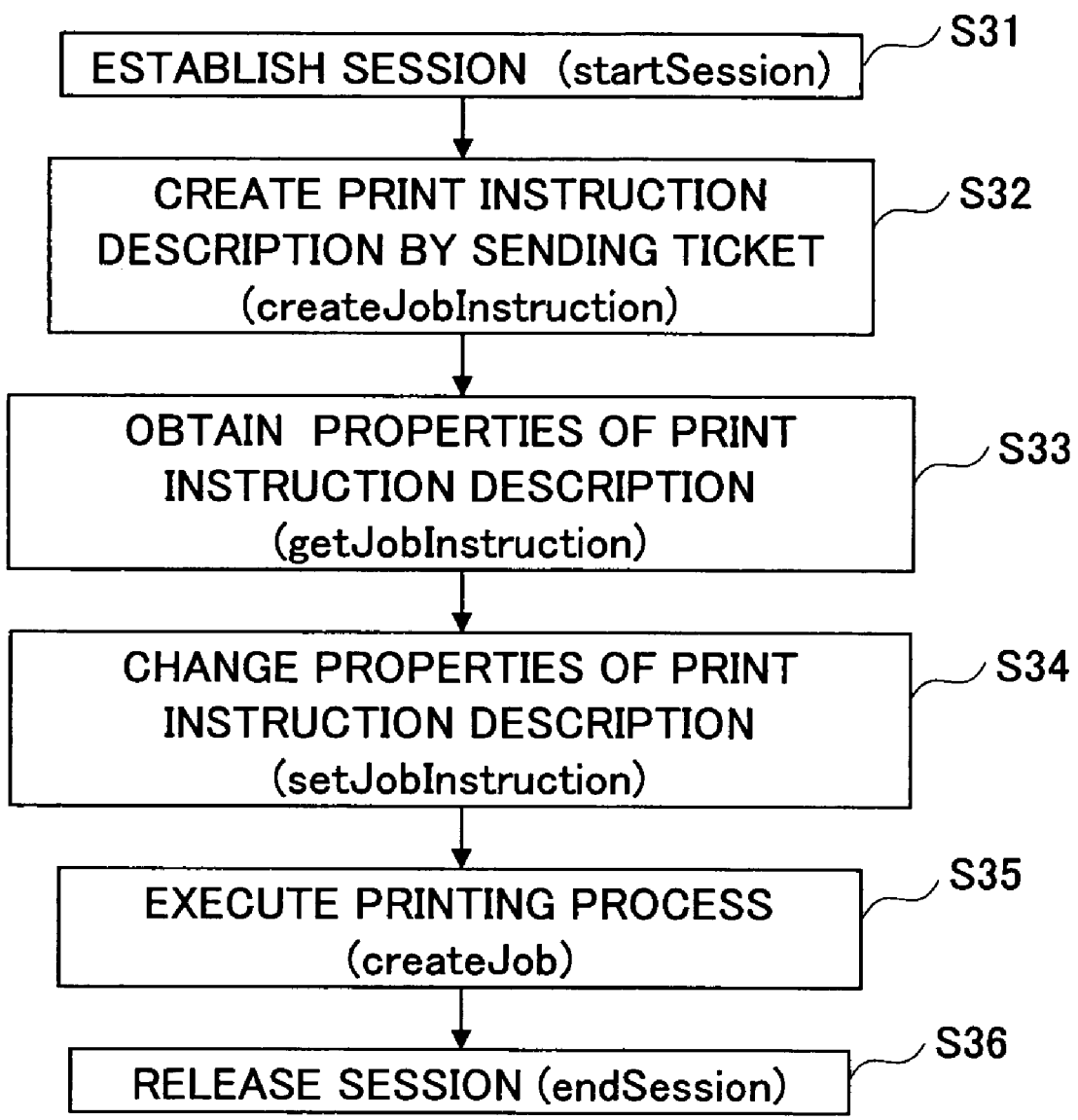
FIG. 6 is a flowchart for explaining the second printing process in the case in that the print options are changed, according to the first embodiment of the present invention.

In FIG. 6, the client PC 10 sends a command startSession through the network 15 to establish a session with the print service execution part 1400 of the multi-functional apparatus 1200 (step S31). After the session is established, the client PC 10 sends a command createJobInstruction to the print service execution service 1400 to send the ticket obtained from the repository service execution part 1410 of the repository apparatus 20 to the print service execution part 1400 and to request the print service execution part 1400 to create the print instruction description 32 (step S32).

In addition, the client PC 10 sends a command getJobInstruction to the print service execution part 1400 to obtain properties showing contents of the print instruction description 32 from the repository service execution part 1410 (step S33).

In response to changes of the print options by the user, the client PC 10 sends a command setJobInstruction to the print service execution part 1400 to instruct the changes of the properties of the print instruction description 32 (step S34). In this case, the client PC 10 simply sends the properties which are changed by the user in all properties, to the print service execution part 1400.

Subsequently, the client PC 10 sends a command createJob to instruct the print service execution part 1400 to execute the printing process (step S35). Then, the client PC 10 sends an endSession to release the session with the print service execution part 1400 (step S36).

Figure 7:
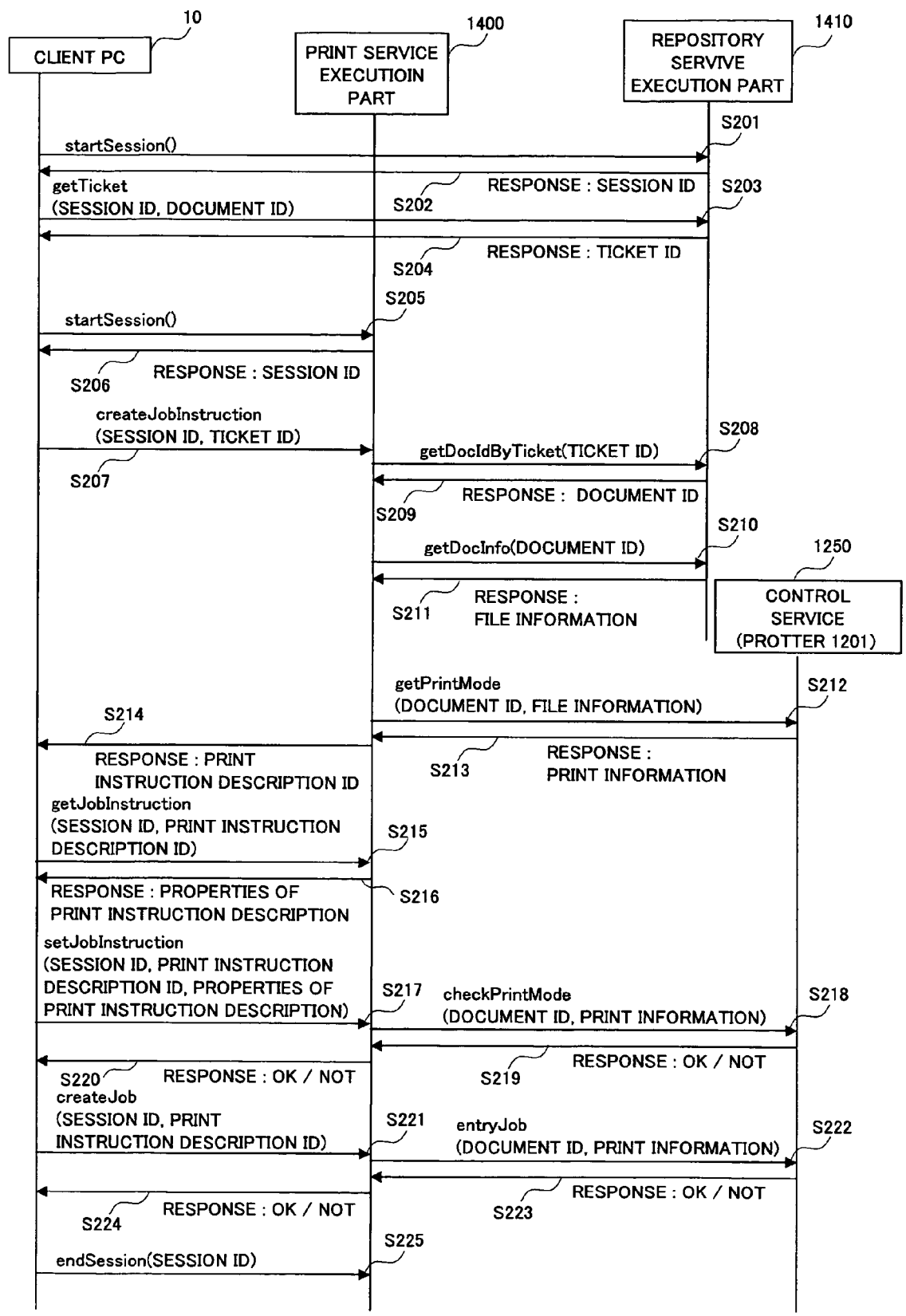
FIG. 7 is a diagram showing a command flow in the second printing process in the case in that the print options are changed, according to the first embodiment of the present invention.

FIG. 7 is a diagram showing a command flow in the second printing process in the case in that the print options are changed, according to the first embodiment of the present invention. In FIG. 7, when the client PC 10 sends the command startSession to the repository service execution part 1410 (step S201), the repository service execution part 1410 responds by a session ID (step S202). A session is established between the client PC 10 and the repository service execution part 1410.

When the session is established, the client PC sends a command getTicket(session ID, document ID) to the repository service execution part 1410 to obtain the ticket for utilizing the image data 30 (document) desired by the user (step S203). The repository service execution part 1410 issues a ticket ID corresponding to the session ID and the document ID and responds by the ticket ID (step S204).

Next, the client PC 10 sends the command startSession to the print service execution part 1400 (step S205). The print service execution part 1400 responds by the session ID to the client PC 10 (step S206). A session is established between the client PC 10 and the print service execution part 1400.

When the session is established, the client PC 10 sends a command createJobInstruction(session ID, ticket ID) to request the print service execution part 1400 to create the print instruction description 32 (step S207).

When the print service execution part 1400 receives a request for creating the print instruction description 32 from the client PC 10 and then sends a command getDocIdByTicket(ticket ID) to the repository service execution part 1410 (step S208), the repository service execution part 1410 responds by the document ID (step S209) Subsequently, the print service execution part 1400 sends a getDocInf (document ID) to the repository service execution part 1410 (step S210), and the repository service execution part 1410 responds by the file information 31 (step S211).

And the print service execution part 1400 sends a command getPrintMode (document ID, file information 31) to the control service 1250, and the control service 1250 responds by the print information 33 (step S213). The print information 33 shows specific information of the printing function.

The print service execution part 1400 creates the print instruction description 32 based on the print information 33 obtained from the control service 1250, and sends the print instruction description 32 to the client PC 10 as a response for the command createJobInstruction sent from the client PC 10 (step S214).

When the print options set in the print information 33 cannot be realized by the multi-functional apparatus 1200, the print service execution part 1400 determines whether or not each print option can be omitted without a problem to realize functions indicated by the print information 33. This determination conducted by the print service execution part 1400 is allowed by an instruction of the client PC 10. When the print option is an option which can be omitted, the option is omitted and then, the print instruction description 32 is created. On the other hand, when the print option is an option which cannot be omitted, the print service execution part 1400 sends an error to the client PC 10 without creating the print instruction description 32. The print options which can be omitted and cannot be omitted will be described with reference to FIG. 16.

When the client PC 10 receives the print instruction description ID, the client PC 10 sends a command getJobInstruction(session ID, print instruction description ID) to the print service execution part 1400 to request the properties of the print instruction description 32 (step S215). The print service execution part 1400 responds by the properties of the print instruction description 32 corresponding to the print instruction description ID for the client PC 10 (step S216).

The client PC 10 sends a command setJobInstruction(session ID, print instruction description ID, properties of the print instruction description 32) to the print service execution part 1400 in order to change the properties of the print instruction description 32 being stored by the print service execution part 1400 based on the properties of the print instruction description 32 which are changed when the user sets the print options (step S217). The print service execution part 1400 creates the print information 33 to output to the control service 1250 based on the properties of the print instruction description 32 indicated by the command setJobInstruction received from the client PC 10.

The print service execution part 1400 sends a command checkPrintMode(document ID, print information 33) to the control service 1250 (step S218). The control service 1250 determines whether or not the printing process can be conducted in accordance with the print information 33 indicated by the command checkPrintMode, and sends a determination result showing "OK" (possible) or "NOT" (impossible) as a response for the printing service execution part 1400 (step S219).

The print service execution part 1400 sends the determination result showing "OK" (possible) or "NOT" (impossible) received from the control service 1250 as a response to the command setJobInstruction in the step S217 to the client PC 10 (step S220).

The client PC 10 sends a command createjob(session ID, print instruction description ID) to the print service execution part 1400 in order to have the multi-functional apparatus 1200 conducted the printing process when the response of the command setJobInstruction shows "OK" (possible) (step S221).

When the print service execution part 1400 receives the command createjob, the print service execution part 1400 sends a command entryJob(document ID, print information 33) to the control service 1250 to instruct to execute a print job (step S222).

The control service 1250 obtains the image data 30 from the repository service execution part 1400 by using the document ID indicated by the command entryJob, and forms and outputs an image on a predetermined medium by the plotter 1201. The control service 1250 sends this process result showing "OK" (process completion) or "NOT" (process error) as a response to the print service execution part 1400 (step S223).

The print service execution part 1400 sends the process result showing "OK" (process completion) or "NOT" (process error) received from the control service 1250 as a response to the command createjob in the step S221 for the client PC 10 (step S224).

The client PC 10 sends an endSession(session ID) to the print service execution part 1400 to release the session with the print service execution part 1400 (step S225).

The file information 31 concerning the image data 30 provided from the repository service execution part 1410, the print information 33 provided from the control service 1250, and the properties of the print instruction description 32 provided from the print service execution part 1400 to the client PC 10 will be described with reference to FIG. 8 through FIG. 10, respectively.

FIG. 8 is a diagram showing a structure of the file information provided from the repository service execution part according to the first embodiment of the present invention. In FIG. 8, the file information 33 is defined by a structure fileinfo (hereinafter, called file information structure), includes elements of "documentName" showing document name of the image data 30, "CreationDate" showing an accumulated date and time when the image data 30 are accumulated in the repository service execution part 1410, "Application" showing a process name for the printer, the copier, the facsimile, the scanner, or the like when the image data 30 are accumulated in the repository service execution part 1410, "PaperSize" showing the size of a paper, "StaplePosition" showing a staple position when the staple is used, "PunchPosition" showing a punch position when a punch is indicated, "Duplex" showing a presence of an indication of double sides, "Cover" showing a presence of an indication of a cover page, "Sort" showing a presence of an indication of sort, and a like.

The repository service execution part 1410 manages the file information 31 as shown by the structure fileinfo by corresponding to the image data 30.

FIG. 9 is a diagram showing a structure of the print information provided from the control service according to the first embodiment of the present invention. In FIG. 9, the print information 33 is defined by a structure printMode (hereinafter, called print information structure) and includes elements of "CopyVolume" showing possible output volumes, "PaperSize" showing the size of a paper, "FeedTray" showing a feed tray identification, "ExitTray" showing an exit tray identification, "StaplePosition" showing a possible staple position, "PunchPosition" showing a possible punch location, "DuplexOpen" showing a possibility of a duplex print, "CoverSheet" showing a possibility of a cover sheet, "StackSort" showing a possibility of sort, and a like.

The control service 1250 manages specific information concerning of the printing function by the print information 33 shown by the structure printMode.

FIG. 10 is a diagram showing a description example of the properties of the print instruction description provided from the print service execution part in the second printing process according to the first embodiment of the present invention. In FIG. 10, the print service execution part 1400 generates and manages the properties of the print instruction description 32 in the XML, and the print instruction description 32 includes elements of copy volumes to print, the size of a paper, a feed tray identification, an exit tray identification, a staple position, a punch position, a presence of an indication of the duplex print, a presence of an indication of a cover sheet, a presence of an indication of sort, a presence of an indication of storing the properties, and a like.

The description example shown in FIG. 10 shows "2" copy volumes to print, "A4" size of a paper, "tray 1" to feed papers, "shiftTray" to exit printed papers, "top" staple position, "top" punch position, "true" for the duplex print, "true" for the cover sheet, "true" to sort, "true" to store the property.

The print service execution part 1400 manages the properties of the print instruction description 32 by corresponding to the image data 30 as shown in FIG. 10.

In the second printing process, the client PC 10 sends properties which are changed properties of the properties of the print instruction description 32 obtained from the print service execution part 1400, and the print instruction description 32 created in the print service execution part 1400 are changed. By conducting the above-described process, the client PC 10 can conduct the printing process by simply indicating changed properties of the print instruction description 32.

On the other hand, in a case in that the multi-functional apparatus 1200 conducts the second printing process with the plurality of the client PCs 10, the multi-functional apparatus 1200 is needed to maintain a plurality of the print instruction descriptions 32 created in the print service execution part 1400 until receives the print instruction from each client PC 10. In order to effectively use a storage area for maintaining the print instruction 32, it can be considered that each client PC 10 creates the print instruction 32 including changed properties.

A case in that the client PC 10 creates the print instruction description 32 which properties are changed will be described with reference to FIG. 11 through FIG. 14.

Figure 11:
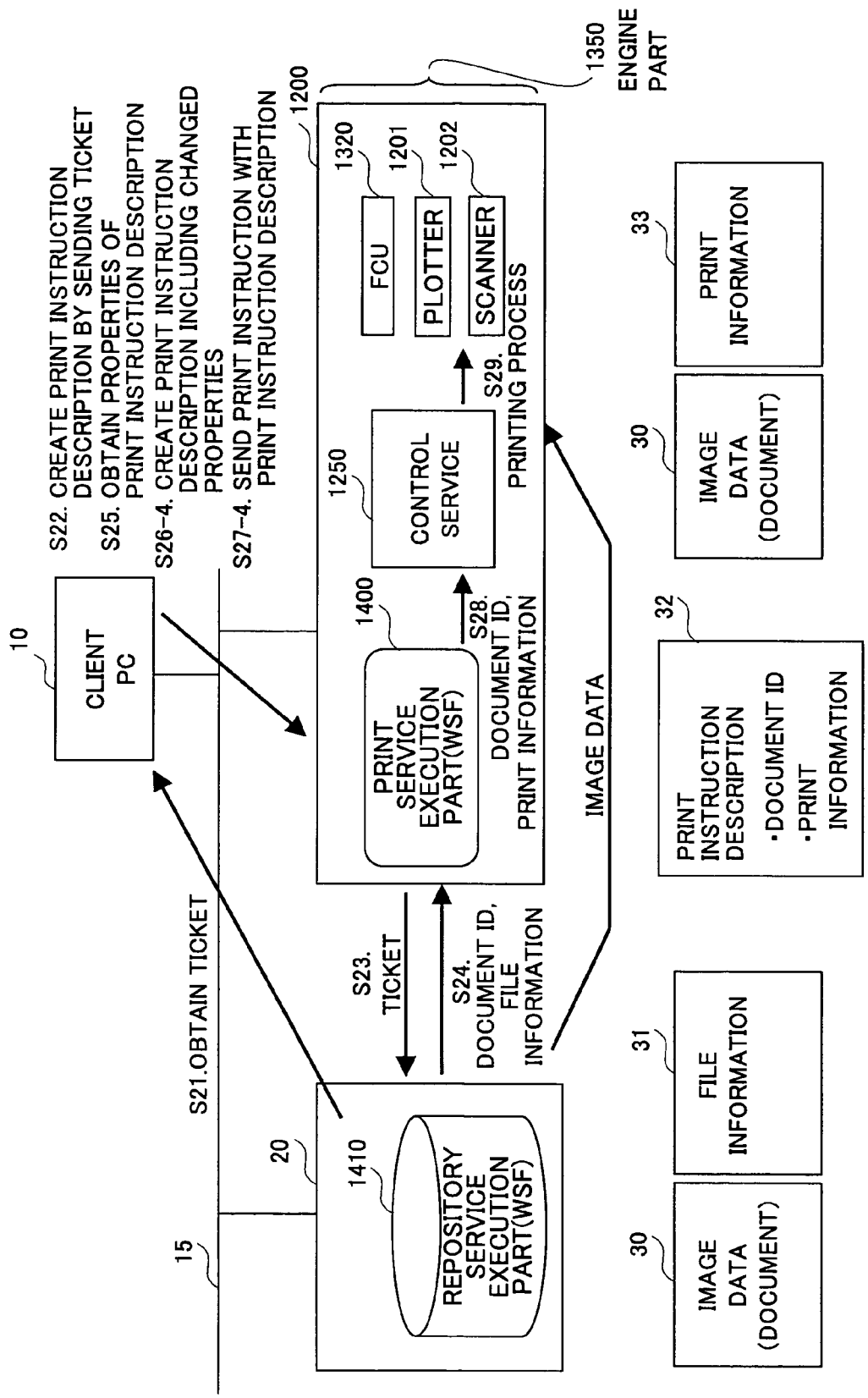
FIG. 11 is a diagram for broadly explaining a third print process in the case in that the print options are changed, according to the first embodiment of the present invention.

FIG. 11 is a diagram for broadly explaining a third print process in the case in that the print options are changed, according to the first embodiment of the present invention. In FIG. 11, parts that are the same as the ones in FIG. 5 are indicated by the same reference numerals and the explanation thereof will be omitted.

In FIG. 11, the print service execution part 1400 creates the print instruction description 32, sends the properties of the print instruction description 32, and then, deletes the print instruction description 32 from a predetermined storage area.

On the other hand, the client PC 10 changes the properties of the print instruction description 32 and creates the print instruction description 32 which indicates all properties including the changed properties (step S26-4) The client PC 10 sends the print instruction to the print service execution part 1400 by sending the print instruction description 32 which is created (step S27-4). The print service execution part 1400 informs the document ID and the print information 33 to the control service 1250 based on the print instruction description 32 received from the client PC 10 (step S28). The following steps are conducted as the same as described in FIG. 5.

Figure 12:
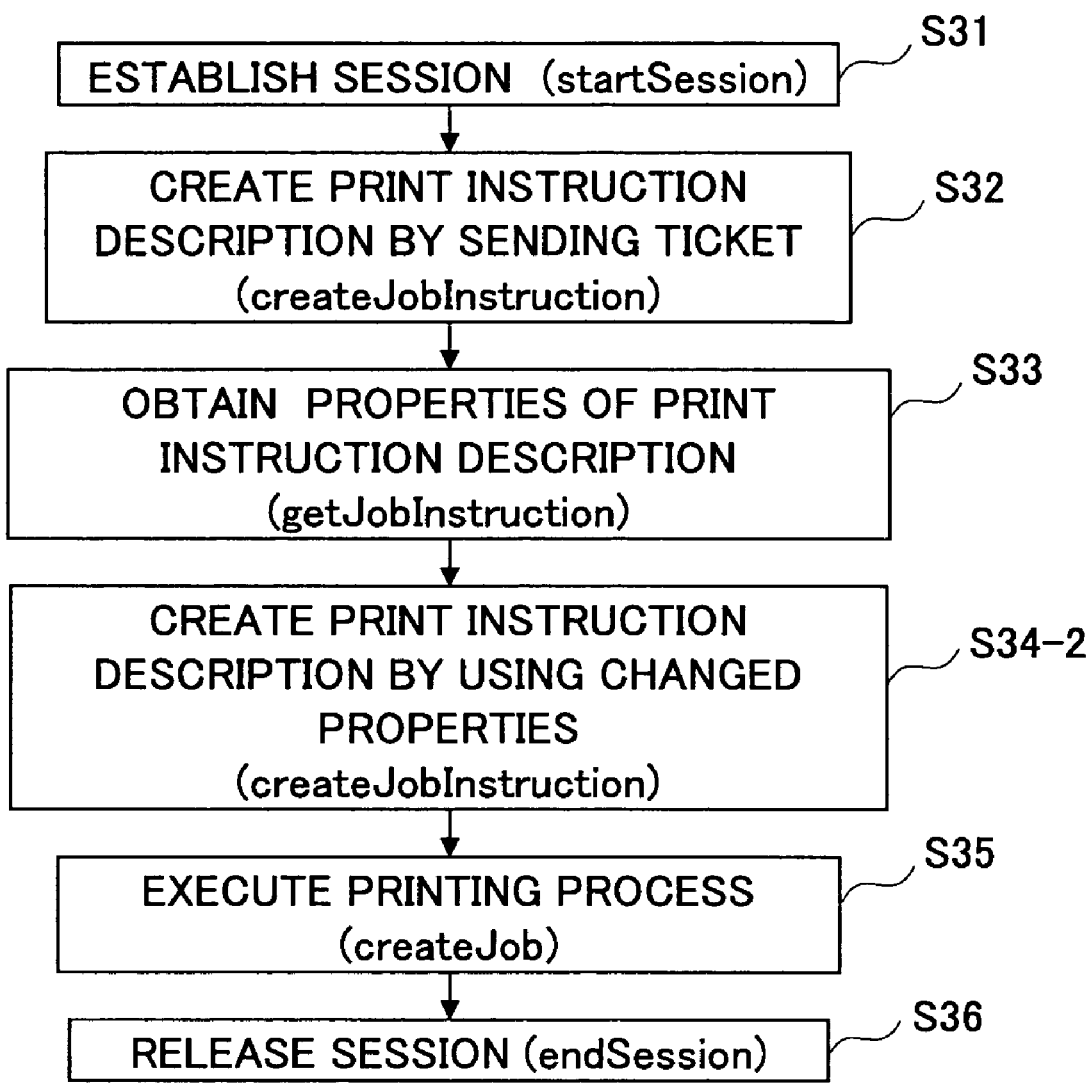
FIG. 12 is a flowchart for explaining the second printing process in the case in that the print options are changed, according to the first embodiment of the present invention.

Next, in a case in that at the client PC 10, for example, the print options such as "with or without punches", "with or without staples", or a like are changed, a printing process will be described with reference to FIG. 12. FIG. 12 is a flowchart for explaining the second printing process in the case in that the print options are changed, according to the first embodiment of the present invention. In FIG. 12, parts that are the same as the ones in FIG. 6 are indicated by the same reference numerals and the explanation thereof will be omitted.

In FIG. 12, the step S34 of FIG. 6 is replaced with step S34-2. The client PC 10 changes values of the properties of the print instruction description 32, and creates another print instruction description 32 setting the values of the properties which are changed (step S34-2). Subsequently, the client PC 10 instructs the print service execution part 1400 to conduct the printing process by sending a command createJob (step S35). The following steps are conducted as the same as described in FIG. 6.

Figure 13:
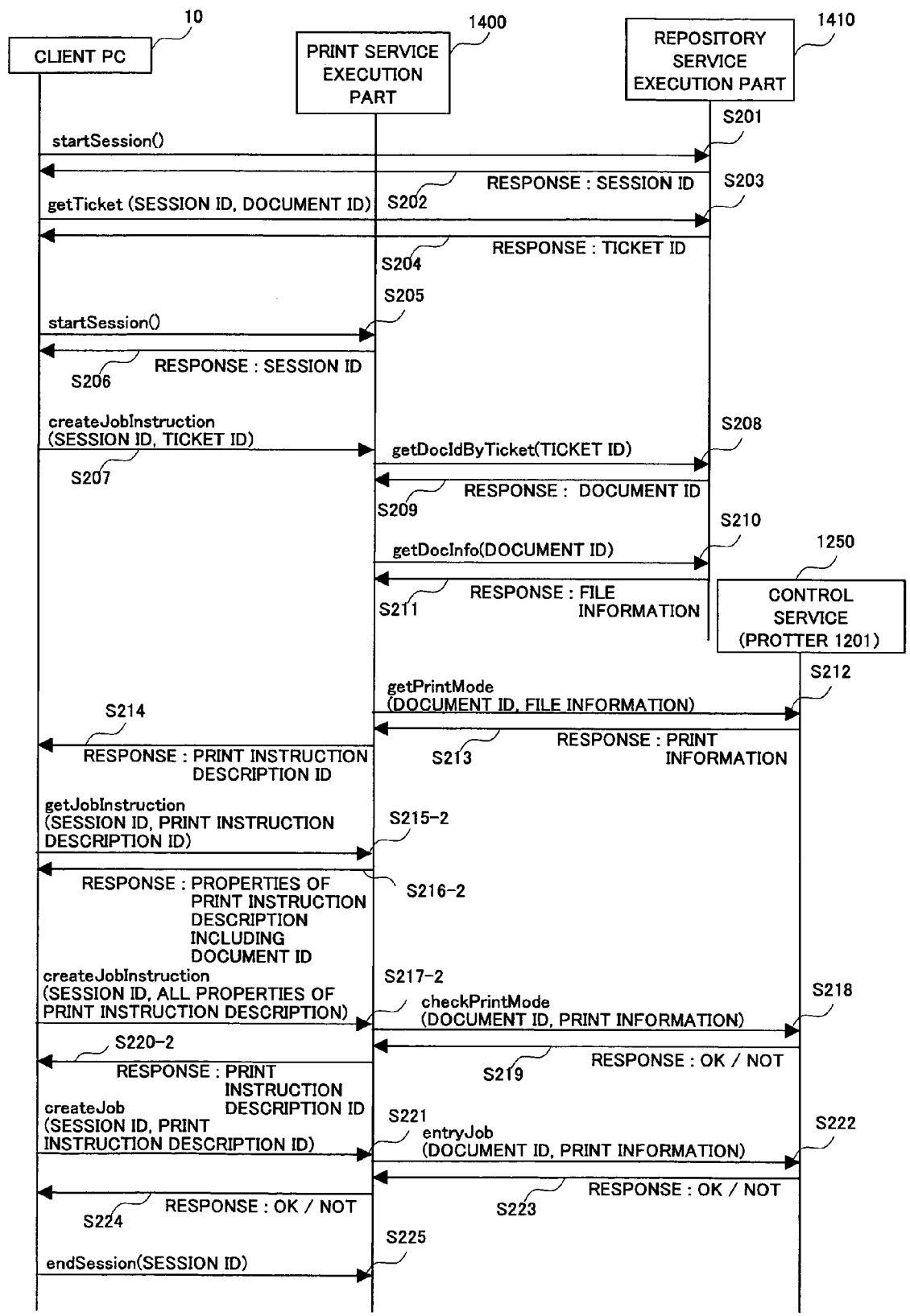
FIG. 13 is a diagram showing a command flow in the third printing process in the case in that the print options are changed, according to the first embodiment of the present invention.

FIG. 13 is a diagram showing a command flow in the third printing process in the case in that the print options are changed, according to the first embodiment of the present invention. In FIG. 13, parts that are the same as the ones in FIG. 7 are indicated by the same reference numerals and the explanation thereof will be omitted.

In FIG. 13, after the print service execution part 1400 sends a print instruction description ID identifying the print instruction description 32 temporarily stored in the print service execution part 1400 as a response to the command createJobInstruction received from the client PC 10 (step S214), when the print service execution part 1400 receives a command getJobInstruction (session ID, print instruction description ID) from the client PC 10 (step S215-2), the print service execution part 1400 responds to the client PC 10 by the properties of the print instruction description 32 corresponding to the print instruction description ID and including the document ID and deletes the print instruction description 32 temporarily stored in the predetermined storage area (step S216-2).

The client PC 10 creates another print instruction description 32 which indicates all properties of the print instruction description 32 received from the print service execution part 1400 and includes properties changed in accordance with the print options set by the user, and sends a command createJobInstruction(session ID, all properties of print instruction description 33) to the print service execution part 1400 (step S217-2).

The print service execution part 1400 generates the print instruction description ID for identifying the print instruction description 32 created by the client PC 10, obtains the document ID from the print instruction description 32, and creates the print information 33 to inform to the control service 1250.

The print service execution part 1400 sends a command checkPrintMode(document ID, print information 33) to the control service 1250 (step S218). The control service 1250 checks in accordance with the print information 33 indicated by the command checkPrintMode whether or not the printing process can be conducted, and sends a check result showing "OK" (possible) or "NOT" (impossible) as a response to the print service execution part 1400 (step S219).

The print service execution part 1400 sends the print instruction description ID as a response to the command createJobInstruction received in the step S217-2 when the check result shows "OK" (possible) is informed from the control service 1250 (step S220). When the check result informed from the control service 1250 shows "NOT" (impossible), the print service execution part 1400 sends "NOT" (impossible) as a response to the client PC 10.

The client PC 10 sends a command createjob(session ID, print instruction description ID) to the print service execution part 1400 in order to conduct the printing process at the multi-functional apparatus 1200 when the response shows the print instruction description ID to the command createJobInstruction (step S221). The following steps are conducted as the same as described in FIG. 7.

In the third printing process described above, the properties of the print instruction description 32, which are provided from the print service execution part 1400 to the client PC 10 in the step S216-2, will be described with reference to FIG. 14.

FIG. 14 is a diagram showing a description example of the print instruction description provided from the print service execution part according to the first embodiment of the present invention. In FIG. 14, different from the properties of the print instruction description 32 in the second printing process, a description 32a corresponding to the document ID is additionally written. For example, the description 32a shows <dosument>http://machineName.folderName.fileName1</docum ent> and <dosument>http://machineName.folderName.fileName2</docum ent>. In this case, the description 32a shows at least one document ID identifying a document. The document ID may be an URL (Uniform Resource Locator) showing a place where the document is stored).

In the third printing process according to the first embodiment, the print service execution part 1400 can effectively use the predetermined storage area for the print instruction description 32.

Figure 15:
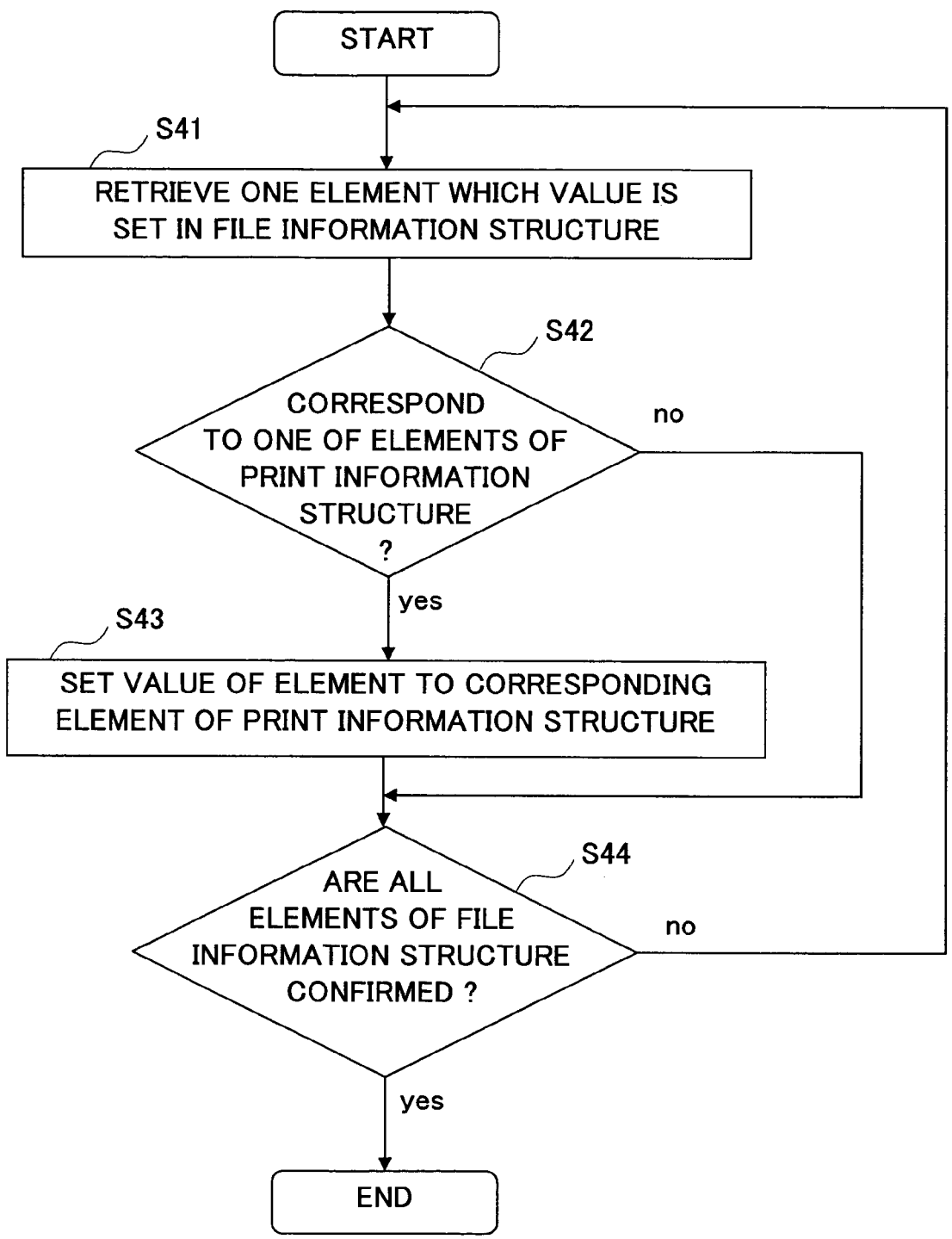
FIG. 15 is a flowchart for explaining a converting process for converting the file information into the print information by the control service, according to the first embodiment of the present invention.

Next, a converting method, in which the control service 1250 converts the file information 31 received from the print service execution part 1400 in the step S212 in FIG. 7 into the print information 33 to inform to the print service execution part 1400 in the step S213, will be described with reference to FIG. 15. FIG. 15 is a flowchart for explaining a converting process for converting the file information into the print information by the control service, according to the first embodiment of the present invention.

In FIG. 15, the control service 1250 retrieves one element which value is set in the file information structure (step S41). The control service 1250 determines whether or not the element retrieved from the file information structure corresponds to one of elements of the print information structure (step S42). When the element does not correspond to any of the elements of the print information structure, the converting process goes to step S44. On the other hand, when the element corresponds to one of the elements of the print information structure, the value of the element is set to a corresponding element of the print information structure (step S43).

In addition, it is determined whether or not all elements of the file information structure are confirmed (step S44). When all elements are not confirmed, the converting process goes back to the step S41, retrieves next element which value is set in the file information structure, and repeats the same process described above. On the other hand, when all elements are confirmed, the converting process for converting the file information 31 into the print information 33 is terminated.

When the settings of the print information 33 conducted by the print service execution part 1400 in the step S214 in FIG. 7 can not be realized by the multi-functional apparatus as a current device, a determination which setting can be omitted without problems to perform the printing process and which setting cannot be omitted to perform the printing process is conducted based on information shown in FIG. 16.

The information to determining omissions of the settings of the print information 33 will be described with reference to FIG. 16A and FIG. 16B. FIG. 16A is a diagram illustrating a table showing the settings of the print information possible to be omitted, according to the first embodiment of the present invention and FIG. 16B is a diagram illustrating a table showing the settings of the print information impossible to be omitted, according to the first embodiment of the present invention. In FIG. 16A, as the settings of the print information 33 possible to be omitted, settings of staple, punch, cover paper, inserting paper, section, sort or stack, stamp print, double sides, and a like are listed in the table 5a. In FIG. 16B, as the settings of the present invention 33 impossible to be omitted, settings of paper size, copy volume, and a like are listed in the table 5b.

The print service execution part 1400 includes the tables for the settings of the print information 33 possible to be omitted and the settings of the print information 33 impossible to be omitted as shown in FIG. 16A and FIG. 16B. Alternatively, those tables may be embodied as codes for a determining part of the converting process.

Figure 17:
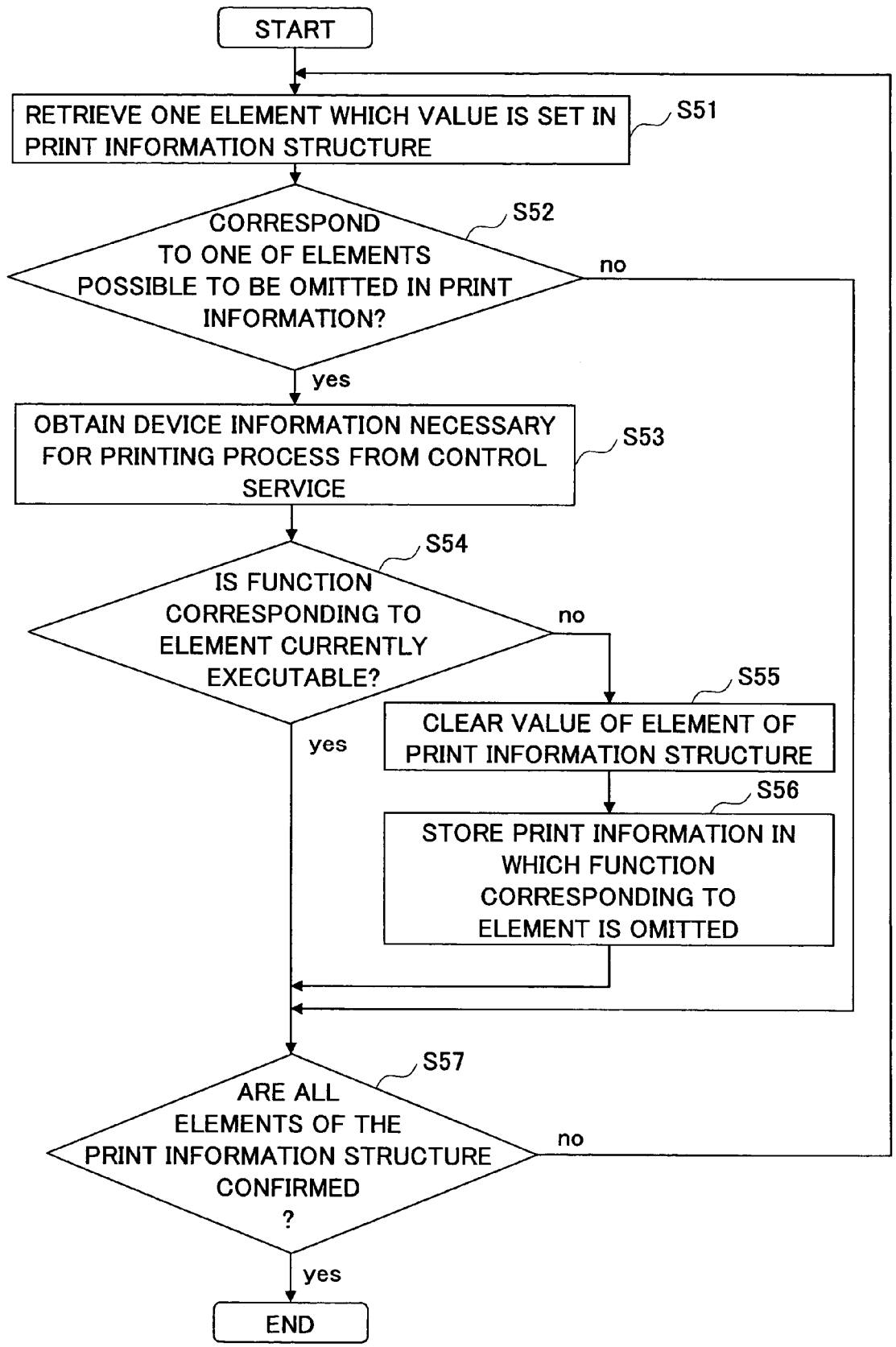
FIG. 17 is a flowchart for explaining an omitting process for omitting settings of the print information according to the first embodiment of the present invention.

An omitting process for omitting the settings of the print information 33 based on the settings of the print information 33 possible and impossible to be omitted as shown in FIG. 16A and FIG. 16B will be described with reference to FIG. 17 in a case in that the user sets to allow an omission of the settings and the printing process can not be realized according to the print information structure. FIG. 17 is a flowchart for explaining the omitting process for omitting the settings of the print information according to the first embodiment of the present invention.

In FIG. 17, the print service execution part 1400 retrieves one element which value is set in the print information structure (step S51). The print service execution part 1400 checks whether or not the element is one of the elements possible to be omitted in the print information 33 (step S52) When the element does not correspond to one of the settings of the print information 33 possible to be omitted, the omitting process goes to step S57. On the other hand, when the element corresponds to any of the settings of the print information 33 possible to be omitted, the print service execution part 1400 obtains device information necessary for the printing process from the control service 1250 (step S53).

The print service execution part 1400 determines whether or not a function corresponding to the element is currently executable in the multi-functional apparatus 1200 (step S54). When the function is executable, the omitting process goes to the step S57. On the other hand, when the function is not executable, the print service execution part 1400 clears a value of the element of the print information structure (step S55). Then, the print service execution part 1400 stores the print information 33 in which the function corresponding to the element is omitted (step S56).

The print service execution part 1400 determines whether or not all elements of the print information structure are confirmed (step S57). When it is determined that the all elements of the print information structure are not confirmed, the omitting process goes back to the step S51, and repeats the same process described above. On the other hand, when it is determined that the all elements of the print information structure are confirmed, the omitting process is terminated.

Figure 18:
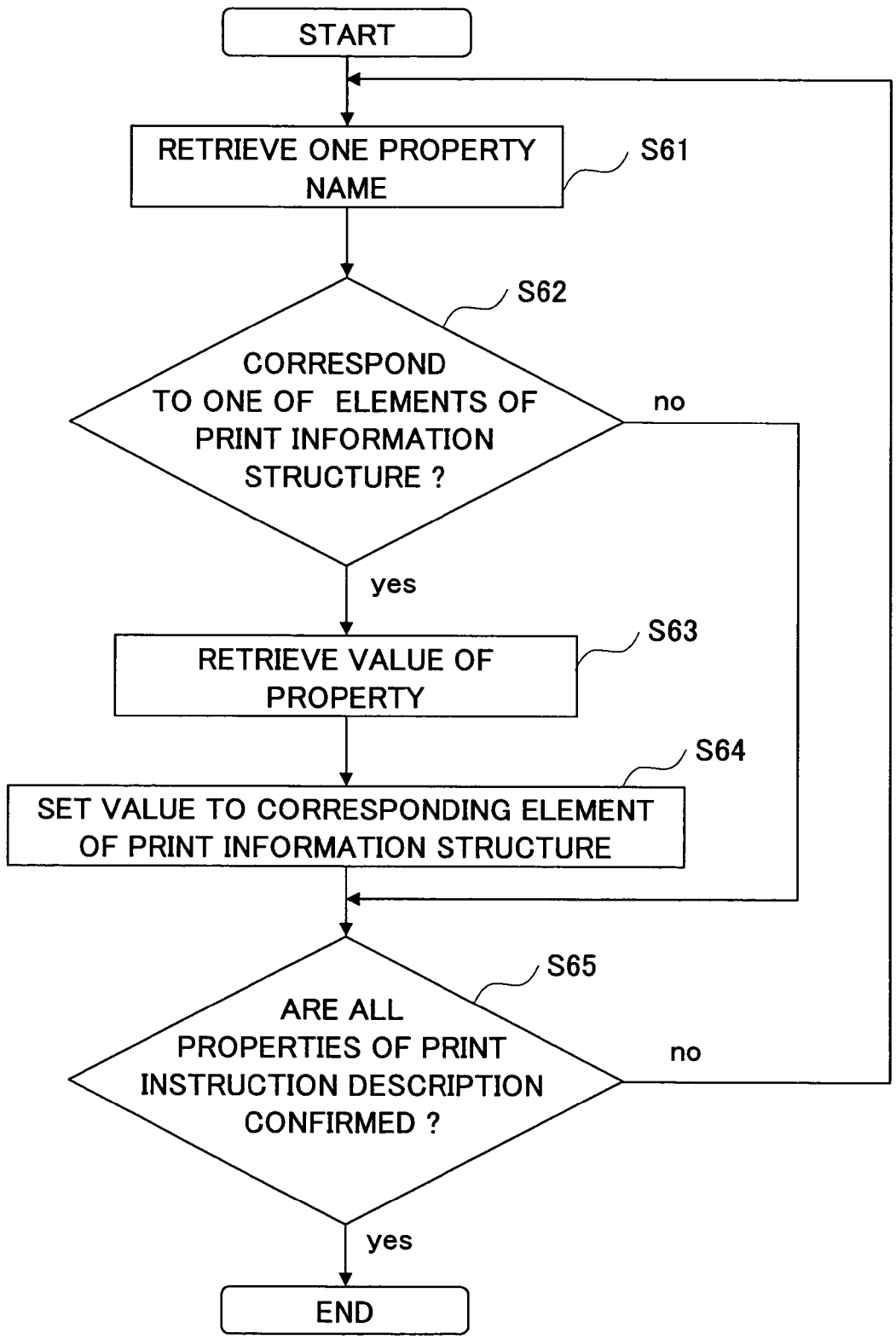
FIG. 18 is a flowchart for explaining a converting process for converting the properties of the print instruction description into the print information by the print service execution part according to the first embodiment of the present invention.

A converting process for converting the properties of the print instruction description 32 received from the client PC 10 in the step S217 in FIG. 7 into the print information 33 informed to the control service 1250 in the step S218 by the print service execution part 1400 will be described with reference to FIG. 18. FIG. 18 is a flowchart for explaining the converting process for converting the properties of the print instruction description into the print information by the print service execution part according to the first embodiment of the present invention.

In FIG. 18, the print service execution part 1400 retrieves one property name from the properties of the print information 33 (step S61). It is determined whether or not the property name corresponds to one of the elements of the print information structure (step S62). When it is determined that the property name does not correspond to any of the elements of the print information structure, the converting process goes to step S63. On the other hand, when it is determined that the property name corresponds to one of the elements of the print information structure, the print service execution part 1400 retrieves a value of the property (step S63), and sets the value to the corresponding element of the print information structure (step S64).

The print service execution part 1400 checks whether or not all properties of the print instruction description 32 are confirmed (step S65). When all properties of the print instruction description 32 are not confirmed, the converting process goes to the step S61, and repeats the same process described above. On the other hand, when all properties of the print instruction description 32 are confirmed, the converting process for converting the properties of the print instruction description 32 into the print information 33 by the print service execution part 1400 is terminated.

A process in a case in that the properties of the print instruction description 32 changed by the client PC 10 are saved in the repository service execution part 1410 without conducting the printing process will be described with reference to FIG. 19. The process for saving the properties of the print instruction description 32 being changed without conducting the printing process is conducted when a property save is indicated.

Figure 19:
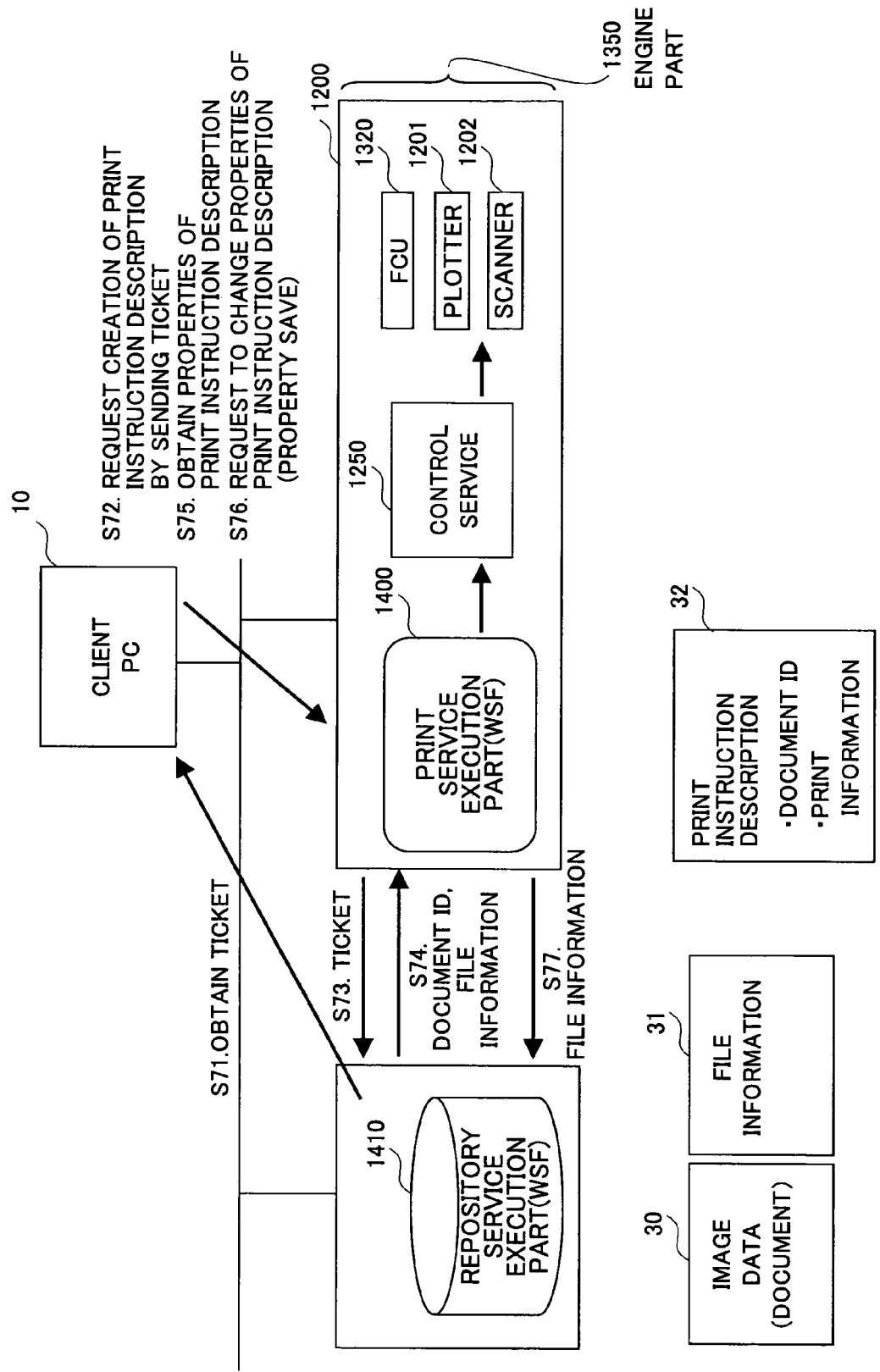
FIG. 19 is a diagram for broadly explaining a process for saving the properties of the print instruction description being changed to the repository service execution part according to the first embodiment of the present invention.

FIG. 19 is a diagram for broadly explaining the process for saving the properties of the print instruction description being changed to the repository service execution part according to the first embodiment of the present invention.

In FIG. 19, the client PC 10 obtains a ticket for utilizing the image data 30 desired by the user from the repository service execution part 1410 of the repository apparatus 20 (step S71), and requests a creation of the print instruction description 32 by sending the ticket to the print service execution part 1400 of the multi-functional apparatus 1200 (step S72). The print service execution part 1400 requests the document ID and the file information 31 by sending the ticket received from the PC 10 to the repository service execution part 1410 (step S73).

In the repository apparatus 20, the repository service execution part 1410 confirms that the ticket received in the step S3 is the ticket issued in the step S1, and then, sends the document ID and the file information 31 to the print service execution part 1400 of the multi-functional apparatus 1200 (step S74). In the file information 31, a print condition is set when the image data 30 are accumulated. The print service execution part 1400 creates the print information 33 by converting the file information 31, and creates the print instruction description 32 in which the document ID and the print information 33 are set.

The client PC 10 obtains the properties showing contents of the print instruction description 32 from the print service execution part 1400 of the multi-functional apparatus 1200 (step S75). The client PC 10 instructs the print service execution part 1400 to change the values of the properties as the user changes, by sending a change request of the properties (step S76). At this time, the property save is indicated to store the properties changed by the user.

When the print service execution part 1400 receives the change request of the properties with the property save, the print service execution part 1400 stores the values of the properties being changed to the repository service execution part 1410 (step S77).

As described above, the file information 31 maintained by the repository service execution part 1410 can be replaced with the values of the properties being changed.

Figure 20:
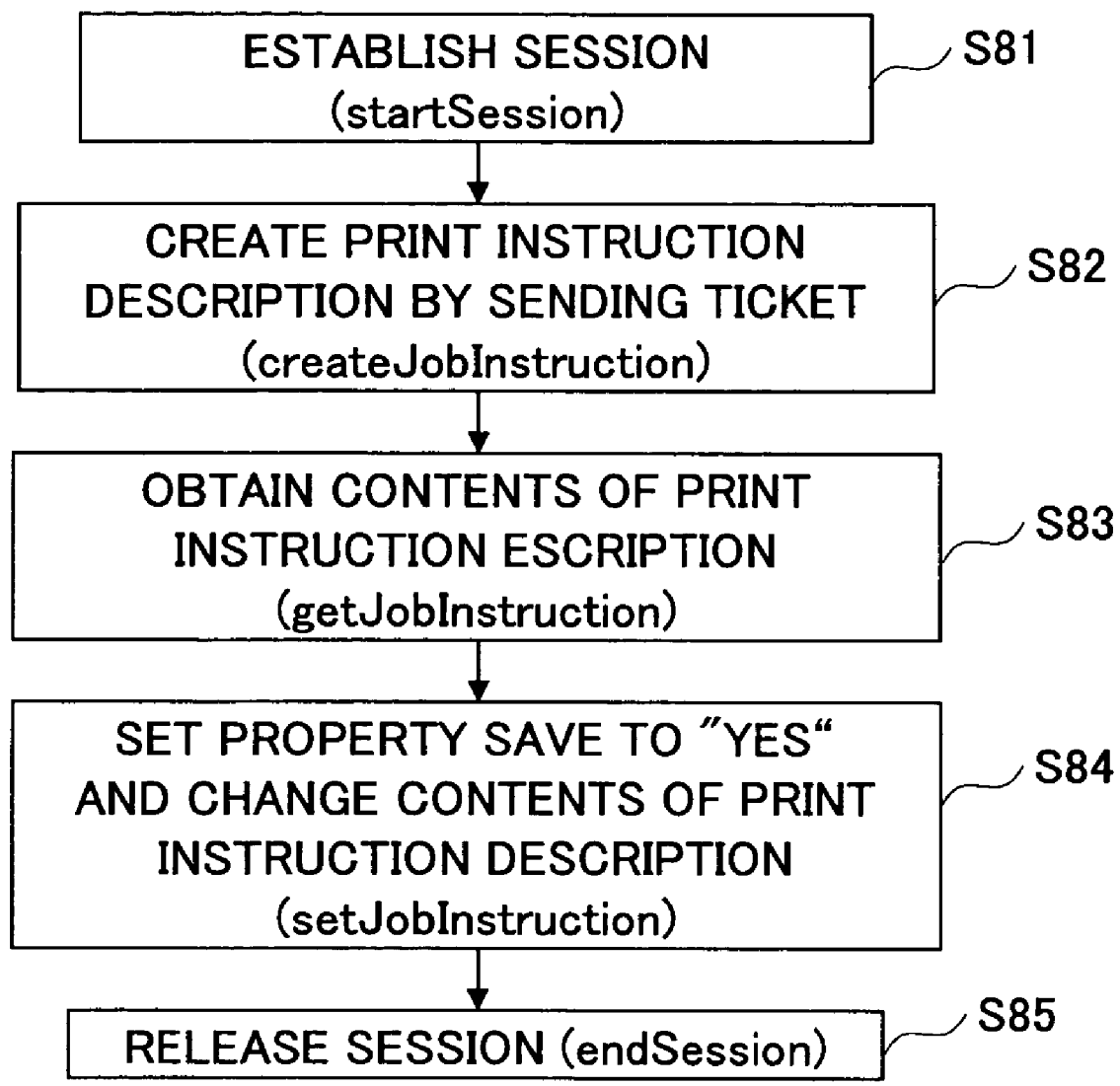
FIG. 20 is a flowchart for explaining the process in the case in that the client PC indicates the property save for the properties changed by the user, according to the first embodiment of the present invention.

The process in a case in that the client PC 10 indicates the property save for the properties changed by the user, will be described with reference to FIG. 20. FIG. 20 is a flowchart for explaining the process in the case in that the client PC indicates the property save for the properties changed by the user, according to the first embodiment of the present invention. In FIG. 20, the client PC 10 establishes a session with the print service execution part 1400 of the multi-functional apparatus 1200 by sending a command startSession (step S81).

After the session the print service execution part 1400 is established, the client PC 10 sends the ticket obtained from the repository service execution part 1410 of the repository apparatus 20, to the print service execution part 1400, and requests the print service execution part 1400 to create the print instruction description 32, by sending a command createJobInstruction (step S82). Subsequently, the client PC 10 obtains the properties showing the contents of the print instruction description 32 from the repository service execution part 1410 by sending a command getJobInstruction (step S83).

In response to a setting change of the user, the client PC 10 instructs the repository service execution part 1410 to change and store the properties of the print instruction description 32 by sending a command setJobInstruction indicating the property save (step S84). Then, the client PC 10 releases the session with the print service execution part 1400 by sending a command endSession.

Figure 21:
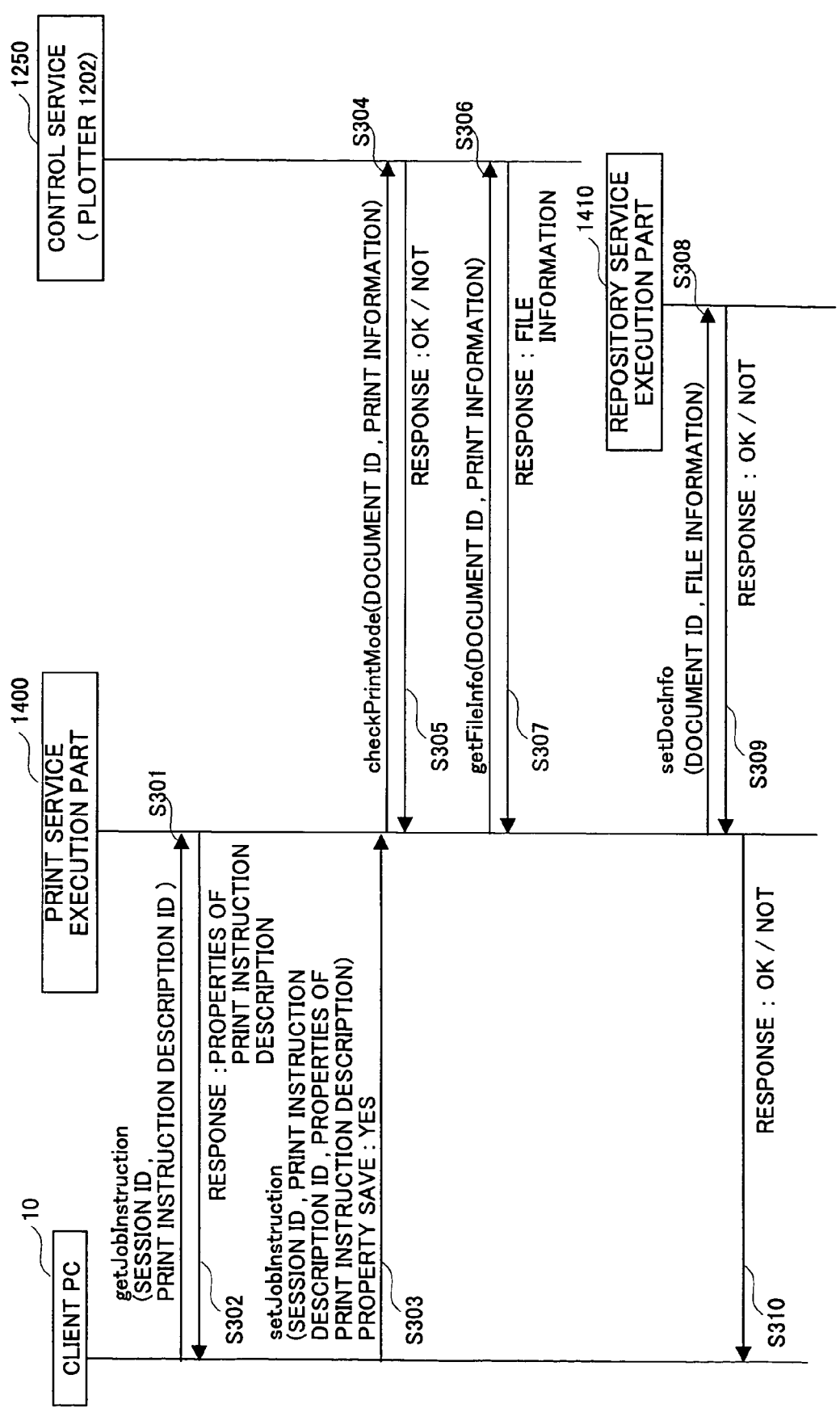
FIG. 21 is a diagram showing a command flow in a process for saving the properties of the print instruction description changed by the user, according to the first embodiment of the present invention.

FIG. 21 is a diagram showing a command flow in the process for saving the properties of the print instruction description changed by the user, according to the first embodiment of the present invention. In FIG. 21, the client PC 10 sends the command getJobInstruction (session ID, print instruction description ID) to the print service execution part 1400 of the multi-functional apparatus 1200 (step S301). The print service execution part 1400 responds by the properties of the print instruction description 32 (step S302).

The client PC 10 sends the command setJobInstruction (session ID, print instruction description ID, properties of the print instruction description ID) indicating that the property save is set to "Yes" to the print service execution part 1400 (step S303). When the print instruction description 32 does not include the document ID, the document ID may be indicated by the command setJobInstruction.

when the print service execution part 1400 receives the command setJobInstruction indicating that the property save is set to "Yes", the print service execution part 1400 sends the command checkPrintMode(document ID, print information 33) to the control service 1250 (step S304) The control service 1250 determines whether or not the printing process can be conducted in accordance with the print information 33 indicated by the command checkPrintMode, and sends a determination result showing "OK" (possible) or "NOT" (impossible) to the print service execution part 1400 as a response to the command checkPrintMode (step S305).

The print service execution part 1400 sends a command getFileInfo(document ID, print information 33) to the control service 1250 when the determination result shows "OK" (possible) (step S306). The control service 1250 retrieve the print information 33 from the command getFileInfo received from the print service execution part 1400, converts the print information 33 into the file information 31, and responds to the print service execution part 1400 by sending the file information 31 (step S307).

When the print service execution part 1400 receives the file information 31 converted from the print information 33 from the control service 1250, the print service execution part 1400 sends a command setDocInfo(document ID, file information 31) to the repository service execution part 1410 (step S308). The repository service execution part 1400 stores the file information 31 by corresponding to the document ID, and responds to the print service execution part 1400 by a result of this storing process showing "OK" (store completion) or "NOT" (store error) (step S309).

The print service execution part 1400 sends the result of the storing process showing "OK" (store completion) or "NOT" (store error) informed from the repository service execution part 1410, to the client PC 10 as a response for the step S303 (step S310).

In a case in which the control service 1250 converts the print information 33 received from the print service execution part 1400 in the step S306 in FIG. 21 into the file information 31 to provide to the print service execution part 1400, a converting process for converting the print information 33 into the file information 31 will be described with reference to FIG. 22.

Figure 22:
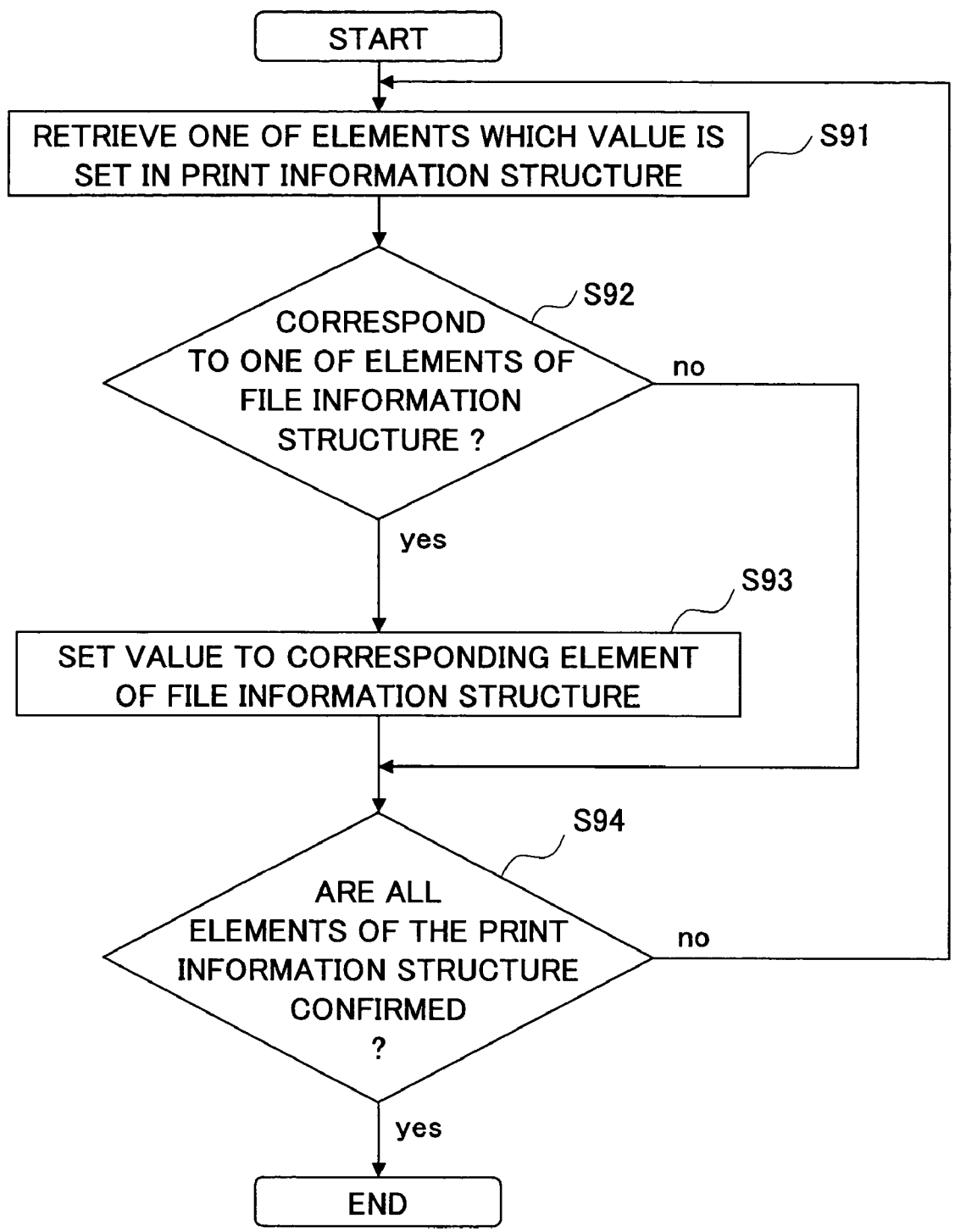
FIG. 22 is a flowchart for explaining a converting process for converting the print information into the file information, according to the first embodiment of the present invention.

FIG. 22 is a flowchart for explaining the converting process for converting the print information into the file information, according to the first embodiment of the present invention. In FIG. 22, the control service 1250 retrieves one of elements which value is set in the print information structure (step S91), and determines whether or not the element retrieved from the print information structure corresponds to one of the elements of the file information structure (step S92).

When the element retrieved from print information structure does not correspond to one of the elements of the file information structure, the converting process goes to step S94. On the other hand, when the element retrieved from print information structure corresponds to one of the elements of the file information structure, the control service 1250 sets the value to the corresponding element of the file information structure (step S93).

The control service 1250 determines whether or not all elements of the print information structure are confirmed (step S94). When all elements of the print information structure are not confirmed, the converting process goes back to the step S91, and repeats the same steps described above. On the other hand, when all elements of the print information structure are confirmed, the control service 1250 terminates the converting process for converting the print information 33 into the file information 31.

Figure 23:
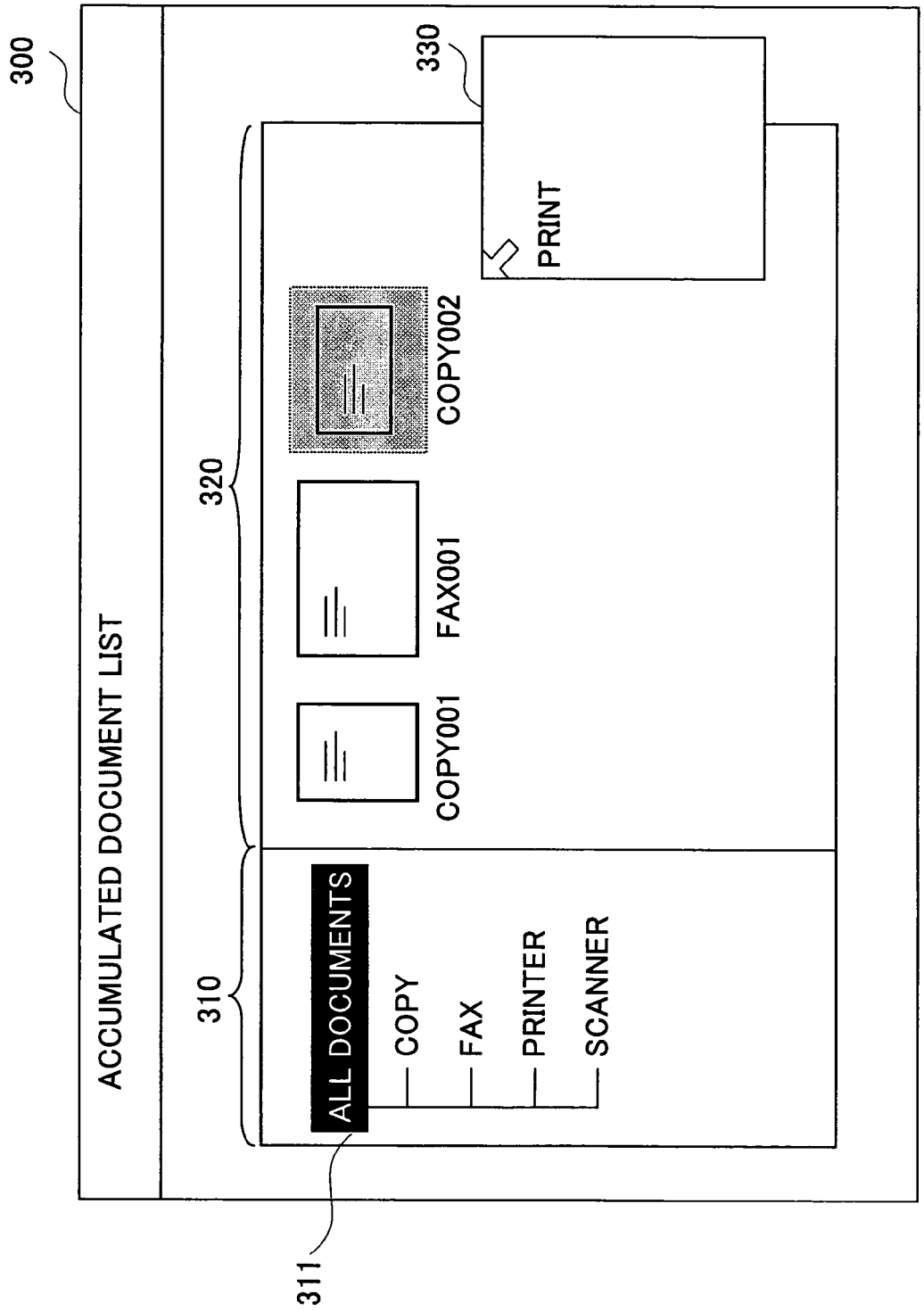
FIG. 23 is a diagram showing an accumulated document list screen provided from the repository service execution part according to the first embodiment of the present invention.

Next, screens provided from the print service execution part 1400 or the repository service execution part 1410 to the client PC 10 will be described with reference to FIG. 23 through FIG. 25. FIG. 23 is a diagram showing an accumulated document list screen provided from the repository service execution part according to the first embodiment of the present invention. In FIG. 23, the accumulated document list screen 300 includes a display area 310 for displaying a list of document names and a display area for displaying documents by thumb-nails.

For example, in the display area 310, the list of document names which documents are accumulated in the repository service execution part 1410 is displayed when the user selects "all documents" 311 by using a mouse or a like. Alternatively, in the display area 310, a plurality of folder names may be displayed first, and a list of document names may be displayed when the user selects a desired folder.

In the display 320, the thumb-nails representing the documents accumulated in the multi-functional apparatus 1200 and the document names are displayed in response to a selection of the user at the display area 310. The user selects one of the thumb-nails for the desired document, and selects "PRINT" from a menu 330 that is displayed when the user clicks a right side of the mouse. Then, the printing process is started at the multi-functional apparatus 1200. The user can conduct the printing process for a plurality of documents all at once by selecting a plurality of thumb-nails.

A print screen for accumulated documents, which is provided from the print service execution part 1400 when the client PC 10 sends the command getJobInstruction in the step S215 in FIG. 7, will be described with reference to FIG. 24. FIG. 24 is a diagram showing the print screen for the accumulated documents provided from the print service execution part according to the first embodiment of the present invention. In FIG. 24, the print screen 400 for the accumulated documents shows previous settings when the print screen 400 is provided from the print service execution part 1400.

The print screen 400 for the accumulated documents includes a display area 401 for displaying the list of document names selected by the user to print out, an input area 402 for inputting print volumes, a check area 403 for saving the properties, a check area 404 for allowing the multi-functional apparatus 1200 to partially omit the print information 33, a setting area 405 for setting the print options, a display area 406 for displaying a list of the print options which are set at the setting area 405, a button 407 for starting a print, a button 408 for canceling a print, and a like.

The user can print out desired documents while referring to the list of the document names displayed at the display area 401. The input area 402 shows the print volume "1" previously set by the user but the user can change a value of the print volume.

When the user checks the check area 403, the properties (setting contents) changed by the user are saved from the print service execution part 1400 of the multi-functional apparatus 1200 to the repository service execution part 1410 of the repository apparatus 20. When the user checks the check area 404, the user allows the multi-functional apparatus 1200 to automatically omit the print information 33. In this case, the check areas 402 and 403 were not checked at a previous time.

For example, at the setting area 405, the user can select "DOUBLE SIDES" or "SINGLE SIDE", "SORT" or "STACK", "COVER PAPER" or "INSERTING PAPER", and "STAPLE" or "PUNCH" as the print options. The print options selected by the user at the display area 405 are displayed as a print setting list at the display area 406. This case shows that "DOUBLE SIDES" and "SORT" were previously selected.

A print screen for the accumulated documents for requesting a change of the values of the properties by the command setJobInstruction, which the client PC 10 sends in the step S217 in FIG. 7, will be described with reference to FIG. 25. FIG. 25 illustrates a print screen 500 in that the settings are changed by the user at the print screen 400 for the accumulated documents. In FIG. 25, numerals 501 through 508 correspond to the numerals 401 through 408, and the explanation thereof will be omitted.

Figure 24:
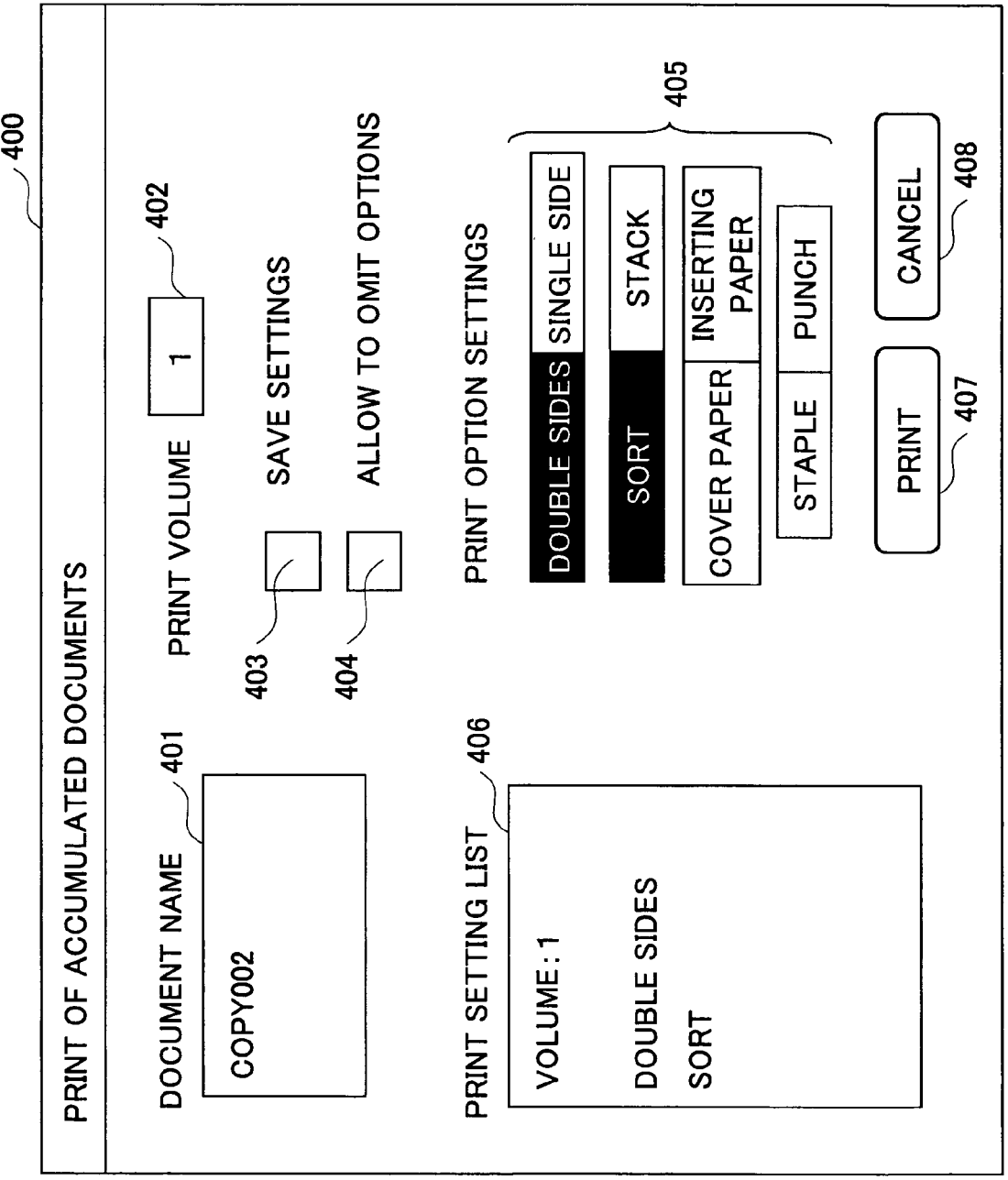
FIG. 24 is a diagram sowing the print screen for the accumulated documents provided from the print service execution part according to the first embodiment of the present invention.
Figure 25:
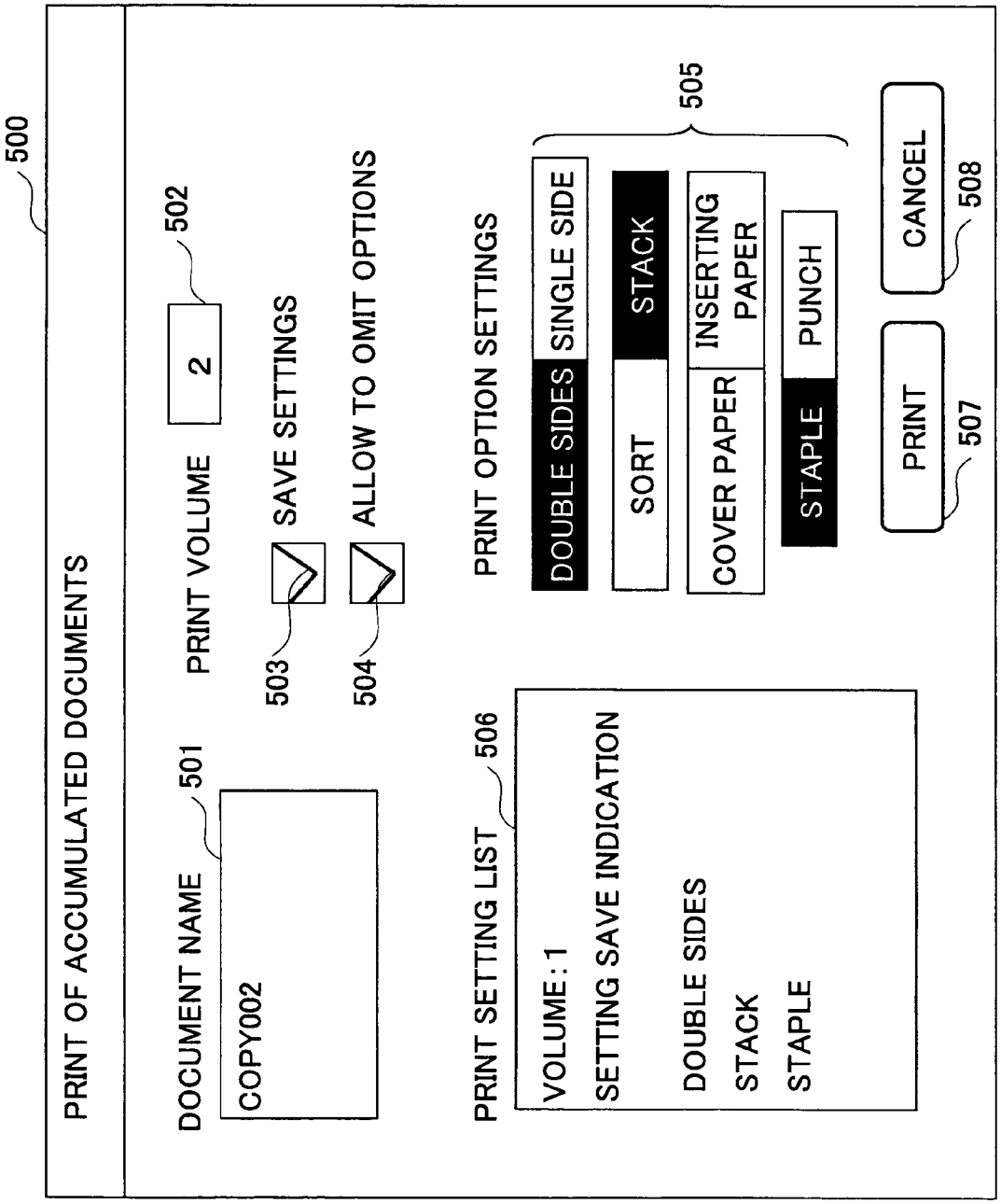
FIG. 25 is a diagram illustrating a print screen in that the settings are changed by a user at the print screen for the accumulated documents, according to the first embodiment of the present invention.

The document names displayed at the display area 501 in FIG. 25 are the same as the document names displayed at the display area 401 in FIG. 24. In the input area 502, the print volume is changed by the user from "1" to "2", and the check areas 503 and 504 corresponding to the check areas 403 and 404 are checked by the user. By checking the check area 503, the properties currently change by the user are saved to the repository service execution part 1410 of the repository apparatus 20. By checking the check area 504, the print service execution part 1400 of the multi-functional apparatus 1200 is allowed to automatically omit.

In addition, in the setting area 505, "BOTH SIDES", "STACK", and "STAPLE" are currently selected. By these changes, the print setting list displayed at the display area 506 is changed. By current changes, "VOLUME: 1", "SETTING SAVE INDICATION", "BOTH SIDES", "STACK", and "STAPLE".

Figure 26:
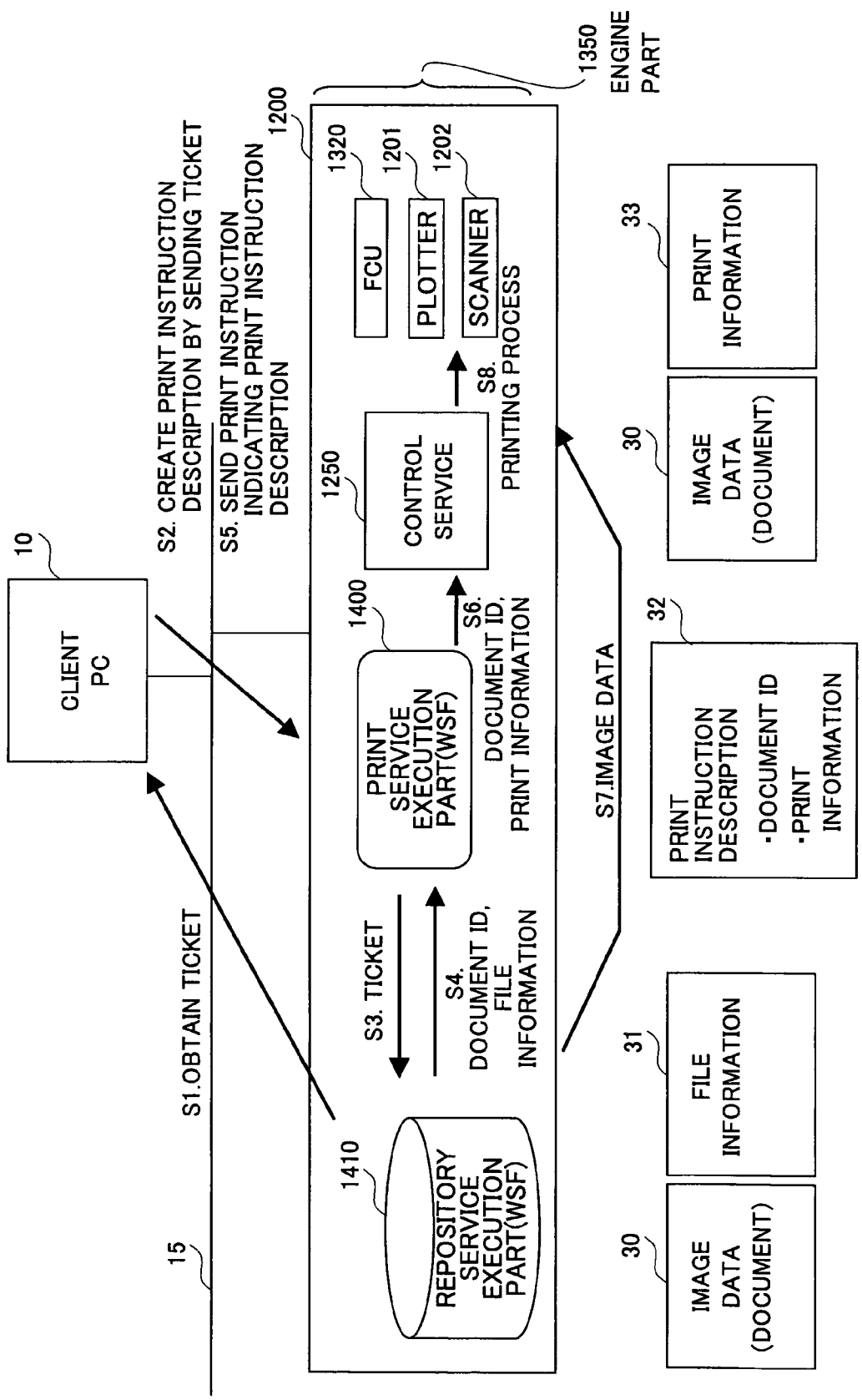
FIG. 26 is a block diagram sowing a second network configuration according to the first embodiment of the present invention.

As described above, the repository service execution part 1410 is provided in the repository apparatus 20 separately from the multi-functional apparatus 1200. However, the present invention can be applied a configuration in that the multi-functional apparatus 1200 includes the print service execution part 1400 and the repository service execution part 1410 as shown in FIG. 26. FIG. 26 is a block diagram sowing a second network configuration according to the first embodiment of the present invention.

In the second network configuration shown in FIG. 26, different from the first network configuration shown in FIG. 3, the multi-functional apparatus 1200 includes the print service execution part 1400, the repository service execution part 1410, the control service 1250, and the engine part 1350. Accordingly, a communication between the print service execution part 1400 and the repository service execution part 1410 through the network 15 is conducted by internally issuing commands.

As configured as shown in FIG. 26, the client PC 10 simply communicates with the multi-functional apparatus 1200 to obtain the ticket and the print instruction description 32.

According to the preset invention, the client PC 10 sends the ticket for allowing utilizing the image data 30 to the multi-functional apparatus 1200 and can execute the printing process by simply indicating the print instruction description 32. That is, it is possible to repeatedly utilize the print instruction description 32. Moreover, the client PC 10 can change the properties obtained from the multi-functional apparatus 1200 and execute the printing process. Moreover, the client PC 10 can save the file information 31 based on the properties changed by the user.

In the following, a case in that the ticket is not used in the second network configuration shown in FIG. 26 will be described. It is possible to realize this case in the first network configuration shown in FIG. 3.

Figure 27:
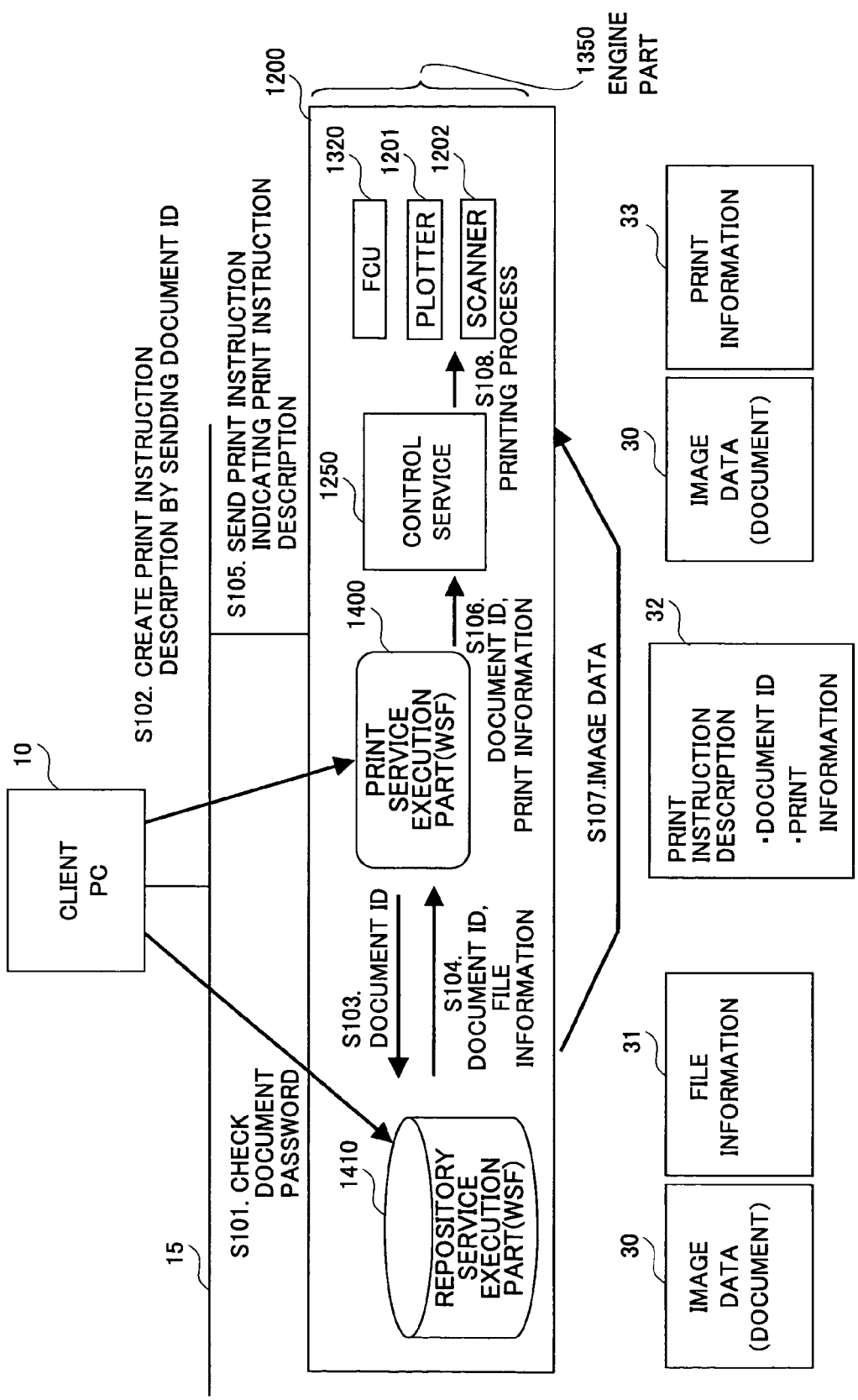
FIG. 27 is a diagram for broadly explaining a fourth printing process in a case in that a ticket is not used, according to the first embodiment of the present invention.

FIG. 27 is a diagram for broadly explaining a fourth printing process in a case in that the ticket is not used, according to the first embodiment of the present invention. In FIG. 27, the client PC 10 sends a document password for utilizing the image data 30 desired by the user to the repository service execution part 1410, and the repository service execution part 1410 checks the document password (step S101) When a validity of utilizing the image data 30 (document) is confirmed by the document password, the client PC 10 requests the print service execution part 1400 to create the print instruction description 32 by sending a document ID identifying the image data 30 (step S102).

The print service execution part 1400 requests the document ID and the file information 33 of the repository service execution part 1410 by sending the document ID received from the client PC 10 (step S103).

After the repository service execution part 1410 confirms the document ID received in the step S103 is the document ID which validity is confirmed in the step S101, the repository service execution part 1410 sends the document ID and the file information 31 to the print service execution part 1400 (step S104). The print service execution part 1400 creates the print instruction description 32 by informing the document ID and the file information 31 obtained from the repository service execution part 1410, to the control service 1250.

The file information 31 maintains the print condition stored when the image data 30 is accumulated. The print service execution part 1400 creates the print information 33 by converting the file information by using the control service 1250, and creates the print instruction description 32 in which the document ID and the print information 33 are set. The print service execution part 1400 sends a print instruction description ID identifying the print instruction description 32 to the client PC 10.

The client PC 10 conducts a print instruction indicating the print instruction description 32 by the print instruction description ID received from the print service execution part 1400, to the print service execution part 1400 (step S105). The print service execution part 1400 identifies the print instruction description 32 by the print instruction description ID and informs the document ID and the print information 33, which can be obtained from the print instruction description 32, to the control service 1250 (step S106).

The control service 1250 obtains the image data 30 from the repository service execution part 1410 based on the document ID informed from the print service execution part 1400 (step S107), and executes the printing process based on the image data 30 in accordance with the print information 33 informed from the print service execution part 1400 (step S108). That is, the control service 1250 controls the engine part 1350 (plotter 1201) to conduct the image formation on a predetermined medium and output the predetermined medium on which the image formation is conducted.

Figure 28:
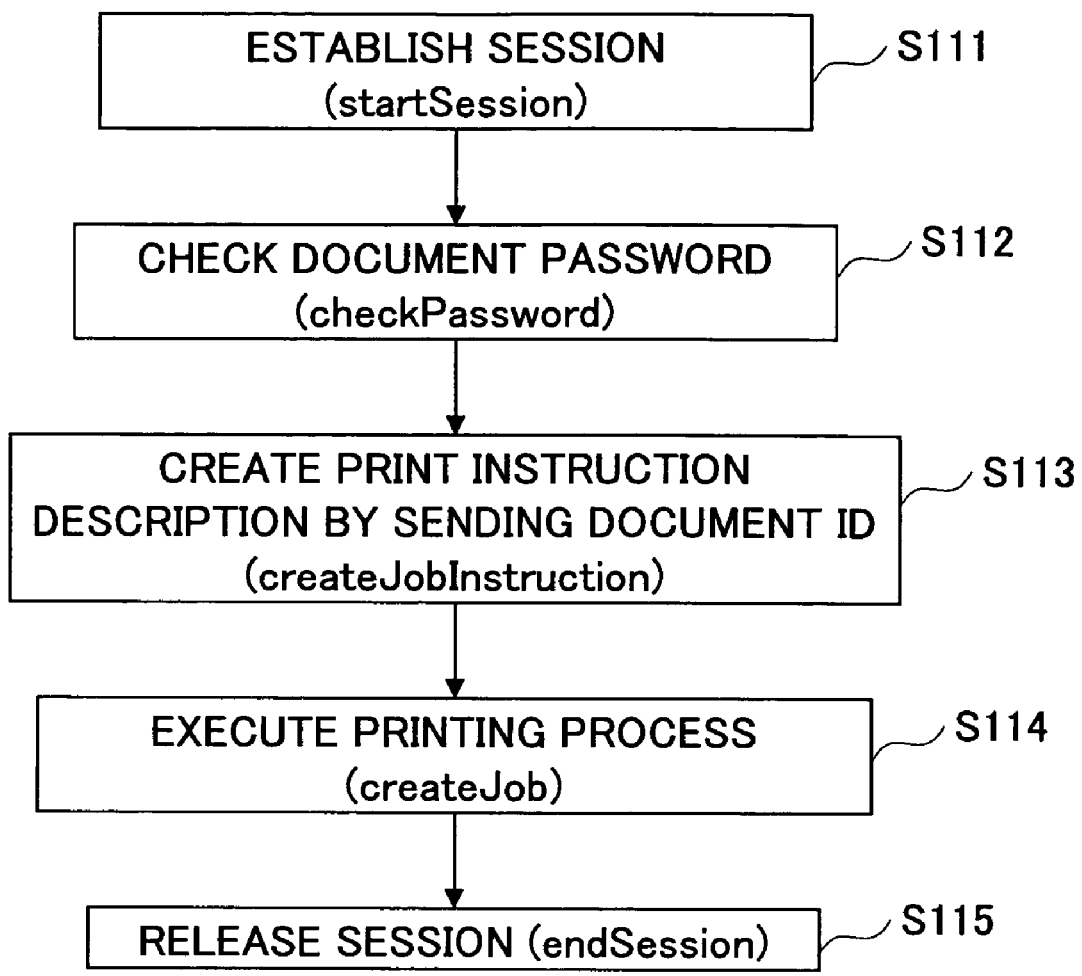
FIG. 28 is a flowchart for explaining a fourth printing process in the case in that the ticket is not used, according to the first embodiment of the present invention.

FIG. 28 is a flowchart for explaining a fourth printing process in the case in that the ticket is not used, according to the first embodiment of the present invention. In FIG. 28, the client PC 10 establishes a session with the print service execution part 1400 of the multi-functional apparatus 1200 through the network 15 (step S111). After the session with the print service execution part 1400 is established, the client PC 10 sends a command checkPassword for the repository service execution part 1410 to check the document password (step S112).

When the validity of accessing to the document is confirmed by the document password, the client PC 10 requests the print service execution part 1400 to create the print instruction description 32 by sending the document ID identifying the image data 30 (step S113). The client PC 10 instructs the print service execution part 1400 to execute the printing process by sending a command createJob (step S114).

The client PC 10 releases the session with the print service execution part 1400 of the multi-functional apparatus 1200 by sending a command endSession (step S115)

As described above, the validity of accessing to the image data 30 is determined based on the document password of the image data 30 (document), and the client PC 10 simply sends the print instruction to the print service execution part 1400 of the multi-functional apparatus 1200. Accordingly, it is not required to transmit entities of the image data 30 (document) and the print instruction description 32 through the network 15. Thus, a transmission to the multi-functional apparatus 1200 can be effectively conducted.

In the following, a command flow in a case in that the ticket is not used will be described with reference to FIG. 29 through FIG. 31. First, a case, in that a session between the Web service and the client PC 10 is managed for each Web service function executing the Web service, will be described. In this case, a session is managed for each of the print service execution part 1400 and the repository service execution part 1410.

Figure 29:
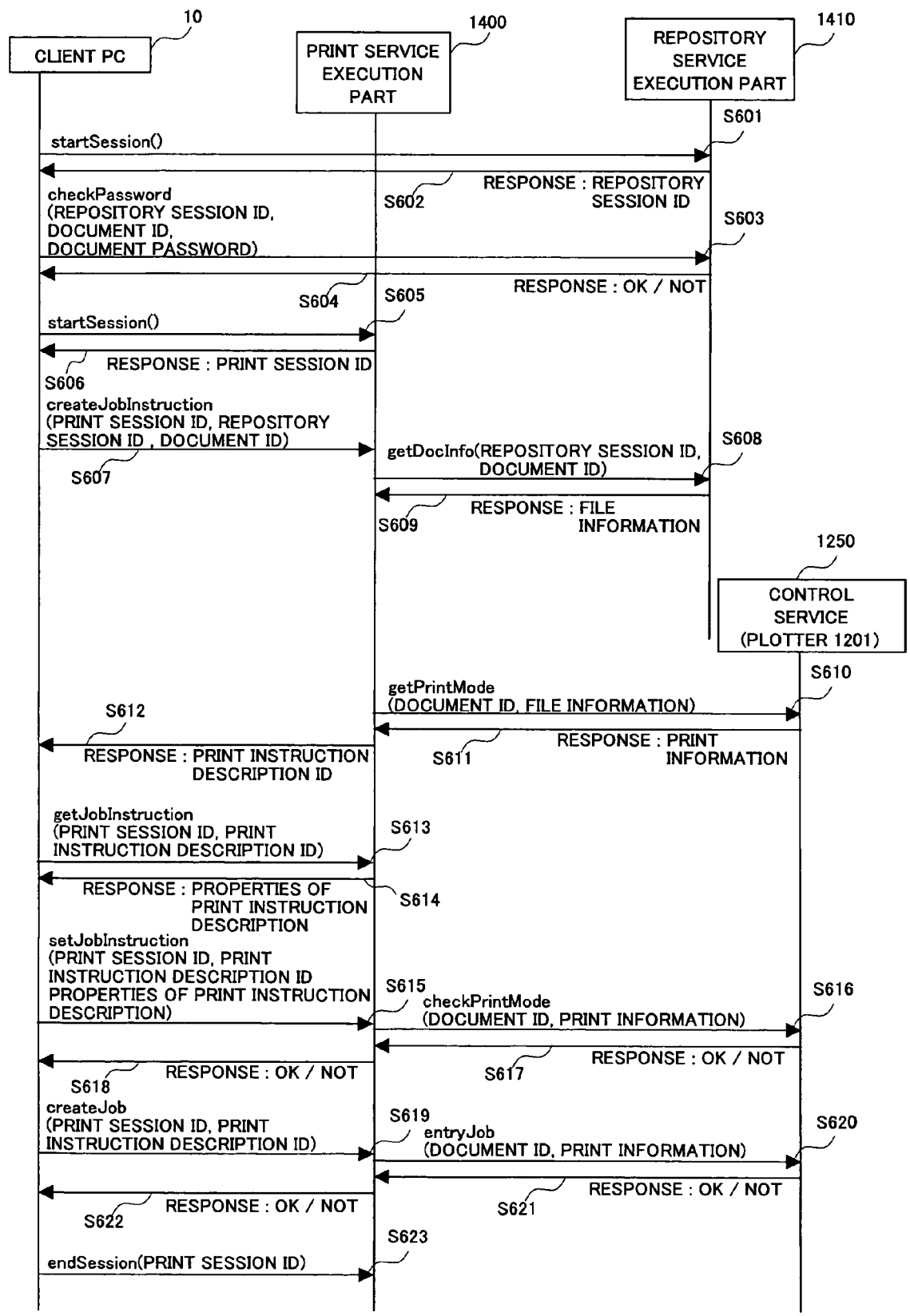
FIG. 29 is a diagram showing a first command flow in a case in that the ticket is not used, according to the first embodiment of the present invention.

FIG. 29 is a diagram showing a first command flow in a case in that the ticket is not used, according to the first embodiment of the present invention. In FIG. 29, when the client PC 10 sends a command startSession( ) to the repository service execution part 1410 (step S601), the repository service execution part 1410 responds by repository session ID (step S602) Then, a session is established between the client PC 10 and the repository service execution part 1410.

When the session is established, the client PC 10 sends a command checkPassword(repository session ID, document ID, document password) to the repository service execution part 1410 in order to confirm the validity of accessing the image data 30 (document) (step S603). The repository service execution part 1410 checks the validity of accessing the image data 30 identifying the document ID by the document ID and the document password, and responds by a check result (step S604).

Next, the client PC 10 sends a command startSession( ) to the print service execution part 1400 (step S605), and the print service execution part 1400 responds by the print session ID to the client PC10 (step S606). Thus, a session between the client PC 10 and the print service execution part 1400 is established.

After the session is established, the client PC 10 requests the print service execution part 1400 to create the print instruction description 32 by sending a command createJobInstruction(print session ID, repository session ID, document ID) (step S607).

When the print service execution part 1400 receives the request of creating print instruction description 32 from the client PC 10, the print service execution part 1400 sends a command getDocInfo(repository session ID, document ID) to the repository service execution part 1410 (step S608), and the repository service execution part 1410 responds by the file information 31 (step S609)

The print service execution part 1400 sends a command getPrintMode(document ID, file information 31) to the control service 1250 (step S610), the control service 1250 responds by the print information 33 (step S611). The print information 33 shows specific information concerning the print function.

The print service execution part 1400 creates the print instruction description 32 based on the print information 33 obtained from the control service 1250 and sends the print instruction description ID identifying the print instruction description 32 to the client PC 10 as a response to the command createJobInstruction sent from the client PC 10 in the step S607 (step S612).

When the client PC 10 receives the print instruction description ID, the client PC 10 requests the properties of the print instruction description 32 by sending a command getJobInstruction(print session ID, print instruction description ID) to print service execution part 1400 (step S613). The print service execution part 1400 responds to the client PC 10 by sending the properties of the print instruction description 32 corresponding to the print instruction description ID (step S614).

The client PC 10 sends a command setJobInstruction(print session ID, print instruction description ID, properties of the print instruction description 32) to the print service execution part 1400 in order to change the properties of the print instruction description 32 temporarily stored in the print service execution part 1400 into the properties of the print instruction description 32 being changed by the user (step S615). In a case in that the print instruction description 32 des not include the document ID, the document ID may be indicated by the command setJobInstruction.

The print service execution part 1400 creates the print information 33 to inform to the control service 1250, based on the properties of the print instruction description 32 indicated by the command setJobInstruction received from the client PC 10. Then, the print service execution part 1400 sends a command checkPrintMode(document ID, print information 33) to the control service 1250 (step S616). The control service 1250 determines whether or not the printing process can be conducted in accordance with the print information 33 indicated by the command checkPrintMode, and then sends a determination result showing "OK" (possible) or "NOT" (impossible) to the print service execution part 1400 as a response (step S617).

The print service execution part 1400 sends the determination result showing "OK" (possible) or "NOT" (impossible) informed from the control service 1250 as a response to the command setJobInstruction received in the step S615 (step S618).

When the response to the command setJobInstruction shows "OK" (possible), the client PC 10 sends a command createjob(print session ID, print instruction description ID) to the print service execution part 1400 in order to conduct the printing process at the multi-functional apparatus 1200 (step S619). When the print service execution part 1400 receives the command createJOb, the print service execution part 1400 instructs the control service 1250 to execute a print job by sending the sending the command entryJob(document ID, print information 33) (step S620).

The control service 1250 obtains the image data 30 from the repository service execution part 1400 by using the document ID indicated by the command entryJob, and outputs a predetermined medium on which an image is formed by the plotter 1201. The control service 1250 sends a process result showing "OK" (process completion) or "NOT" (process error) as a response to the print service execution part 1400 (step S621).

The print service execution part 1400 sends the process result showing "OK" (process completion) or "NOT" (process error) received from the control service 1250 to the client PC 10 as a response to the command createJob received in the step S619 (step S622).

When the response to the command createJob shows "OK" (process completion), the client PC 10 releases the session with the print service execution part 1400 by sending a command endSession (print session ID) to the print service execution part 1400 (step S623).

Next, a case in that a session is managed in common by a sequence of the Web services which the client PC 10 utilizes will be described with reference to FIG. 30. FIG. 30 is a diagram showing a second command flow in the case in that the ticket is not used, according to the first embodiment of the present invention.

Figure 30:
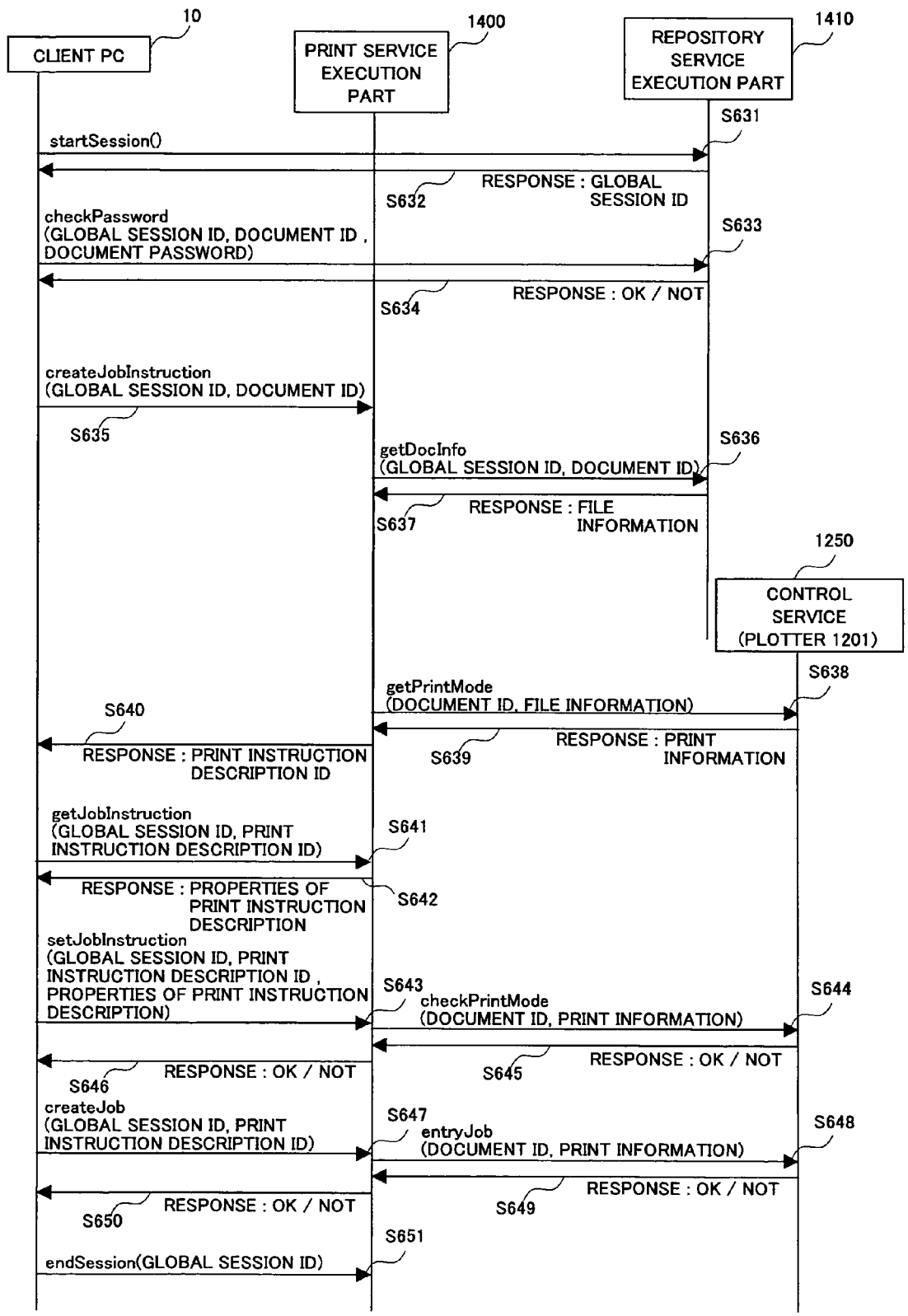
FIG. 30 is a diagram showing a second command flow in the case in that the ticket is not used, according to the first embodiment of the present invention.

In FIG. 30, when the client PC 10 sends a command startsession( ) to the repository service execution part 1400 (step S631), the repository service execution part 1410 responds by a global session ID (step S632). A session between the client PC 10 and the repository service execution part 1410 is established.

When the session is established, the client PC 10 sends a command checkPassword (global session ID, document ID, document password) to the repository service execution part 1410 in order to confirm the validity of accessing the image data 30 (document) (step S633). The repository service execution part 1410 checks the validity of accessing the image data 30 identifying the document ID by the document ID and the document password, and responds by a check result (step S634).

When the session is established between the client PC 10 and the repository service execution part 1410 by the steps S631 and S632, the client PC 10 is not required to establish another session with the print service 1400 since the session is managed by the global session ID.

Accordingly, instead of conducting a process for establishing a session with the print service execution part 1400, the client PC 10 requests the print service execution part 1400 to create the print instruction description 32 by sending a command createJobInstruction(global session ID, repository session ID, document ID) (step S635).

When the print service execution part 1400 receives the request of creating the print instruction description 32 from the client PC 10, the print service execution part 1400 sends a command getDocInfo(global session ID, document ID) to the repository service execution part 1410, and the repository service execution part 1410 responds by the file information 31 (step S637).

The print service execution part 1400 sends the command getPrintMode(document ID, file information 31) to the control service 1250 (step S638), and the control service 1250 responds by the print information 33 (step S639). The print information 33 shows specific information concerning the print function.

The print service execution part 1400 creates the print instruction description 32 based on the print information 33 obtained from the control service 1250, and sends the print instruction description ID identifying the print instruction description 32 to the client PC 10 as a response to the command createJobInstruction received from the client PC 10 in the step S635 (step S640).

When the client PC 10 receives the print instruction description ID, and the client PC 10 requests the property of the print instruction description 32 by sending the command getJobInstruction(global session ID, print instruction description 32) to the print service execution part 1400 (step S641). The print service execution part 1400 responds to the client PC 10 by the property of the print instruction description 32 corresponding to the print instruction description ID (step S642).

The client PC 10 sends a command setJobInstruction(global session ID, print instruction description ID, properties of print instruction description 32) to the print service execution part 1400 in order to change the properties of the print instruction description 32 temporarily stored in the print service execution part 1400 (step S643) When the print instruction description 32 does not include the document ID, the document ID may be indicated by the command setJobInstruction.

The print service execution part 1400 creates the print information 33 to inform to the control service 1250 based on the properties of the print information 32 indicated the command setJobInstruction received from the client PC 10. Then, the print service execution part 1400 sends a command checkPrintMode(document ID, print information 33) to the control service 1250 (step S644), and the control service 1250 determines whether or not the printing process can be conducted in accordance with the print information 33 indicated by the command checkPrintMode, and sends a determination result showing "OK" (possible) or "NOT" (impossible) to the print service execution part 1400 as a response (step S645).

The printer service execution part 1400 sends the determination result showing "OK" (possible) or "NOT" (impossible) informed from the control service 1250 as a response to the command setJobInstruction received in the step S645 (step S646).

When the response to the command setJobInsruction shows "OK" (possible), the client PC 10 sends a command createjob(global session ID, print instruction description ID) to the print service execution part 1400 in order to conduct the printing process at the multi-functional apparatus 1200 (step S647). When the print service execution part 1400 receives the command createjob, the print service execution part 1400 instructs the control service 1250 to execute a print job by sending a command entryJOb(document ID, print information 33) (step S648).

The control service 1250 obtains the image data 30 from the repository service execution part 1410 by using the document ID indicated by the command entryJob, and controls the plotter 1201 to form an image on a predetermined medium in accordance with the print information 33 and output the medium. The control service 1250 send a process result showing "OK" (process completion) or "NOT" (process error) as a response to the print service execution part 1400 (step S649).

The print service execution part 1400 sends the process result showing "OK" (process completion) or "NOT" (process error) received from the control service 1250 to the client PC 10 as a response to the command createJob received in the step S649 (step S650).

When the response to the command createJob shows "OK" (process completion), the client PC 10 releases the session by sending a command endSession(global session ID) to the print service execution part 1400 (step S651).

Next, a case in that the client PC 10 checks the validity of accessing the document by the document password for each Web service will be described with reference to FIG. 31.

Figure 31:
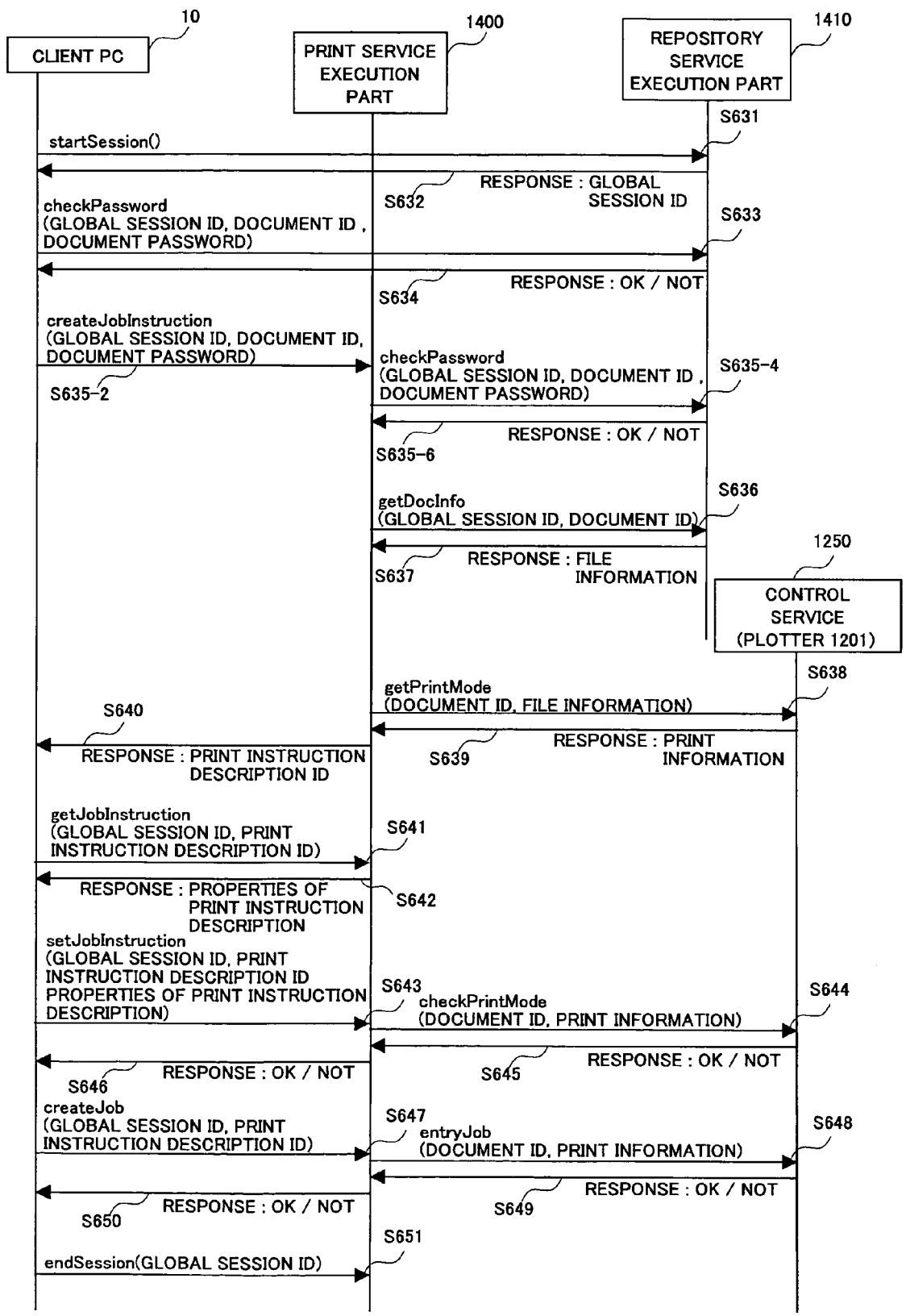
FIG. 31 is a diagram showing a third command flow in the case in that the ticket is not used, according to the first embodiment of the present invention.

FIG. 31 is a diagram showing a third command flow in the case in that the ticket is not used, according to the first embodiment of the present invention. In FIG. 31, steps that are the same as the ones in FIG. 30 are indicated by the same reference numerals and the explanation thereof will be omitted. In the third command flow shown in FIG. 31, different from the second command flow shown in FIG. 30, when the client PC 10 connects to the repository service execution part 1410 and connects to the print service execution part 1400, the client PC 10 checks the validity of accessing the document. Accordingly, in this case, steps S633 through S637 will be described. The other steps are described as the same as in FIG. 30.

The client PC 10 sends a command checkPassword(global session ID, document ID, document password) to the repository service execution part 1410 in order to confirm the validity of accessing the document (step S633). The repository service execution part 1410 checks the validity of accessing the document identified by the document ID by the document ID and the document password, and responds by a check result (step S634).

Next, the client PC 10 connects to the print service execution part 1400 by sending a command createJobInstruction (global session ID, document ID, document password) (step S635-2). And the client PC 10 connects to the print service execution part 1400 by request to create the print instruction description 32 indicating the document password.

The print service execution part 1400 confirms the validity of accessing the document by sending a command checkPassword(global session ID, document ID, document password) to the repository service execution part 1410 (step S635-4). The repository service execution part 1410 checks the validity of accessing the document by the document ID and the document password, and responds by a check result (step S635-6).

Subsequently, the print service execution part 1400 sends a command getDocInfo (global session ID, document ID) to the repository service execution part 1410 (step S636) and the repository service execution part 1410 responds by the file information 31 (step S637). The following steps are described as the same as the second command flow shown in FIG. 30.

As described above, according to the first embodiment of the present invention, a permission to access the document (image data 30) can be checked by the document password, and the client PC 10 can change the properties obtained from the multi-functional apparatus 1200 and execute the printing process while utilizing existing print indication description 32 corresponding to the document. Moreover, the file information 31 can be changed based on the changed properties and saved.

Figure 32:
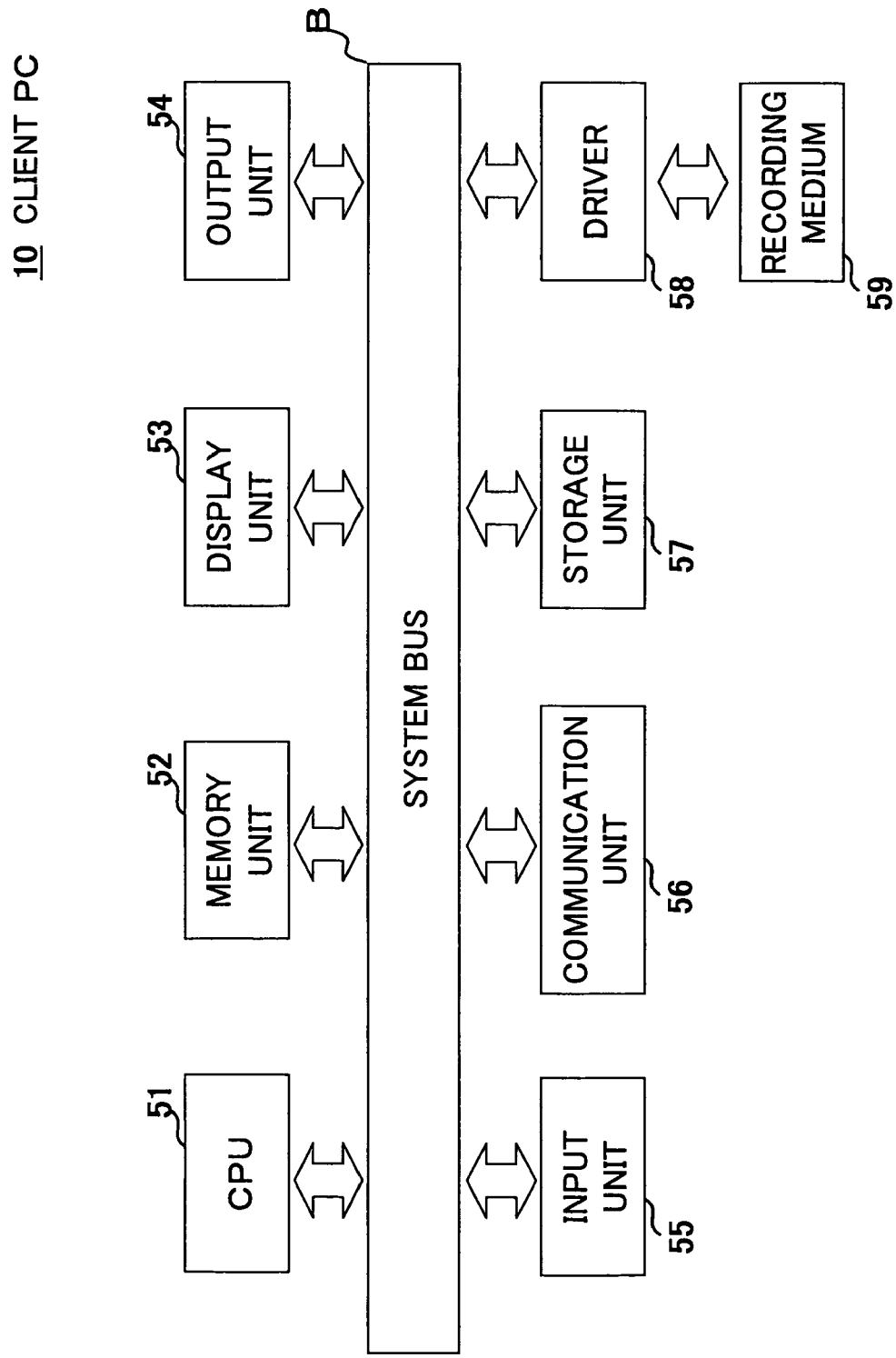
FIG. 32 is a block diagram showing the hardware configuration of the client PC 10 according to the first embodiment of the present invention.

For example, in the first embodiment of the preset invention, the client PC 10 includes a hardware configuration as shown in FIG. 32. FIG. 32 is a block diagram showing the hardware configuration of the client PC 10 according to the first embodiment of the present invention.

In FIG. 32, the client PC 10 is a terminal controlled by a computer, and includes a CPU (Central Processing Unit) 51, a memory unit 52, a display unit 53, an output unit 54, an input unit 55, a communication unit 56, a storage unit 57, and a driver 58, which are mutually connected via a system bus B.

The CPU 51 controls the client PC 10 accordance with programs stored in the memory unit 52. The memory unit 52 includes a RAM (Random Access Memory), a ROM (Read-Only Memory), and a like, and stores the programs executed by the CPU 51, data necessary for processes in the CPU 51, data obtained while the CPU 51 conducts the processes, and a like. The memory unit 52 is partially used to assign as a working area for the CPU 51 to conduct the process.

The display unit 53 is used to display various information necessary under a control by the CPU 51. The output unit 54 includes a printer, and is sued to output various information in response to an instruction from the user. The input unit 55 includes a mouse, a keyboard, or a like, and is used to input various information necessary for the client PC10 to conduct a process. The communication unit 56 is a device for controlling a communication with the multi-functional apparatus 1200 when the client PC 10 is connected to the multi-functional apparatus 1200 through the Internet, a LAN (Local Area Network), or a like. The storage unit 57 includes a hard disk unit, and stores the programs executing various processes, data such as document received from the multi-functional apparatus 1200, and a like.

For example, the program realizing the process conducted by the client PC 10 is installed to the client PC 10 by a recording medium 59 such as a CD-ROM (Compact Disc Read-Only Memory). That is, when the recording medium 59 storing the program is set in the driver 58, the driver 58 reads the program from the recording medium 59 and the program read from the recording medium 59 is installed in the storage unit 57 via the system bus B. When the program is executed, the CPU 51 starts the process in accordance with the program installed to the storage unit 57. It should be noted that the recording medium storing the program is not limited to the CD-ROM but various computer-readable recording media can be used. The program for realizing the process according to the present invention may be downloaded by the communication unit 56 through the network, and installed to the storage unit 57.

Moreover, an information processing apparatus as the client PC 10 according to the present invention can be realized by installing or downloading a computer-executable program for causing a computer functioned as an information processing apparatus to conduct a process instruction to an apparatus for executing a process, the program including the codes for: (a) obtaining instruction description identification specifying a process instruction description from an apparatus for executing a process, the instruction description identification setting process items; and (b) indicating the instruction description identification obtained by the code (b) and sending a process instruction instructing an execution of the process.

Second Embodiment

A functional configuration and a hardware configuration functional configuration of a multi-functional apparatus 1200 according to a second embodiment are the same as those shown in FIG. 1 and FIG. 2, respectively in the first embodiment and the explanation thereof will be omitted. Also, a hardware configuration of a client PC 10 according to the second embodiment is the same as that shown in FIG. 32 in the first embodiment and the explanation thereof will be omitted. In the second embodiment, parts that that are the same as the ones in the first embodiment are indicated by the same reference numerals and the explanation thereof will be omitted.

Figure 33:
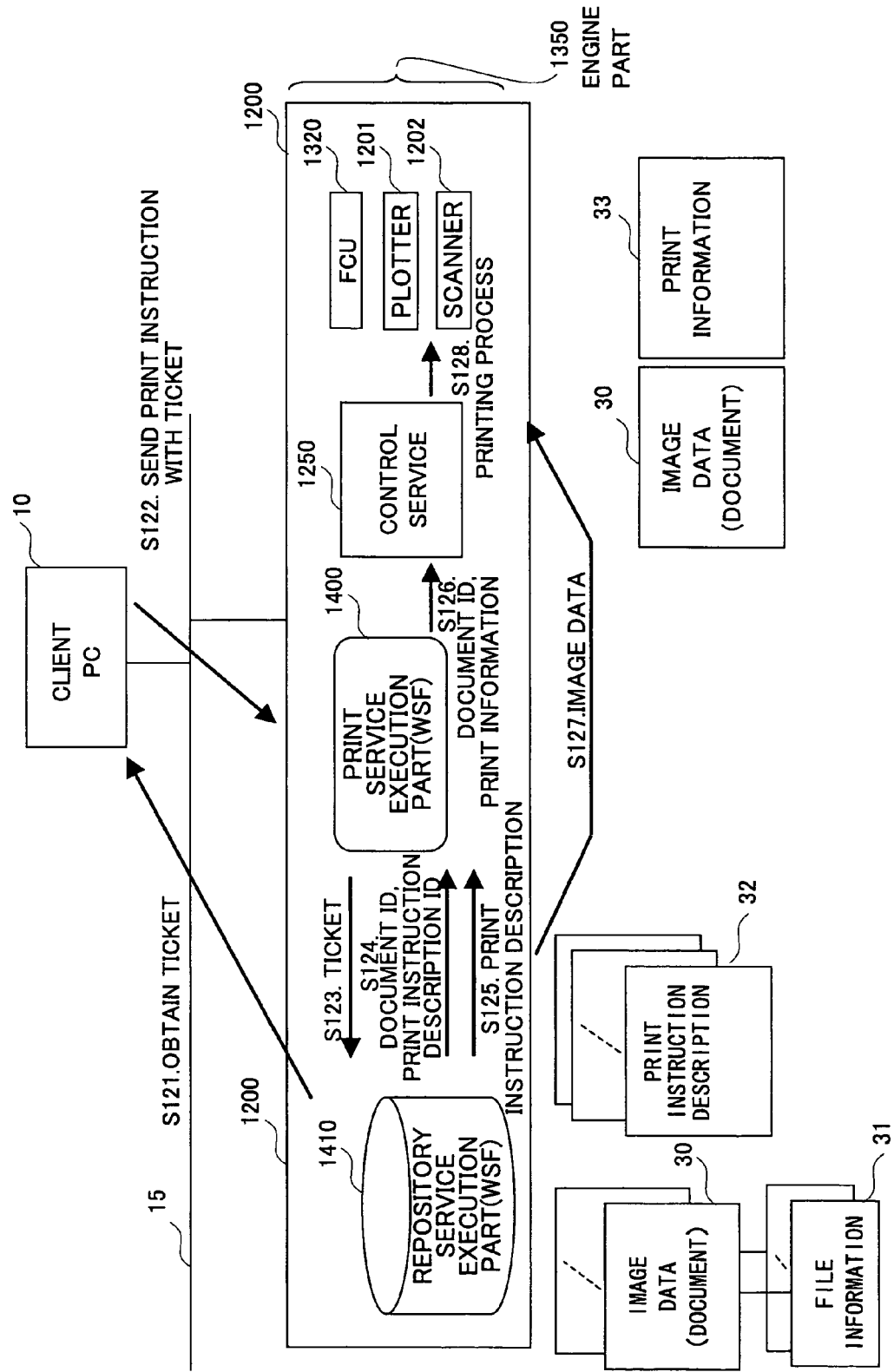
FIG. 33 is a diagram for broadly explaining a first printing process in that a ticket is used, according to the second embodiment of the present invention.

In the following, a printing process capable of printing just by indicating a print instruction description will be broadly described with reference to FIG. 33. FIG. 33 is a diagram for broadly explaining a first printing process in that a ticket is used, according to the second embodiment of the present invention. In FIG. 33, the multi-functional apparatus includes a print service execution part 1400, a repository service execution part 1410, a control service 1250, and an engine part 1350. A communication between the print service execution part 1400 and the repository service execution part 1410 is conducted by internally issued commands.

A communication between the multi-functional apparatus 1200 and the client PC 10 as a computer terminal through a network 15 is controlled in accordance with an HTTP.

The repository service execution part 1410 accumulates and manages image data 30 and file information 31 concerning the image data 30 by corresponding to the image data 30, and accumulates and manages print instruction descriptions 32 separately from the image data 30. Moreover, the repository service execution part 1410 issues a ticket to utilize the image data 30 and the print instruction description 32 showing a print condition, which are selected by a user. The repository service execution part 1410 provides a Web service to utilize the image data 30 and the print instruction description 32 by permitting the user having the ticket to utilize the image data 30 and the print instruction description 32 indicated by the ticket.

In a case in that the client PC 10 requests the Web service in accordance with the SOAP, the multi-functional apparatus 1200 provides the Web service in accordance with the SOAP. In a case in that the client PC 10 requests the Web service by using a Web browser, each of the multi-functional apparatus 1200 and the repository apparatus 20 provides the Web service by using HTML (Hypertext Transfer Markup Language).

The file information 31 includes the print condition at a time when the image data 30 (document) is initially accumulated. The print instruction description 32 is created based on the file information 31 by the print service execution 1400, and managed by the repository service execution part 1410.

The client PC 10 obtains a ticket for utilizing the image data 30 desired by the user from the repository service execution part 1410 of the repository apparatus 20 (step S121), Next, the client PC 10 sends a print instruction to the print service execution part 1400 of the multi-functional apparatus 1200 by the ticket (step S122) The print service execution part 1400 requests a document ID identifying the image data 30 (the document) and the print instruction description ID, which are desired by the user, of the repository service execution part 1410 by using the ticket received from the client PC 10 (step S123).

After the repository service execution part 1410 checks that the ticket received in the step S123 is the ticket issued in the step S121, the repository service execution part 1410 sends the document ID and the print instruction description ID to the print service execution part 1400 (step S124) The print service execution part 1400 obtains the print instruction description 32 from the repository service execution part 1410 by using the print instruction description ID (step S125).

The print service execution part 1400 informs the document ID and the print information 33 set in the print instruction description 32 obtained from the repository service execution part 1410, to the control service 1250 (step S126).

The control service 1250 obtains the image data 30 from the repository service execution part 1410 based on the document ID informed from the print service execution part 1400 (step S127) and conducts an image forming process based on the image data 30 in accordance with the print information 33 (step S128). That is, the control service 1250 controls the engine part 1350 (plotter 1201) to form an image on a predetermined medium and output the predetermined medium on which the image is formed.

The repository service execution part 1410 maintains the image data 30 directed to the image forming process (for example, a printing process) and the print instruction description 32 separately each other. Accordingly, the user of the client PC 10 can select the image data 30 (document) and the print instruction description 32 as the user desires.

Figure 34:
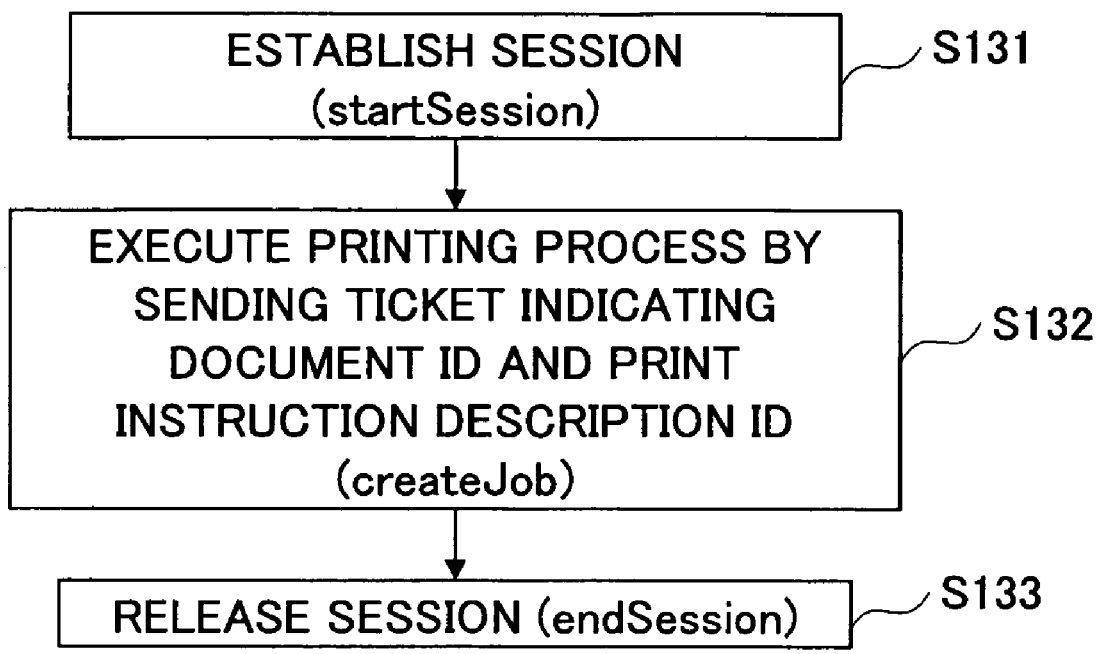
FIG. 34 is a flowchart for explaining the first printing process in that the ticket is used, according to the second embodiment of the present invention.

Next, the first printing process at the client PC 10 will be described with reference to FIG. 34. FIG. 34 is a flowchart for explaining the first printing process in that the ticket is used, according to the second embodiment of the present invention.

In FIG. 34, the client PC 10 sends a command startSession through the network 15 to establish a connection with the multi-functional apparatus 1200 (step S131).

After the session is established, the client PC 10 sends the ticket for permitting utilizing the image data 30 (document) and the print instruction description 32 desired by the user and obtained from the repository service execution part 1410 and instructs the print service execution part 1400 to execute the printing process, by sending a command createJob (step S132).

Subsequently, the client PC 10 sends a command endSession to release the session with the print service execution part 1400 of the multi-functional apparatus 1200 (step S133).

As described above, after the client PC 10 obtains the ticket from the repository service execution part 1410 beforehand, since the client PC 10 simply sends the print instruction to the print service execution part 1400 of the multi-functional apparatus 1200 and entities of the image data 30 (document) and the print instruction description 32 are not required to transmit through the network 15, a transmission to the multi-functional apparatus 1200 can be effectively conducted.

The client PC 10 is not required to physically connect to the network 15. For example, the client PC 10 may be connected by a wireless LAN (Local Area Network). Alternatively, since the entity of the image data 30 (document) is not necessary to be transmitted, the user may use a mobile phone or a like to connect to the print service of the multi-functional apparatus 1200 and the repository service execution part 1410 through the Internets.

Figure 35:
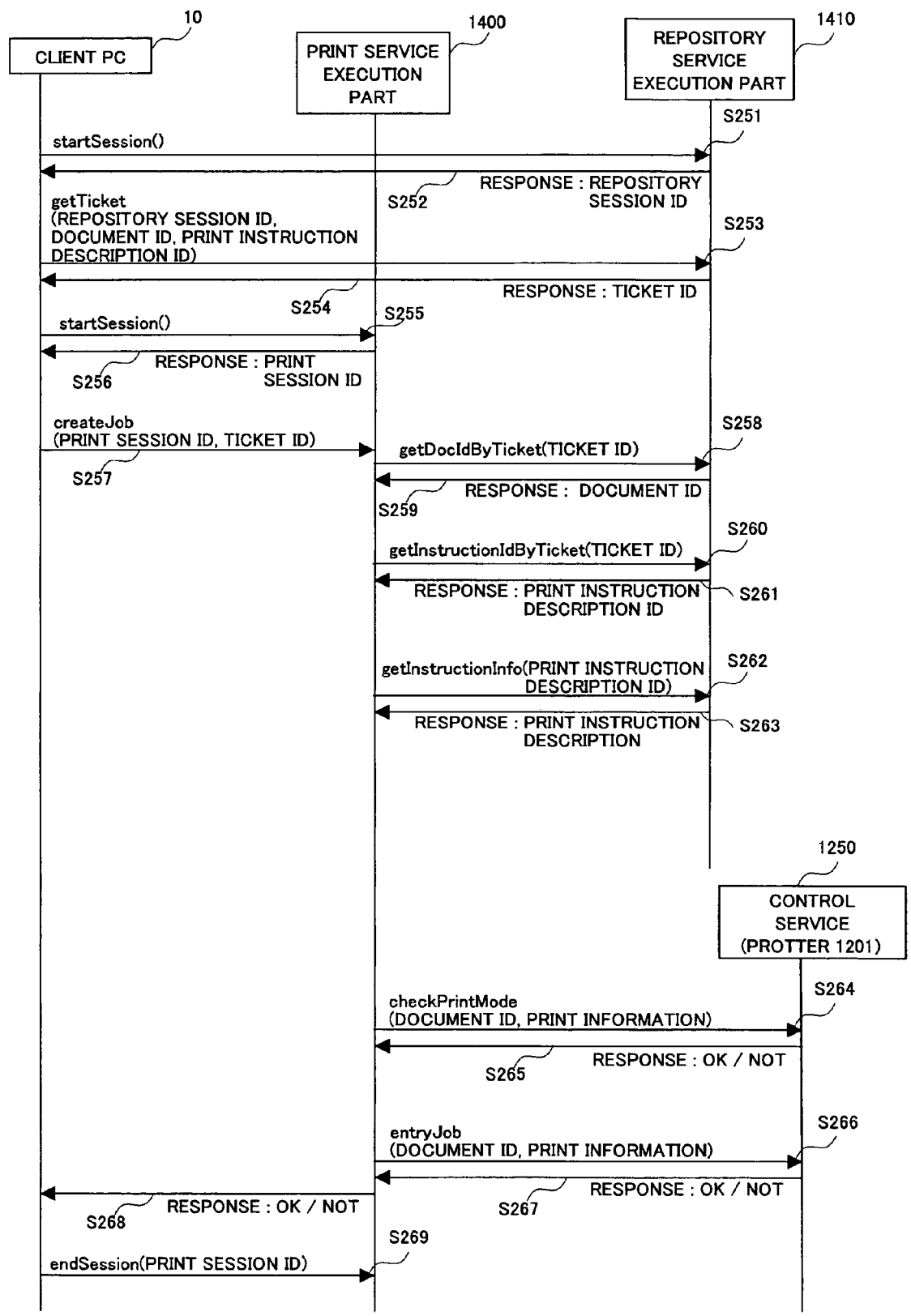
FIG. 35 is a diagram showing a command flow in a second printing process in that the ticket is used, according to the second embodiment of the present invention.

FIG. 35 is a diagram showing a command flow in a second printing process in that the ticket is used, according to the second embodiment of the present invention. In FIG. 35, when the client PC 10 sends the command startSession to the repository service execution part 1410 (step S251), the repository service execution part 1410 responds by a session ID (step S252). A session is established between the client PC 10 and the repository service execution part 1410.

When the session is established, the client PC sends a command getTicket(repository session ID, document ID) to the repository service execution part 1410 to obtain the ticket for utilizing the image data 30 (document) and the print instruction description 32 which are desired by the user (step S253). The repository service execution part 1410 issues a ticket ID corresponding to the repository session ID, the document ID, and the print instruction description ID and responds by the ticket ID (step S254).

Next, the client PC 10 sends the command startSession to the print service execution part 1400 (step S255). The print service execution part 1400 responds by the print session ID to the client PC 10 (step S256). A session is established between the client PC 10 and the print service execution part 1400.

When the session is established, the client PC 10 sends a command createjob(print session ID, ticket ID) to request the print service execution part 1400 to instruct to conduct the printing process at the multi-functional apparatus 1200 (step S257).

When the print service execution part 1400 receives the print instruction from the client PC 10, the print service execution part 1400 sends a command getDocIdByTicket (ticket ID) with respect to the repository service execution part 1410 (step S258), and the repository service execution part 1410 responds by the document ID (step S259). Moreover, the print service execution part 1400 sends a command getInstructionIdByTicket(ticket ID) to the repository service execution part 1410 (step S259), and the repository service execution part 1410 responds by the print instruction description ID (step S261).

Subsequently, the print service execution part 1400 sends a command getInstructionInfo(print instruction description ID) to the repository service execution part 1410 (step S262), and the repository service execution part 1410 responds by the print instruction description 32 corresponding to the print instruction description ID (step S263).

The print service execution part 1400 creates the print information 33 to inform to the control service 1250 based on properties of the print instruction description 32 obtained from the repository service execution part 1410.

The print service execution part 1400 sends a command checkPrintMode(document ID, print information 33) to the control service 1250 (step S264), and the control service 1250 determines whether or not the printing process can be executed in accordance with the print information 33 indicated by the checkPrintMode and sends a determination result showing "OK" (possible) or "NOT" (impossible) as a response for the printing service execution part 1400 (step S265).

When the response for the command checkPrintMode shows "OK" (possible), the print service execution part 1400 instructs to execute a print job by sending a command entryJob(document ID, print information 33) (step S266).

The control service 1250 obtains the image data 30 from the repository service execution part 1400 by using the document ID indicated by the command entryJob, and forms and outputs an image on a predetermined medium by the plotter 1201. The control service 1250 sends this process result showing "OK" (process completion) or "NOT" (process error) as a response to the print service execution part 1400 (step S267).

The print service execution part 1400 sends the process result showing "OK" (process completion) or "NOT" (process error) received from the control service 1250 as a response to the command createjob in the step S257 for the client PC 10 (step S268).

The client PC 10 sends an endSession(print session ID) to the print service execution part 1400 to release the session with the print service execution part 1400 (step S225).

As described in FIG. 33 and FIG. 35, the print instruction description 32 already stored is not changed and repeatedly utilized. In the following, a case in that the print instruction description 32 already stored is changed and the printing process is conducted will be described with reference to FIG. 36 through FIG. 38.

Figure 36:
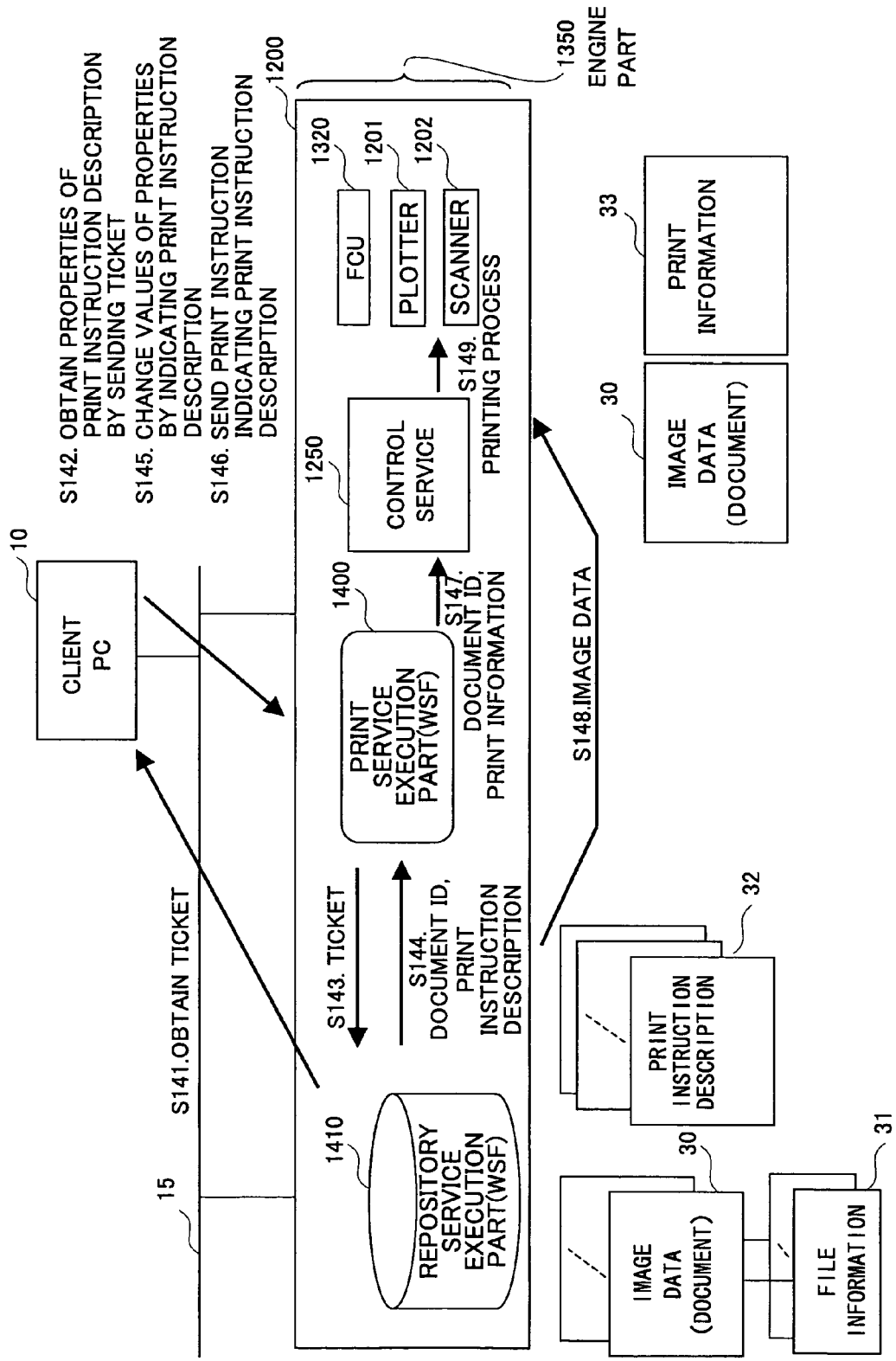
FIG. 36 is a diagram for broadly explaining the second printing process in a case in that the print options are changed by the user, according to the second embodiment of the present invention.

FIG. 36 is a diagram for broadly explaining the second printing process in a case in that the print options are changed by the user, according to the second embodiment of the present invention. In FIG. 36, the client PC 10 indicates the image data 30 and the print instruction description 32, which are desired by the user, from the repository service execution part 1410, and obtains a ticket to utilize the image data 30 and the print instruction description 32 (step S141).

After that, the client PC 10 requests properties showing contents of the print instruction description 32 of the print service execution part 1400 of the multi-functional apparatus 1200 by sending the ticket to the print service execution part 1400 (step S142). The print service execution part 1400 requests the document ID and the print instruction description 32 of the repository service execution part 1410 by sending the ticket received from the client PC 10 (step S143)

After the repository service execution part 1410 confirms that the ticket received in the step S143 is the ticket issued in the step S141, and provides the document ID and the print instruction description 32 to the print service execution part 1400 (step S144). The print service execution part 1400 sends the print instruction description 32 obtained from the repository service execution part 1410.

The client PC 10 instructs the print service execution part 1400 to change values of the properties which are changed by the user (step S145). Subsequently, the client PC 10 sends a print instruction indicating the print instruction description 32 to the print service execution part 1400 of the multifunctional apparatus 1200 (step S146). The print service execution part 1400 informs the document ID and the print information 33 based on the print instruction description 32 in which the properties are changed, to the control service 1250 (step S147).

The control service 1250 obtains the image data 30 from the repository service execution part 1410 based on the document ID informed from the print service execution part 1400 (step S148) and conducts an image forming process based on the image data 30 in accordance with the print information 33 (step S149). That is, the control service 1250 controls the engine part 1350 (plotter 1201) to form an image on a predetermined medium and output the predetermined medium on which the image is formed.

In the second printing process in the step S147, the print service execution part 1400 may change the file information 32 based on the print instruction description 32 in which the values of the properties are changed. Accordingly, the file information 32 can be maintained to show the latest values of the properties by the repository service execution part 1410.

Figure 37:
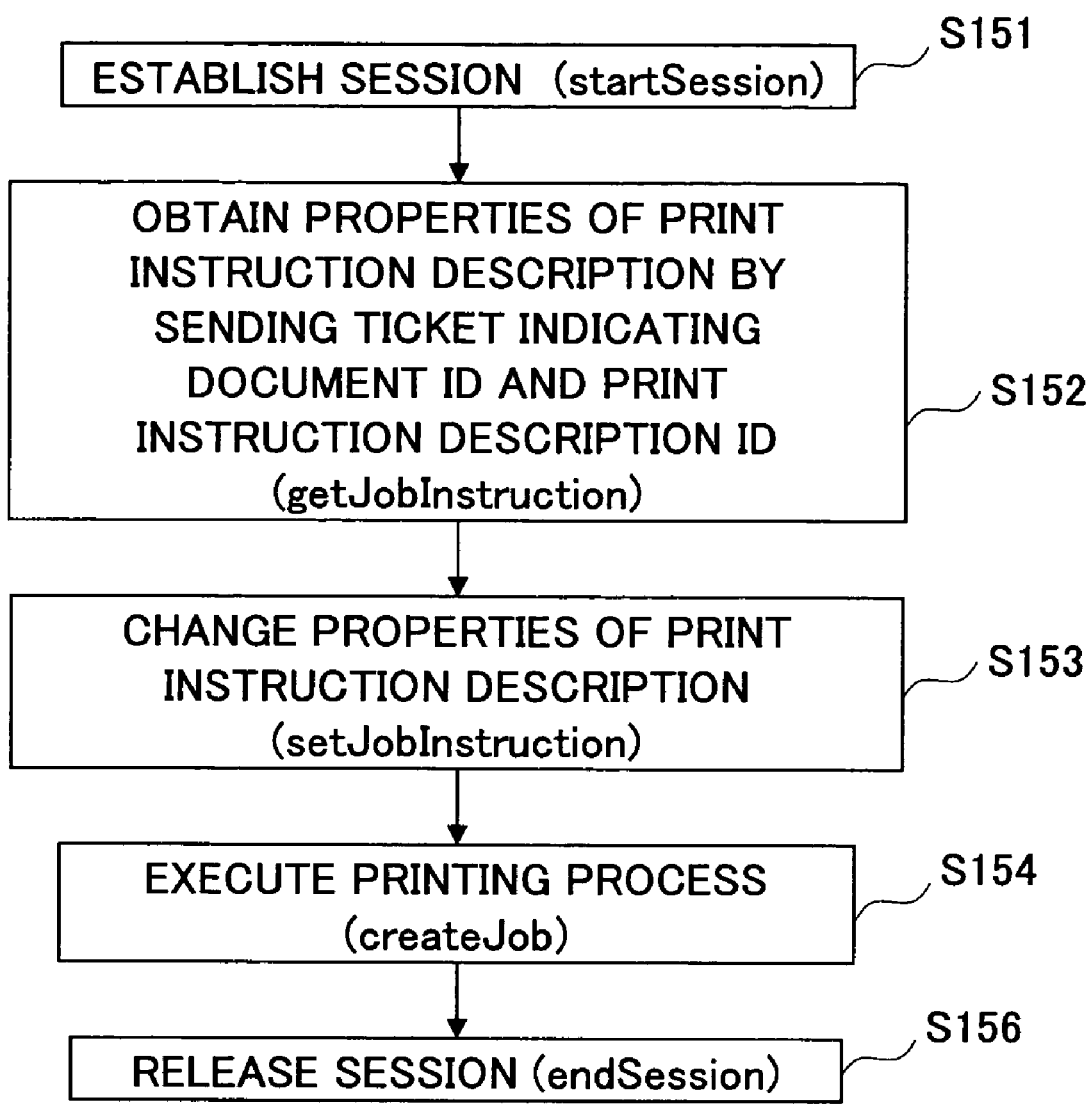
FIG. 37 is a flowchart for explaining the second printing process in the case in that the print options are changed, according to the first embodiment of the present invention.

Next, in a case in that at the client PC 10, for example, the print options such as "with or without punches", "with or without staples", or a like are changed, a printing process will be described with reference to FIG. 37. FIG. 37 is a flowchart for explaining the second printing process in the case in that the print options are changed, according to the first embodiment of the present invention.

In FIG. 37, the client PC 10 sends a command startSession through the network 15 to establish a session with the print service execution part 1400 of the multi-functional apparatus 1200 (step S151).

After the session is established, the client PC 10 sends a command getJobInstruction to the print service execution service 1400 to send a ticket, which is obtained from the repository service execution part 1410 and allows the user to utilize the image data 30 (document) and the print instruction description 32 desired by the user, to the print service execution part 1400, and obtains properties showing the contents of the print instruction description 32 from the repository service execution part 1410 (step S152).

In response to changes of the print options by the user, the client PC 10 sends a command setJobInstruction to the print service execution part 1400 to instruct the changes of the properties of the print instruction description 32 (step S153) In this case, the client PC 10 simply sends the properties which are changed by the user in all properties, to the print service execution part 1400.

Subsequently, the client PC 10 sends a command createJob to instruct the print service execution part 1400 to execute the printing process (step S154). Then, the client PC 10 sends an endSession to release the session with the print service execution part 1400 (step S155).

Figure 38:
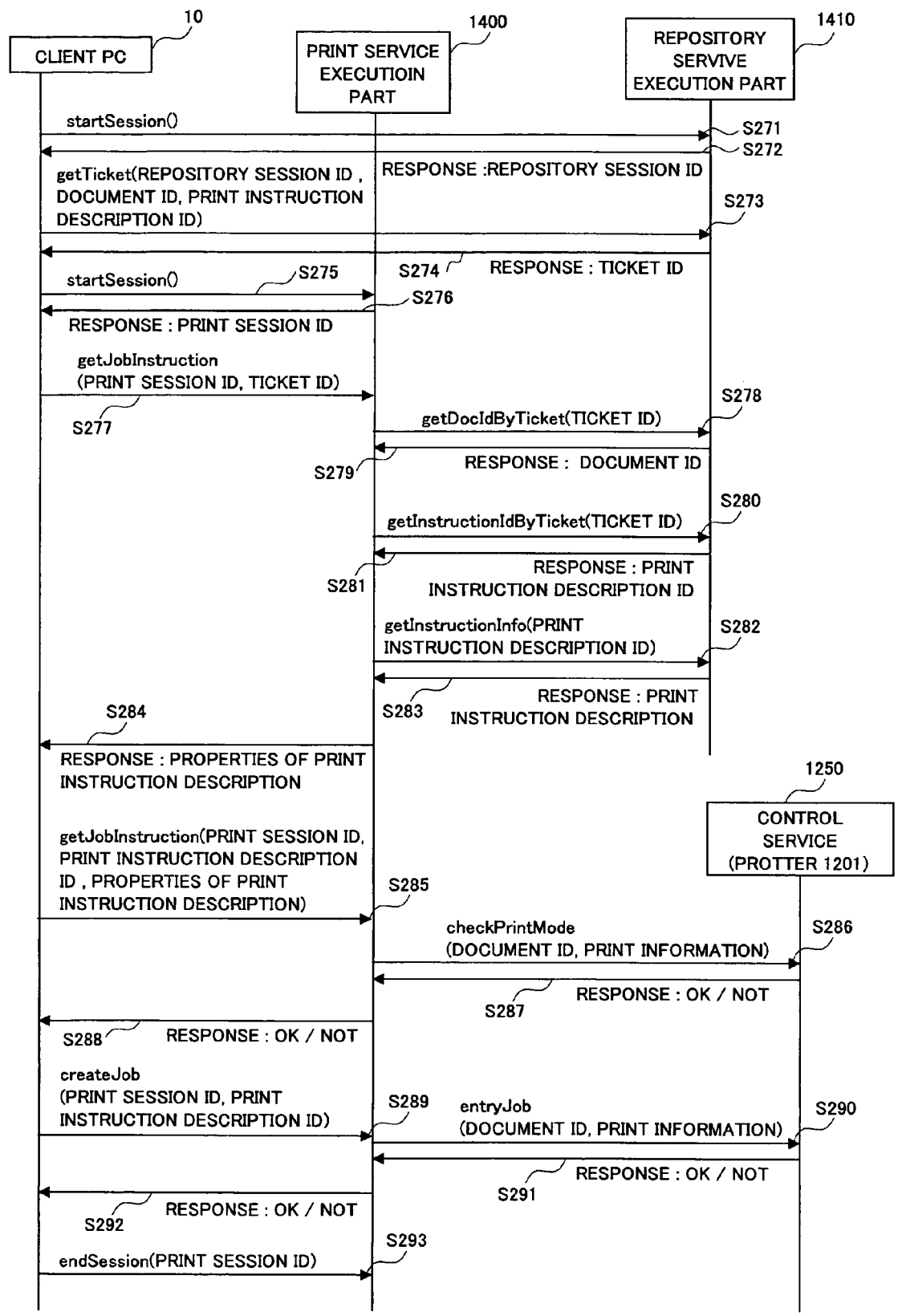
FIG. 38 is a diagram showing a command flow in the second printing process in the case in that the print options are changed, according to the second embodiment of the present invention.

FIG. 38 is a diagram showing a command flow in the second printing process in the case in that the print options are changed, according to the second embodiment of the present invention. In FIG. 38, when the client PC 10 sends the command startSession to the repository service execution part 1410 (step S271), the repository service execution part 1410 responds by a repository session ID (step S272). A session is established between the client PC 10 and the repository service execution part 1410.

When the session is established, the client PC sends a command getTicket(repository session ID, document ID) to the repository service execution part 1410 to obtain the ticket for utilizing the image data 30 (document) desired by the user (step S273). The repository service execution part 1410 issues a ticket ID corresponding to the repository session ID and the document ID and responds by the ticket ID (step S274).

Next, the client PC 10 sends the command startSession to the print service execution part 1400 (step S275). The print service execution part 1400 responds by the session ID to the client PC 10 (step S276). A session is established between the client PC 10 and the print service execution part 1400.

When the session is established, the client PC 10 sends a command getJobInstruction(print session ID, ticket ID) to request properties of the print instruction description 32 of the print service execution part 1400 (step S277).

When the print service execution part 1400 receives a request of the properties of the print instruction description 32, the print service execution part 1400 sends a command getDocIdByTicket(ticket ID) to the repository service execution part 1410 (step S278). The repository service execution part 1410 responds by the document ID (step S279). Moreover, the print service execution part 1400 sends a command getInstructionIdByTicket (ticket ID) to the repository service execution part 1410 (step S280), and the repository service execution part 1410 responds by the print instruction description ID (step S281).

Subsequently, the print service execution part 1400 sends a command getInstructionInfo(print instruction description ID) to the repository service execution part 1410 (step S282), and the repository service execution part 1410 responds by the print instruction description 32 corresponding to the print instruction ID (step S283).

The print service execution part 1400 responds by the properties of the print instruction description 32 obtained from the repository service execution part 1410, with respect to the step S277 to the client PC 10 (step S284).

The client PC 10 sends a command setJobInstruction(session ID, print instruction description ID, properties of the print instruction description 32) to the print service execution part 1400 in order to change the properties of the print instruction description 32 being stored by the print service execution part 1400 based on the properties of the print instruction description 32 which are changed when the user sets the print options (step S285). When the print instruction description 32 does not include the document ID, the client PC 10 indicates the document ID by the command setJobInstruction.

The print service execution part 1400 creates the print information 33 to inform to the control service 1250 based on the properties of the print instruction description 32 indicated by the command setJobInstruction.

The print service execution part 1400 sends a command checkPrintMode(document ID, print information 33) to the control service 1250 (step S286). The control service 1250 determines whether or not the printing process can be conducted in accordance with the print information 33 indicated by the command checkPrintMode, and sends a determination result showing "OK" (possible) or "NOT" (impossible) as a response for the printing service execution part 1400 (step S287).

The print service execution part 1400 sends the determination result showing "OK" (possible) or "NOT" (impossible) received from the control service 1250 as a response to the command setJobInstruction in the step S285 to the client PC 10 (step S288).

The client PC 10 sends a command createJob (print session ID, print instruction description ID) to the print service execution part 1400 in order to have the multi-functional apparatus 1200 conducted the printing process when the response of the command setJobInstruction shows "OK" (possible) (step S289).

When the print service execution part 1400 receives the command createjob, the print service execution part 1400 sends a command entryJob(document ID, print information 33) to the control service 1250 to instruct to execute a print job (step S290).

The control service 1250 obtains the image data 30 from the repository service execution part 1400 by using the document ID indicated by the command entryJob, and forms and outputs an image on a predetermined medium by the plotter 1201. The control service 1250 sends this process result showing "OK" (process completion) or "NOT" (process error) as a response to the print service execution part 1400 (step S291).

The print service execution part 1400 sends the process result showing "OK" (process completion) or "NOT" (process error) received from the control service 1250 as a response to the command createjob in the step S221 for the client PC 10 (step S292).

The client PC 10 sends an endSession(session ID) to the print service execution part 1400 to release the session with the print service execution part 1400 (step S293).

Structures of the file information 33 concerning the image data 30 provided from the repository service execution part 1410, the print information 33 provided from the control service 1250, and the print instruction 32 provided from the print service execution part 1400 to client PC 10 are the same as the structures shown in FIG. 8 through FIG. 10 in the first embodiment, and the explanations thereof will be omitted.

In the second printing process, the client PC 10 sends the changed properties of all properties of the print instruction description 32 obtained from the print service execution part 1400, to the multi-functional apparatus 1200. Then, the multi-functional apparatus 1200 changes the print instruction description 32 already created by the print service execution part 1400, based on the change properties sent from the client PC 10. Accordingly, the client PC 10 can conduct the printing process by simply indicating the changed properties of the print instruction description 32 In the second embodiment of the present invention, the repository service execution part 1410 can be provided to a repository apparatus 20 different from the multi-functional apparatus 1200. In this case, in a case in that the multi-functional apparatus 1200 conducts the second printing process with the plurality of the client PCs 10, the multi-functional apparatus 1200 is needed to maintain a plurality of the print instruction descriptions 32 until receives the print instruction from each client PC 10. In order to effectively use a storage area for maintaining the print instruction 32, it can be considered that each client PC 10 creates the print instruction 32 including changed properties.

A case in that the client PC 10 creates the print instruction description 32 which properties are changed will be described with reference to FIG. 39 through FIG. 41.

Figure 39:
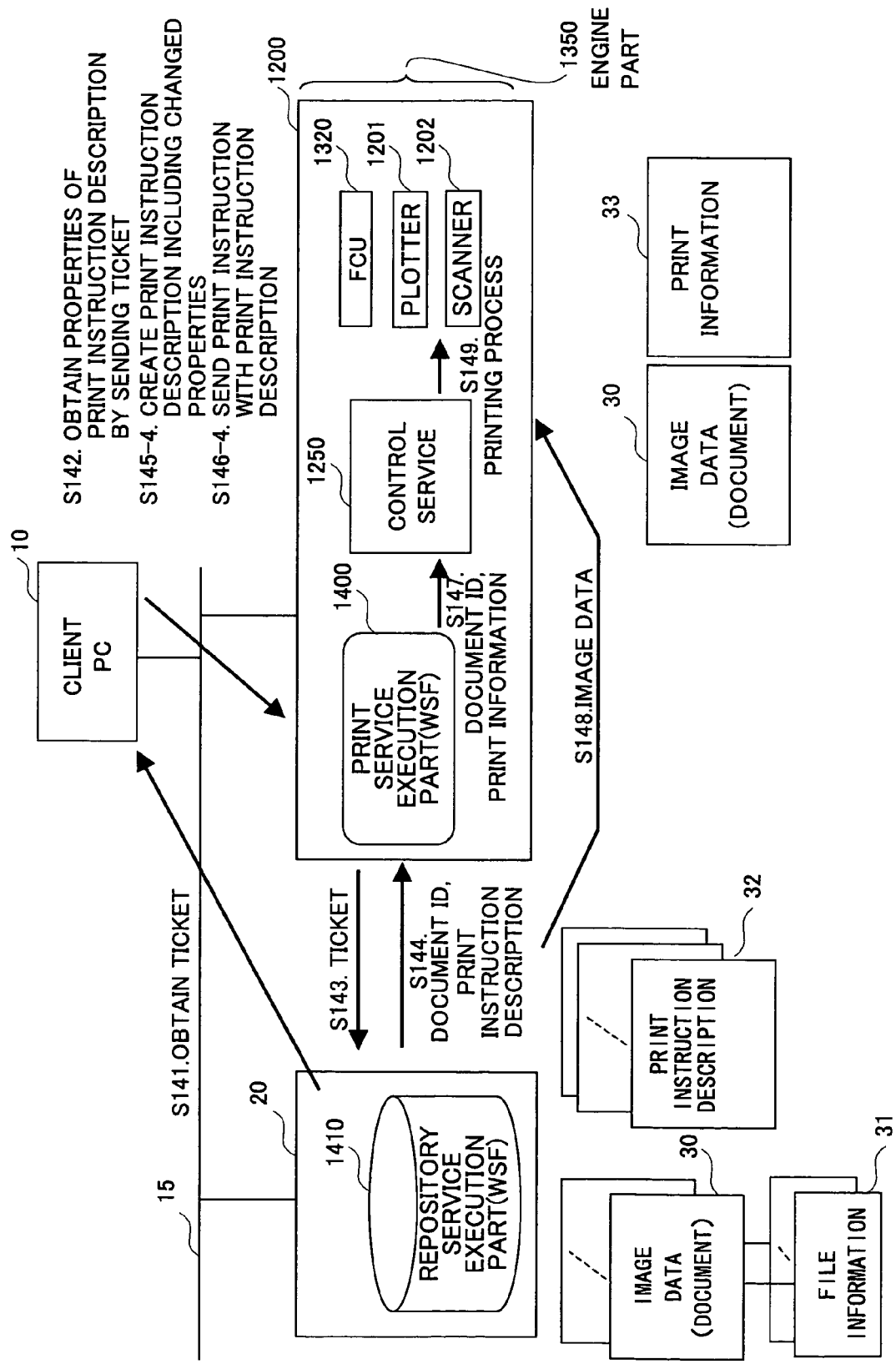
FIG. 39 is a diagram for broadly explaining a third print process in the case in that the print options are changed, according to the first embodiment of the present invention.

FIG. 39 is a diagram for broadly explaining a third print process in the case in that the print options are changed, according to the first embodiment of the present invention. In FIG. 39, parts that are the same as the ones in FIG. 36 are indicated by the same reference numerals and the explanation thereof will be omitted.

In FIG. 39, the print service execution part 1400 creates the print instruction description 32, sends the properties of the print instruction description 32, and then, deletes the print instruction description 32 from a predetermined storage area.

On the other hand, the client PC 10 changes the properties of the print instruction description 32 and creates the print instruction description 32 which indicates all properties including the changed properties (step S145-4). The client PC 10 sends the print instruction to the print service execution part 1400 by sending the print instruction description 32 which is created (step S146-4) The print service execution part 1400 informs the document ID and the print information 33 to the control service 1250 based on the print instruction description 32 received from the client PC 10 (step S147). The following steps are conducted as the same as described in FIG. 36.

Next, in a case in that at the client PC 10, for example, the print options such as "with or without punches", "with or without staples", or a like are changed, a printing process will be described with reference to FIG. 40. FIG. 40 is a flowchart for explaining the second printing process in the case in that the print options are changed, according to the first embodiment of the present invention. In FIG. 40, parts that are the same as the ones in FIG. 37 are indicated by the same reference numerals and the explanation thereof will be omitted.

Figure 40:
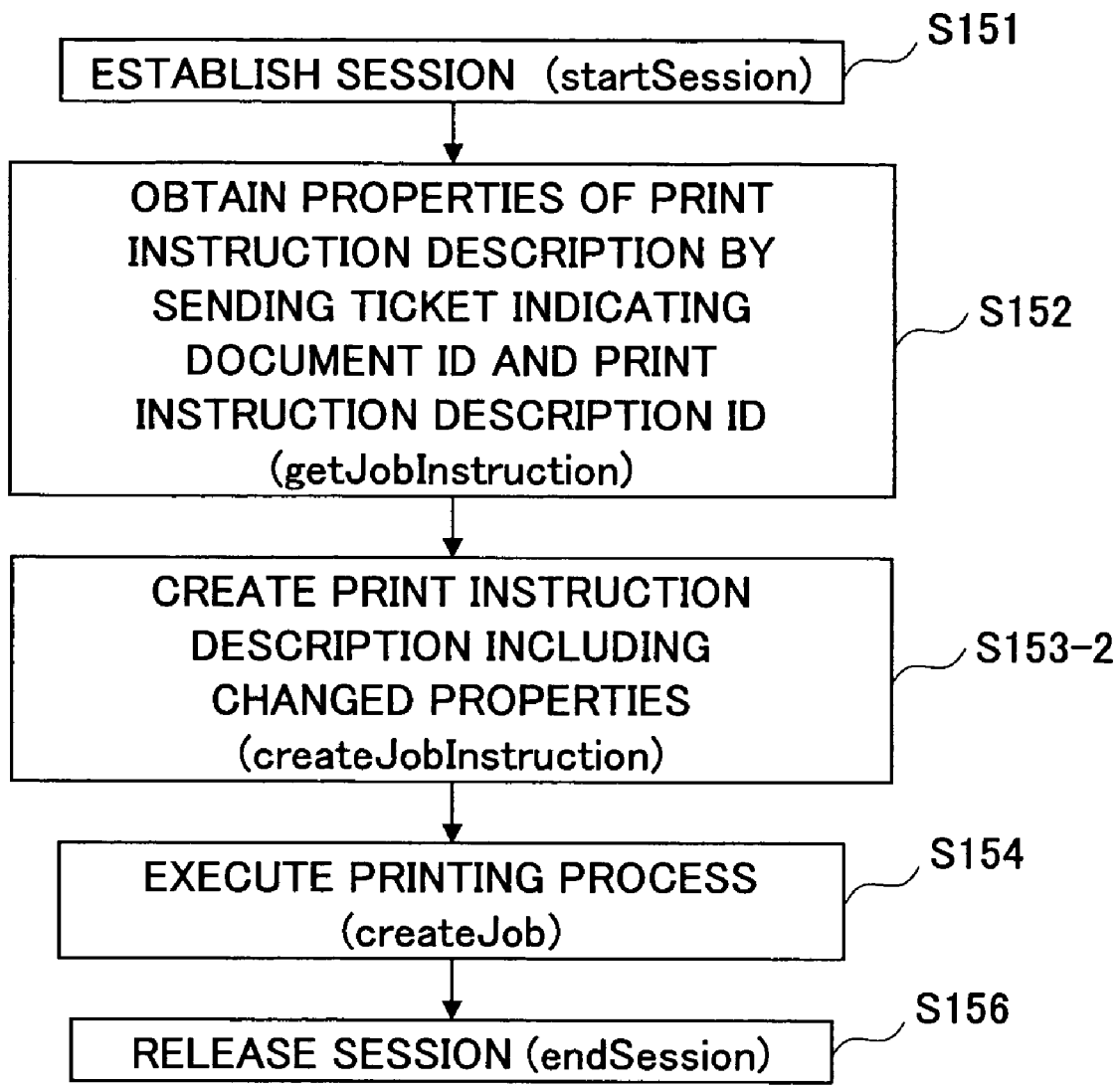
FIG. 40 is a flowchart for explaining the second printing process in the case in that the print options are changed, according to the first embodiment of the present invention.

In FIG. 40, the step S34 of FIG. 37 is replaced with step S153-2. The client PC 10 changes values of the properties of the print instruction description 32, and creates another print instruction description 32 setting the values of the properties which are changed (step S153-2). Subsequently, the client PC 10 instructs the print service execution part 1400 to conduct the printing process by sending a command createJob (step S154). The following steps are conducted as the same as described in FIG. 37.

Figure 41:
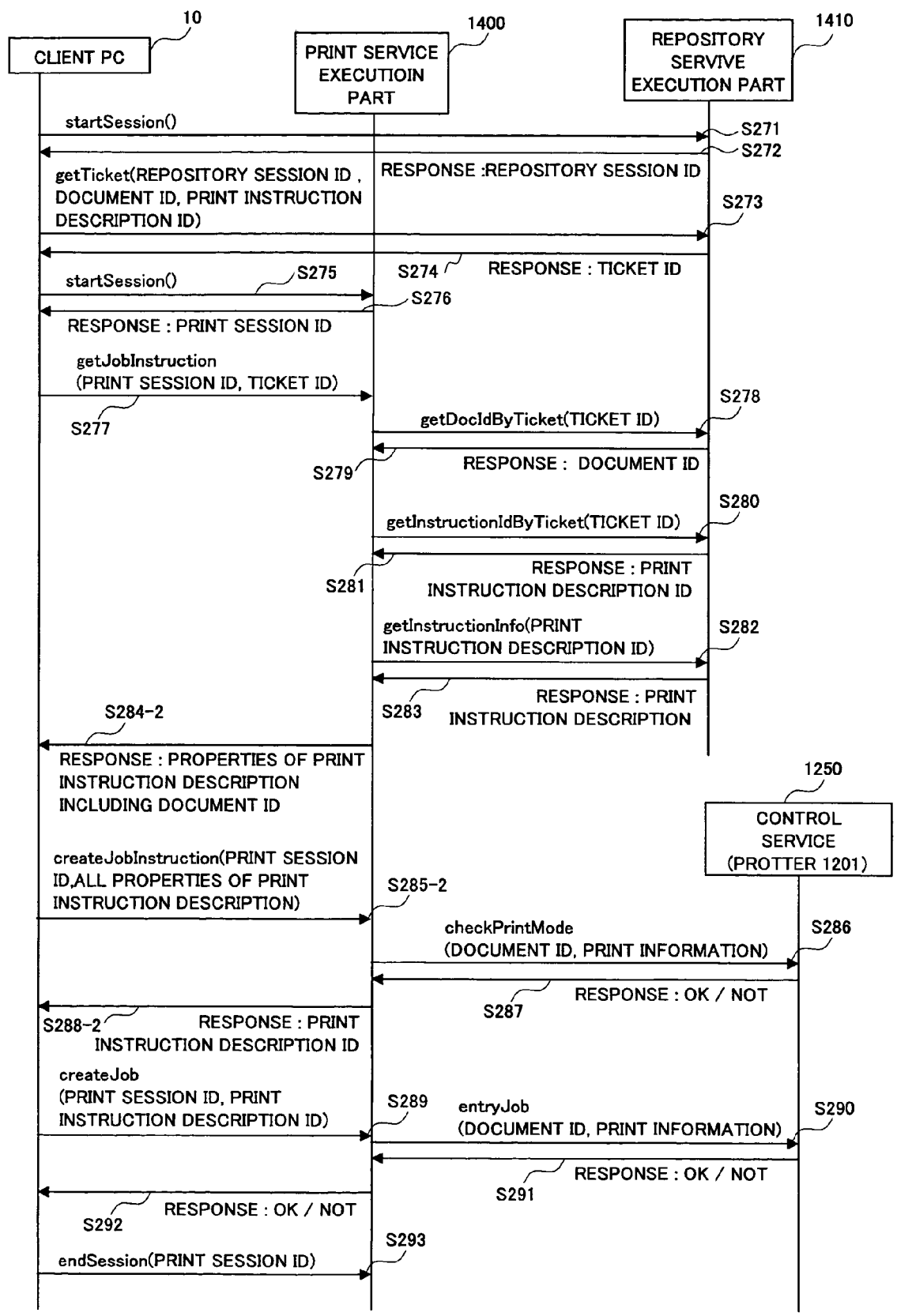
FIG. 41 is a diagram showing a command flow in the third printing process in the case in that the print options are changed, according to the first embodiment of the present invention.

FIG. 41 is a diagram showing a command flow in the third printing process in the case in that the print options are changed, according to the first embodiment of the present invention. In FIG. 41, parts that are the same as the ones in FIG. 38 are indicated by the same reference numerals and the explanation thereof will be omitted.

In FIG. 41, when the print service execution part 1400 receives a command getJobInstruction (print session ID, print instruction description ID) from the client PC 10 (step S277). After the steps S 278 through S283, the print service execution part 1400 responds to the client PC 10 by the properties of the print instruction description 32 corresponding to the print instruction description ID and including the document ID and deletes the print instruction description 32 temporarily stored in the predetermined storage area (step S284-2).

The client PC 10 creates another print instruction description 32 which indicates all properties of the print instruction description 32 received from the print service execution part 1400 and includes properties changed in accordance with the print options set by the user, and sends a command createJobInstruction(print session ID, all properties of print instruction description 33) to the print service execution part 1400 (step S285-2).

The print service execution part 1400 generates the print instruction description ID for identifying the print instruction description 32 created by the client PC 10, obtains the document ID from the print instruction description 32, and creates the print information 33 to inform to the control service 1250.

The print service execution part 1400 sends a command checkPrintMode(document ID, print information 33) to the control service 1250 (step S286). The control service 1250 checks in accordance with the print information 33 indicated by the command checkPrintMode whether or not the printing process can be conducted, and sends a check result showing "OK" (possible) or "NOT" (impossible) as a response to the print service execution part 1400 (step S287).

The print service execution part 1400 sends the print instruction description ID as a response to the command createJobInstruction received in the step S285-2 when the check result shows "OK" (possible) is informed from the control service 1250 (step S288-2).

The client PC 10 sends a command createjob(session ID, print instruction description ID) to the print service execution part 1400 in order, to conduct the printing process at the multi-functional apparatus 1200 when the response shows the print instruction description ID to the command createJobInstruction (step S289). The following steps are conducted as the same as described in FIG. 38.

In the third printing process described above, the properties of the print instruction description 32, which are provided from the print service execution part 1400 to the client PC 10 in the step S284-2, are the same as the properties in the first embodiment, and the explanation thereof will be omitted.

In the third printing process according to the second embodiment, the print service execution part 1400 can effectively use the predetermined storage area for the print instruction description 32.

Figure 42:
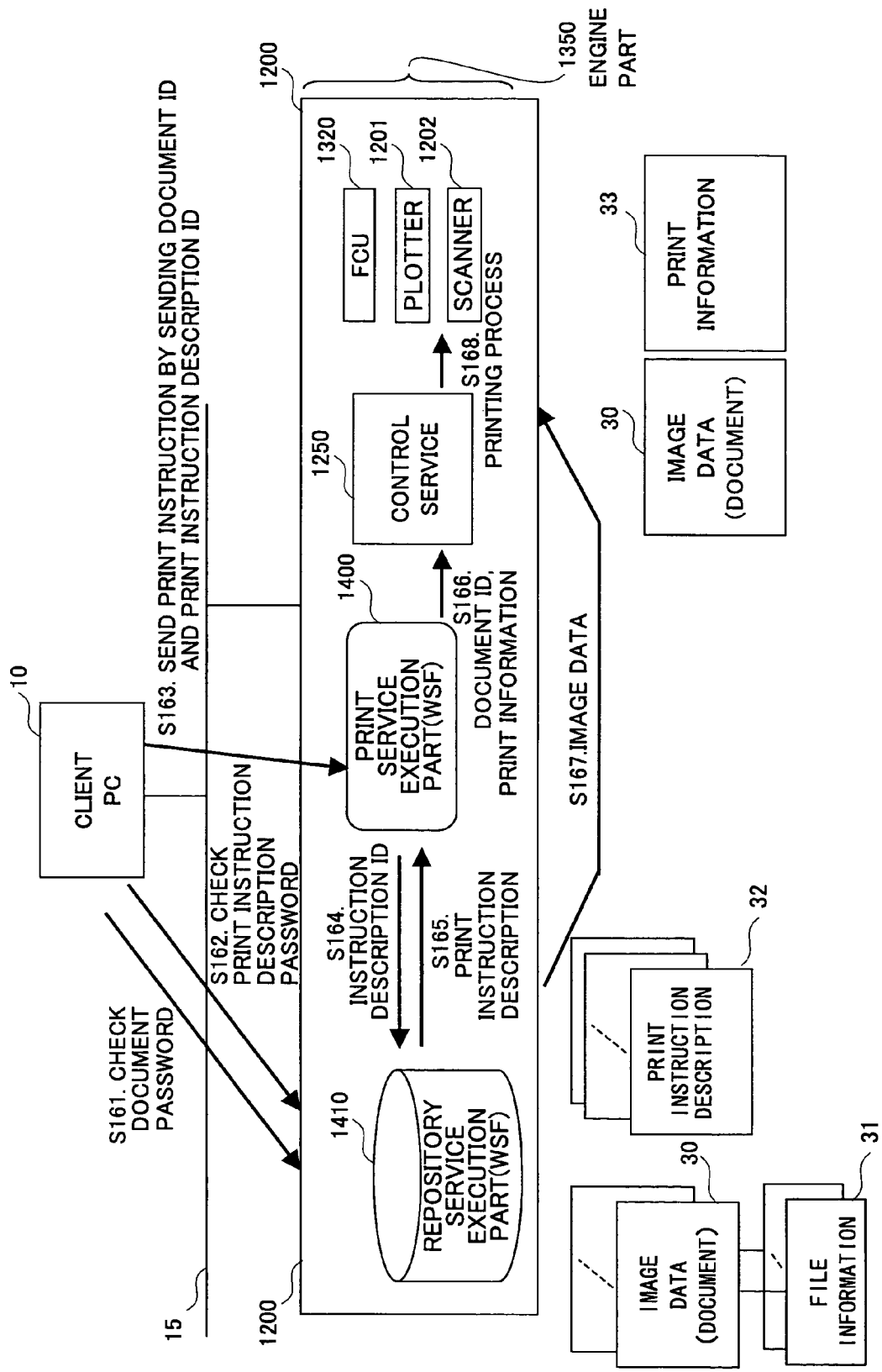
FIG. 42 is a diagram for broadly explaining a fourth printing process in that the ticket is not used, according to the second embodiment of the present invention.

Next, a case in that the ticket is not used will be described with reference to FIG. 42. FIG. 42 is a diagram for broadly explaining a fourth printing process in that the ticket is not used, according to the second embodiment of the present invention. In FIG. 42, the multi-functional apparatus 1200 includes the print service execution part 1400, the repository service execution part 1410, the control service 1250, and the engine part 1350 inside the multi-functional apparatus 1200. Thus, a communication between the print service execution part 1400 and the repository service execution part 1410 is conducted by internally issued commands.

A communication between the multi-functional apparatus 1200 and a client PC 10 as a computer terminal through a network 15 is controlled in accordance with an HTTP.

The repository service execution part 1410 accumulates and manages image data 30 and file information 31 concerning the image data 30 by corresponding to the image data 30, and accumulates and manages print instruction descriptions 32 separately from the image data 30. Moreover, the repository service execution part 1410 permits the user to utilize the image data 30 and the print instruction description 32 by passwords, respectively. As the Web service, the user can utilize the image data 30 and the print instruction description 32 by the document ID and the print instruction description ID informed when the user is permitted.

In a case in that the client PC 10 requests the Web service in accordance with the SOAP, the multi-functional apparatus 1200 provides the Web service in accordance with the SOAP. In a case in that the client PC 10 requests the Web service by using a Web browser, each of the multi-functional apparatus 1200 and the repository apparatus 20 provides the Web service by using HTML (Hypertext Transfer Markup Language).

The file information 31 includes the print condition at a time when the image data 30 (document) is initially accumulated. The print instruction description 32 is created based on the file information 31 by the print service execution 1400, and managed by the repository service execution part 1410.

The client PC 10 sends a document password for the image data 30 inputted by the user to the repository service execution part 1410 (step S161). The repository service execution part 1410 confirms the validity of accessing the image data 30 and responds by the document ID identifying the image data 30.

Subsequently, the client PC 10 sends a print instruction description password for the print instruction description 32 inputted by the user to the repository service execution part 1410 (step S162). The repository service execution part 1410 confirms the validity of accessing the print instruction description 32 and responds by the print instruction description ID identifying the print instruction description 32.

After that, the client PC 10 sends a print instruction indicating the document ID and the print instruction description ID obtained from the repository service execution part 1410, to the print service execution part 1400 (step S163).

The print service execution part 1400 informs the print instruction description ID indicated by the print instruction to the repository service execution part 1410 (step S164). The repository service execution part 1410 sends the print instruction description 32 corresponding to the print instruction description ID to the print service execution part 1400 (step S165).

The print service execution part 1400 informs the document ID and the print information 33 set in the print instruction description 32 obtained from the repository execution part 1410 to the control service 1250 (step S166)

The control service 1250 obtains the image data 30 from the repository service execution part 1410 based on the document ID informed from the print service execution part 1400 (step S167), and executes the image forming process based on the image data 30 in accordance with the print information 33 (step S168). That is, the control service 1250 controls the engine part 1350 (plotter 1201) to conduct the image formation on a predetermined medium and output the predetermined medium on which the image formation is conducted.

Figure 43:
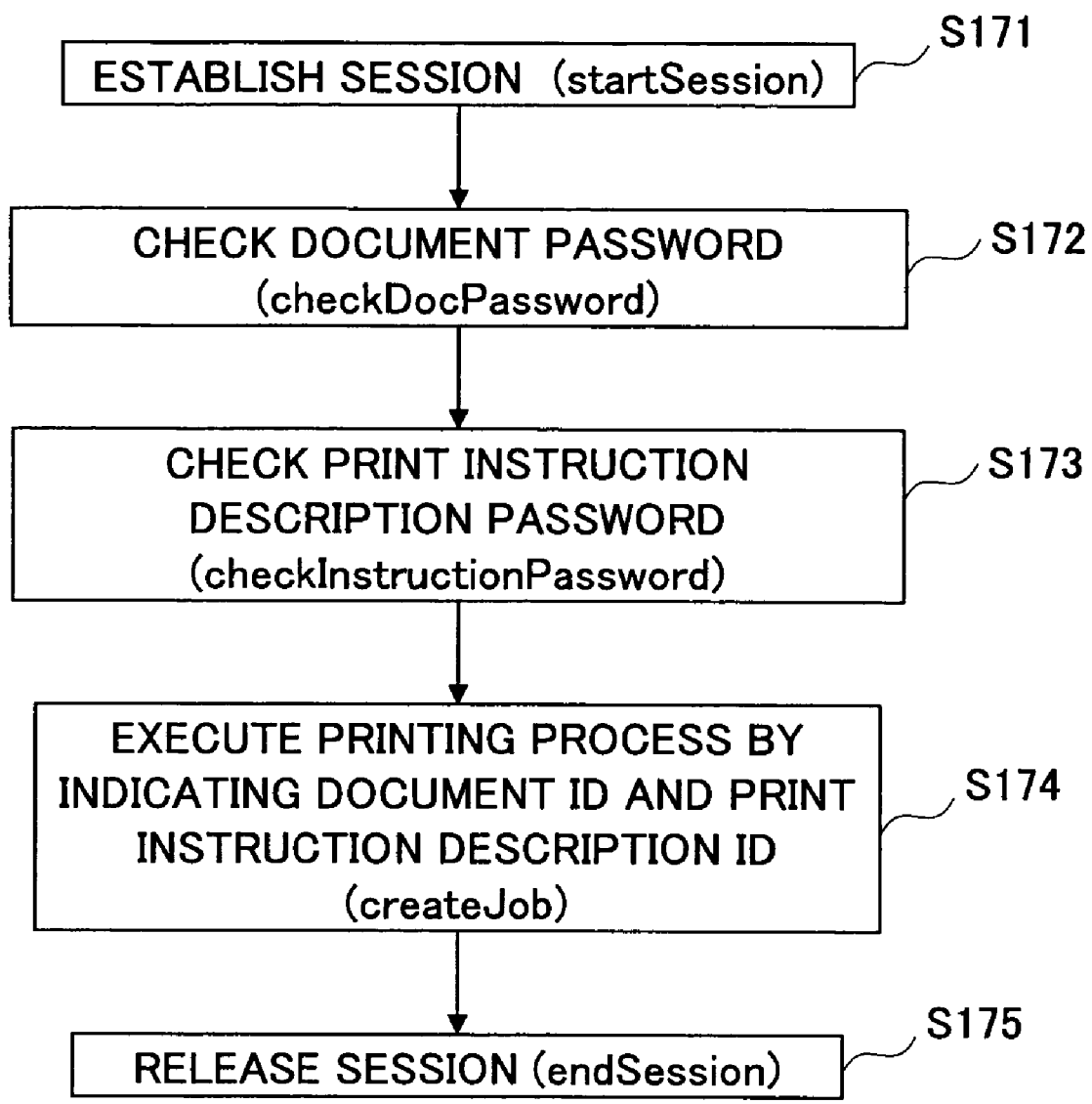
FIG. 43 is a flowchart for explaining a fourth printing process in the case in that the ticket is not used, according to the first embodiment of the present invention.

Next, the fourth printing process at the client PC 10 will be described with reference to FIG. 43. FIG. 43 is a flowchart for explaining a fourth printing process in the case in that the ticket is not used, according to the first embodiment of the present invention.

In FIG. 43, the client PC 10 establishes a session with the print service execution part 1400 of the multi-functional apparatus 1200 through the network 15 (step S171).

After the session with the print service execution part 1400 is established, the client PC 10 sends a command checkDocPassword indicating the document password inputted by the user to confirm the validity of utilizing the image data 30 (document) desired by the user and then, obtain the document ID (step S172). Similarly the client PC 10 sends a command checkInstructionPassword indicating the print instruction description password inputted by the user to confirm the validity of utilizing the print instruction description 32 desired by the user and then, obtain the print instruction description ID (step S173).

Subsequently, the client PC 10 provides the document ID and the print instruction description ID obtained from the repository service execution part 1410 beforehand to the print service execution part 1400, by sending a command createJob to instruct executing the printing process (step S174).

The client PC 10 releases the session with the print service execution part 1400 of the multi-functional apparatus 1200 by sending a command endSession (step S175).

As described above, after the document ID and the print instruction description ID is obtained from the repository service execution part 1410 by confirming the validity of utilizing the image data 30 and the print instruction description 32, the client PC 10 simply sends the print instruction to the print service execution part 1400 of the multi-functional apparatus 1200. Accordingly, it is not required to transmit entities of the image data 30 (document) and the print instruction description 32 through the network 15. Thus, a transmission to the multi-functional apparatus 1200 can be effectively conducted.

The client PC 10 is not required to physically connect to the network 15. For example, the client PC 10 may be connected by a wireless LAN (Local Area Network). Alternatively, since the entity of the image data 30 (document) is not necessary to be transmitted, the user may use a mobile phone or a like to connect to the print service of the multi-functional apparatus 1200 and the repository service execution part 1410 of the repository apparatus 20 through the Internets.

Figure 44:
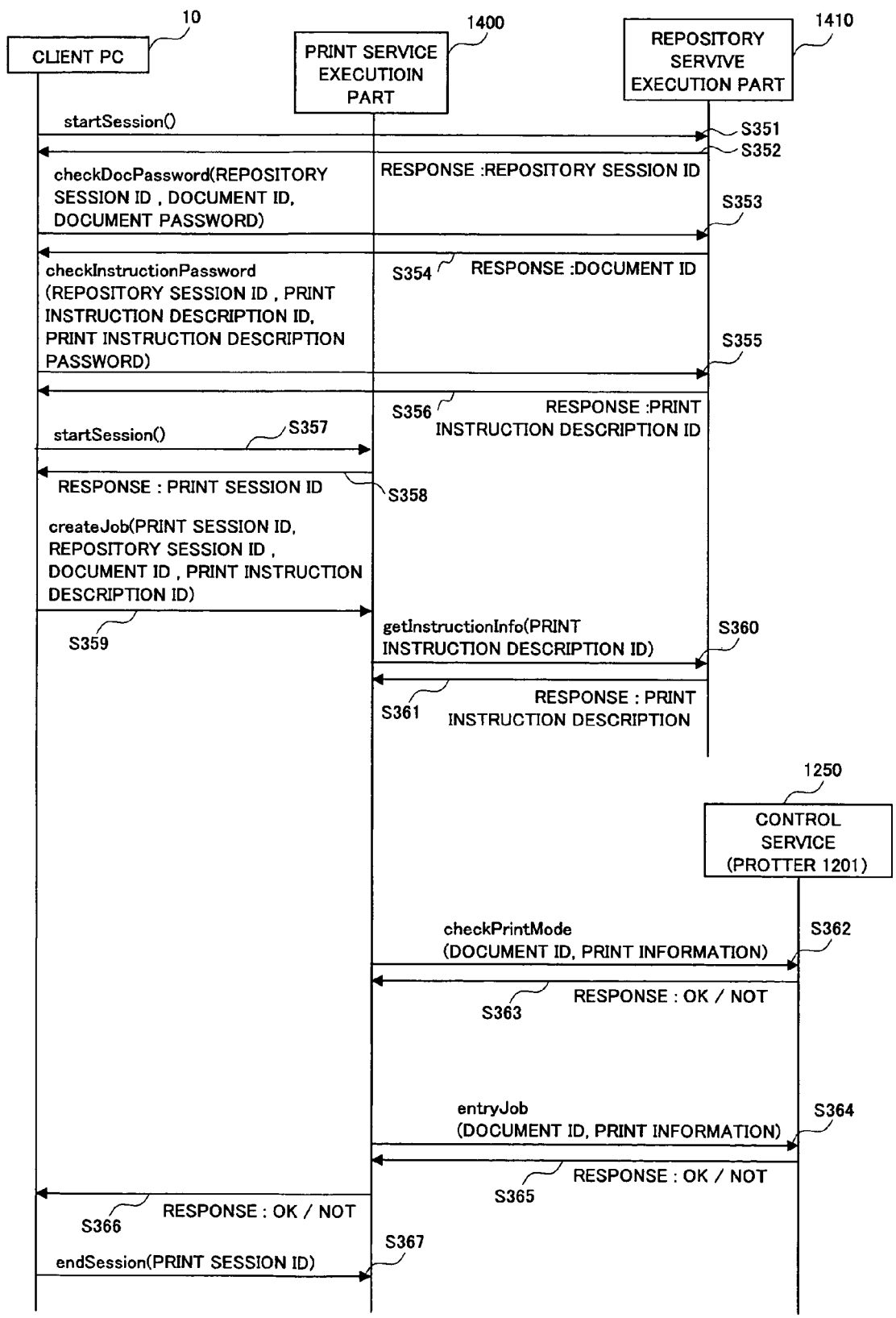
FIG. 44 is a diagram showing a command flow in the fourth printing process in the case in that the ticket is not used, according to the second embodiment of the present invention.

FIG. 44 is a diagram showing a command flow in the fourth printing process in the case in that the ticket is not used, according to the second embodiment of the present invention. In FIG. 44, the client PC 10 sends a command startSeeion( ) to the repository service execution part 1410 (step S351), and the repository service execution part 1410 responds by a repository session ID (step S352). A session between the client PC 10 and the repository service execution part 1410 is established.

When the session is established, the client PC 10 sends a command checkDocPassword(repository session ID, document ID, document password) to the repository service execution part 1410 in order to confirm the validity of utilizing the image data 30 (document) desired by the user. The repository service execution part 1410 confirms the validity of utilizing the image data 30 (document) identifying the document ID by the document ID and the document password and then responds by the document ID (step S354).

Similarly, the client PC 10 sends a command checkInstructionPassword(repository session ID, print instruction description ID) to the repository service execution part ID in order to confirm the validity of utilizing the print instruction description 32 desired by the user (step S355). The repository service execution part 1410 confirms the validity of utilizing the print instruction description 32 identifying the print instruction description ID by the print instruction description ID and the print instruction description password and then responds by the print instruction description ID (step S356).

Next, the client PC 10 sends a command startSession( ) to the print service execution part 1400 (step S357), and the print service execution part 1400 responds by the print session ID to the client PC 10 (step S358). A session between the client PC 10 and the print service execution part 1400.

When the session is established, the client PC 10 sends a command createJob(print session ID, repository session ID, document ID, print instruction description ID) to the print service execution part 1400 in order for the multi-functional apparatus 1200 to conduct the printing process (step S359).

When the print service execution part 1400 receives a print instruction, the print service execution part 1400 sends a command getInstructionInfo(print instruction description ID) to the repository service execution part 1410 (step S360). The repository service execution part 1410 responds by the print instruction description 32 corresponding to the print instruction description ID (step S361) The print service execution part 1400 creates the print information 33 to inform to the control service 1250 based on the properties of the print instruction description 32 obtained from the repository service execution part 1410.

The print service execution part 1400 sends a command checkPrintMode(document ID, print information 33) to the control service 1250 (step S362). The control service 1250 determines whether or not the printing process can be conducted based on the print information 33 indicated by the command checkPrintMode, and sends a determination result showing "OK" (possible) or "NOT" (impossible) to the print service execution part 1400 as a response (step S363).

When the response for the command checkPrintMode shows "OK" (possible), the print service execution part 1400 sends a command entryJob (document ID, print information 33) to the control service 1250 and instructs to execute a print job (step S3654.

The control service 1250 obtains the image data 30 from the repository service execution part 1400 by using the document ID indicated by the command entryJOb, and controls the plotter 1201 to form an image on a predetermined medium and output the determined medium. The control service 1250 sends a process result showing "OK" (possible) or "NOT" (impossible) to the print service execution part 1400 as a response (step S365).

The print service execution part 1400 sends the process result showing "OK" (possible) or "NOT" (impossible) informed from the control service 1250 as a response to the step S365 (step S366).

The client PC 10 sends a command endSession (print session ID) to the print service execution part 1400, and releases the session with the print service execution part 1400 (step S367).

As described above, according to the present invention, an access to the image data 30 (document) can be determined by the document password. Moreover, the client PC 10 can change the properties obtained from the multi-functional apparatus 1200, and can execute the printing process while repeatedly utilizing the print instruction description 32. Furthermore, the file information 31 can be changed based on the changed properties.

In the following, a case in that the properties of the print instruction description 32 changed by the client PC 10 are saved in the repository service execution part 1410 will be described. A process for saving the properties of the print instruction description 32 to the repository service execution part 1410 is conducted when a property save is indicated.

It is assumed that the image data 30 (document) and the print instruction description 30 are allowed to utilize by the ticket or the document password and the instruction description password, and the process for saving the properties will be described.

Figure 45:
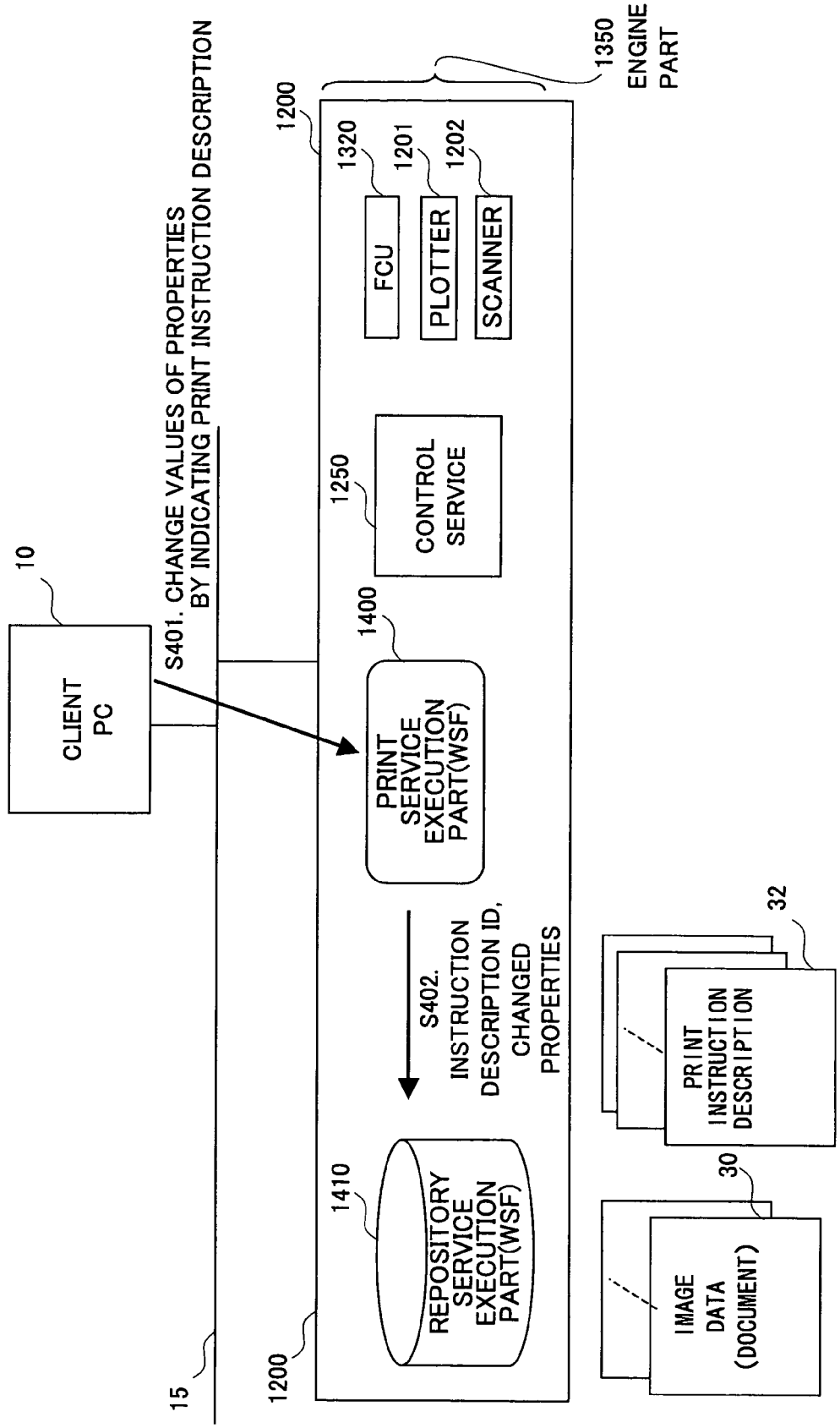
FIG. 45 is a diagram for broadly explaining a first save process for saving the print instruction description being changed to the repository service execution part according to the second embodiment of the present invention.

First, a case in that an original instruction description 32 is replaces with the print instruction description 32 being changed will be described. FIG. 45 is a diagram for broadly explaining a first save process for saving the print instruction description being changed to the repository service execution part according to the second embodiment of the present invention.

In FIG. 45, the client PC 10 instructs the print service execution part 1400 so as to change the values of the properties which are changed by the user (step S401). The print service execution part 1400 informs the print instruction description ID and the values of the properties changed by the user-received from the client PC 10 to the repository service execution part 1410, and requests to change the print instruction description 32 (step S402). The repository service execution part 1410 changes the values of the properties of the print instruction description 32 corresponding to the print instruction description ID.

In FIG. 45, when the print instruction description 32 does not include the document ID, the client PC 10 may indicated the document ID in the step S401.

As described above, it is possible to replace the print instruction description 32 maintained by the repository service execution part 1410 with the values of the properties changed by the user.

Figure 46:
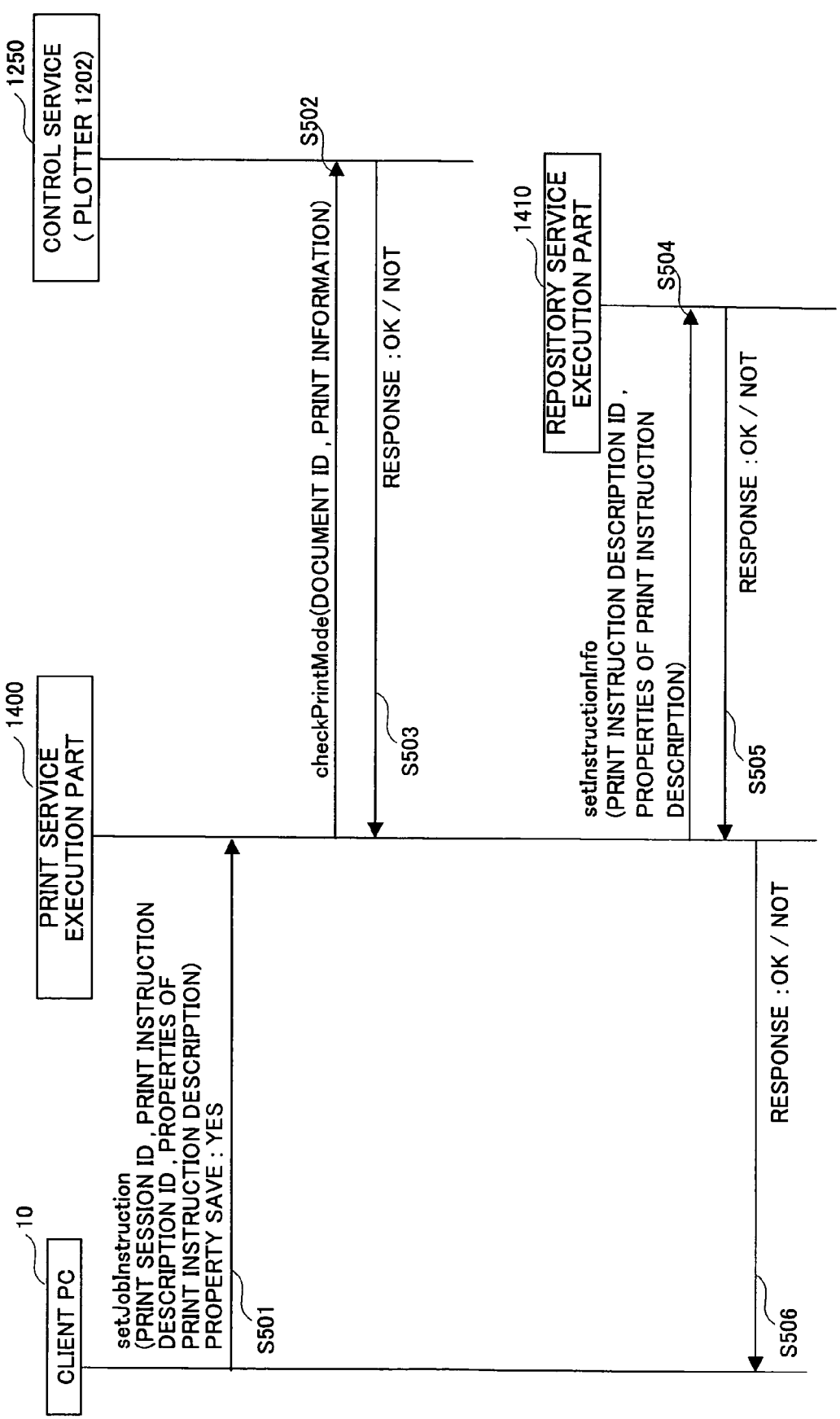
FIG. 46 is a diagram showing a command flow in the first save process for saving the print instruction description, according to the second embodiment of the present invention.

FIG. 46 is a diagram showing a command flow in the first save process for saving the print instruction description, according to the second embodiment of the present invention.

In FIG. 46, the client PC 10 sends a command setJobInstruction(print session ID, print instruction description ID, properties of print instruction description 32) in which the property save is set to "YES", to the print service execution part 1400 of the multi-functional apparatus 1200 (step S501). When the print instruction description 32 does not include the document ID, the document ID may be indicated by the command setJObInsgtruction.

When the print service execution part 1400 receives the command setJobInstruction in which the property save is set to "YES", the print service execution part 1400 sends a command checkPrintMode(document ID, print information 33) to the control service 1250 (step S502). The control service 1250 determines whether or not the printing process can be conducted in accordance with the print information 33 indicated by the command checkPrintMode, and sends a determination result showing "OK" (possible) or "NOT" (impossible) to the print service execution part 1400 as a response (step S503).

When the determination result shows "OK" (possible), the print service execution part 1400 sends a command setInstructionInfor(print instruction description ID, properties of print instruction description) to the repository service execution part 1400 (step S504). The repository service execution part 1400 retrieves the properties of the print instruction description 32 from the command setInstructionInfo received from the print service execution part 1400, changes and saves the properties of the print instruction description 32 corresponding to the print instruction description ID, and responds by a save process result showing "OK" (save completion) or "NOT" (save error) to the print service execution part 1400 (step S505).

The print service execution part 1400 informs the save process result showing "OK" (save completion) or "NOT" (save error) informed from the repository service execution part 1400, to the client PC 10 as a response to the step S501 (step S506).

Figure 47:
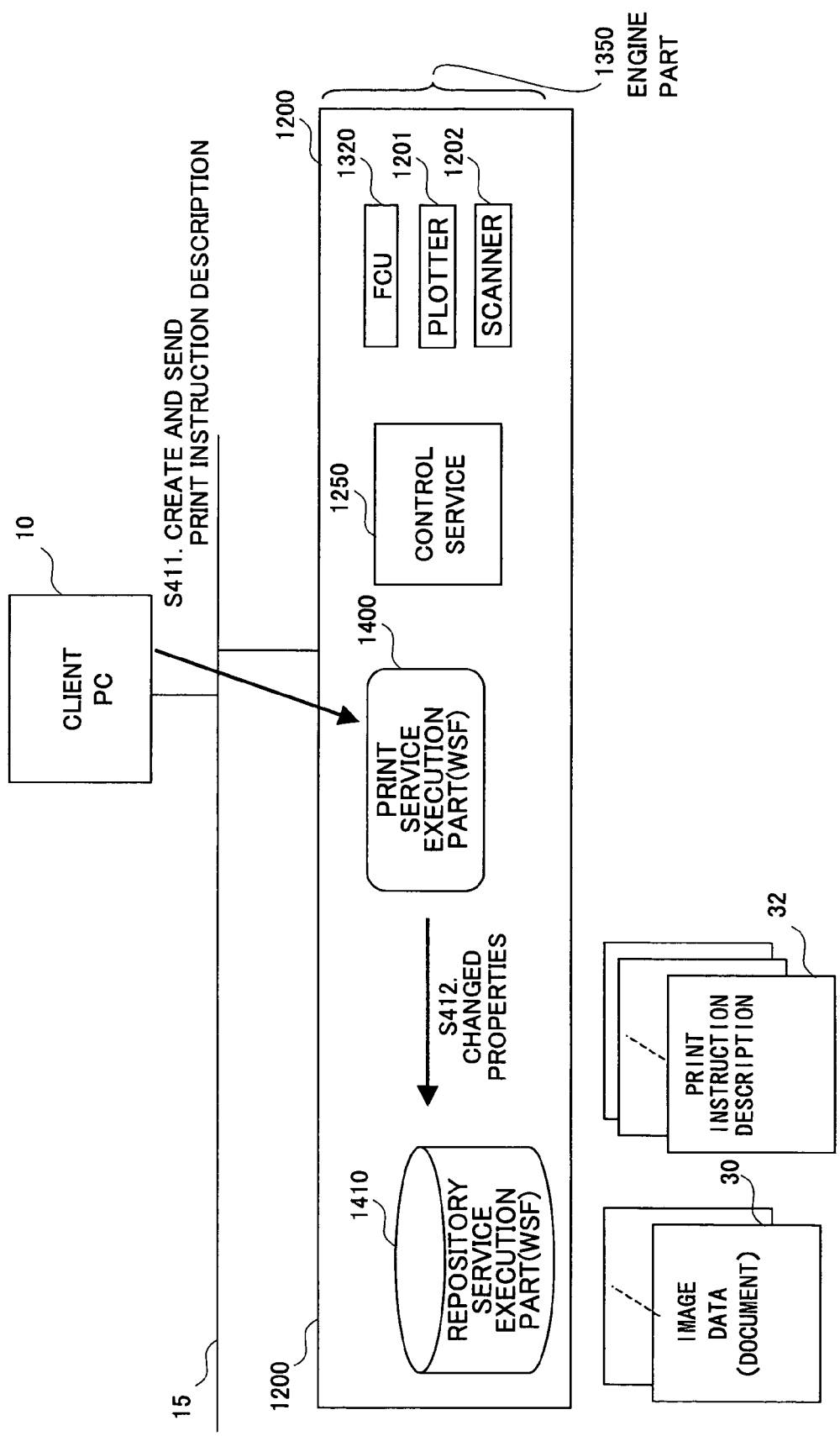
FIG. 47 is a diagram for broadly explaining a second save process for saving the properties of the print instruction description being changed to the repository service execution part according to the second embodiment of the present invention.

Next, a case of saving the print instruction description 32 being changed as a new print instruction description 32 (add and save) will be described with reference to FIG. 47. FIG. 47 is a diagram for broadly explaining a second save process for saving the properties of the print instruction description being changed to the repository service execution part according to the second embodiment of the present invention.

In FIG. 47, the client PC 10 creates the print instruction description 32 showing values of the properties set by the user and saves as a new print instruction description 32 to the print service execution part 1400 (step S411). The print service execution part 1400 informs the values of the properties changed by the user and received from the client PC 10 to the repository service execution part 1410, and requests to save the print instruction description 32 as a new print instruction description 32 (step S412). The repository service execution part 1410 saves the values of the properties of the print instruction description 32 received from the client PC 10 as a new print instruction description 32.

In FIG. 47, when the print instruction description 32 does not include the document ID, the document ID may be indicated in the step S411.

As described above, it is possible to save the values of the properties being changed as a new print instruction description 32.

Figure 48:
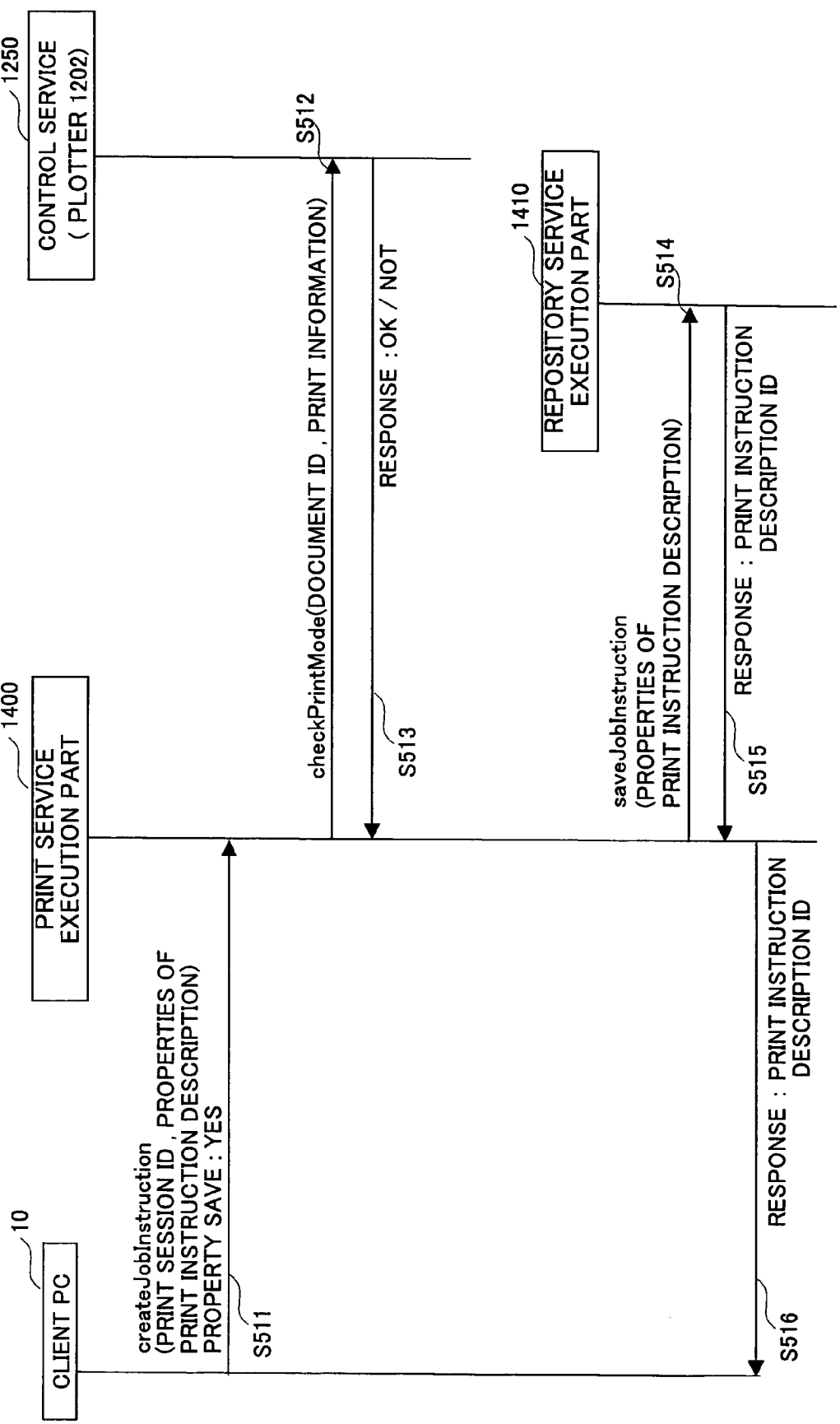
FIG. 48 is a diagram showing a command flow in the second save process for saving the print instruction description according to the second embodiment of the present invention.

FIG. 48 is a diagram showing a command flow in the second save process for saving the print instruction description according to the second embodiment of the present invention. In FIG. 48, the client PC 10 sends a command createJobInstructio(print session ID, properties of print instruction description 32) in which the property save is set to "YES", to the print service execution part 1400 of the multifunctional apparatus 1200 (step S511). When the print instruction description 32 does not include the document ID, the document ID may be indicated by the command createJobInstruction.

When the print service execution part 1400 receives the command createJobInstruction in which the property save is set to "YES", the print service execution part 1400 sends a command checkPrintMode(document ID, print information 33) to the control service 1250 (step S512). The control service 1250 determines whether or not the pringing process can be conducted in accordance with the print information 33 indicated by the command checkPrintMode, and sends a determination result showing "OK" (possible) or "NOT" (impossible) to the print service execution part 1400 as a response (step S513).

When the determination result shows "OK" (possible), the print service execution part 1400 sends a command saveInstructionInfo (properties of print instruction description 32) to the repository service execution part 1410 (step S514). The repository service execution part 1410 retrieves the properties of the print instruction description 32 from the command saveInstructionInfo received from the print service execution part 1400, changes and saves the properties of the print instruction description 32 corresponding to the print instruction description ID, and responds by a save process result showing "OK" (save completion) or "NOT" (save error) to the print service execution part 1400 (step S515).

The print service execution part 1400 informs the save process result showing "OK" (save completion) or "NOT" (save error) informed from the repository service execution part 1400, to the client PC 10 as a response to the step S501 (step S516).

Figure 49:
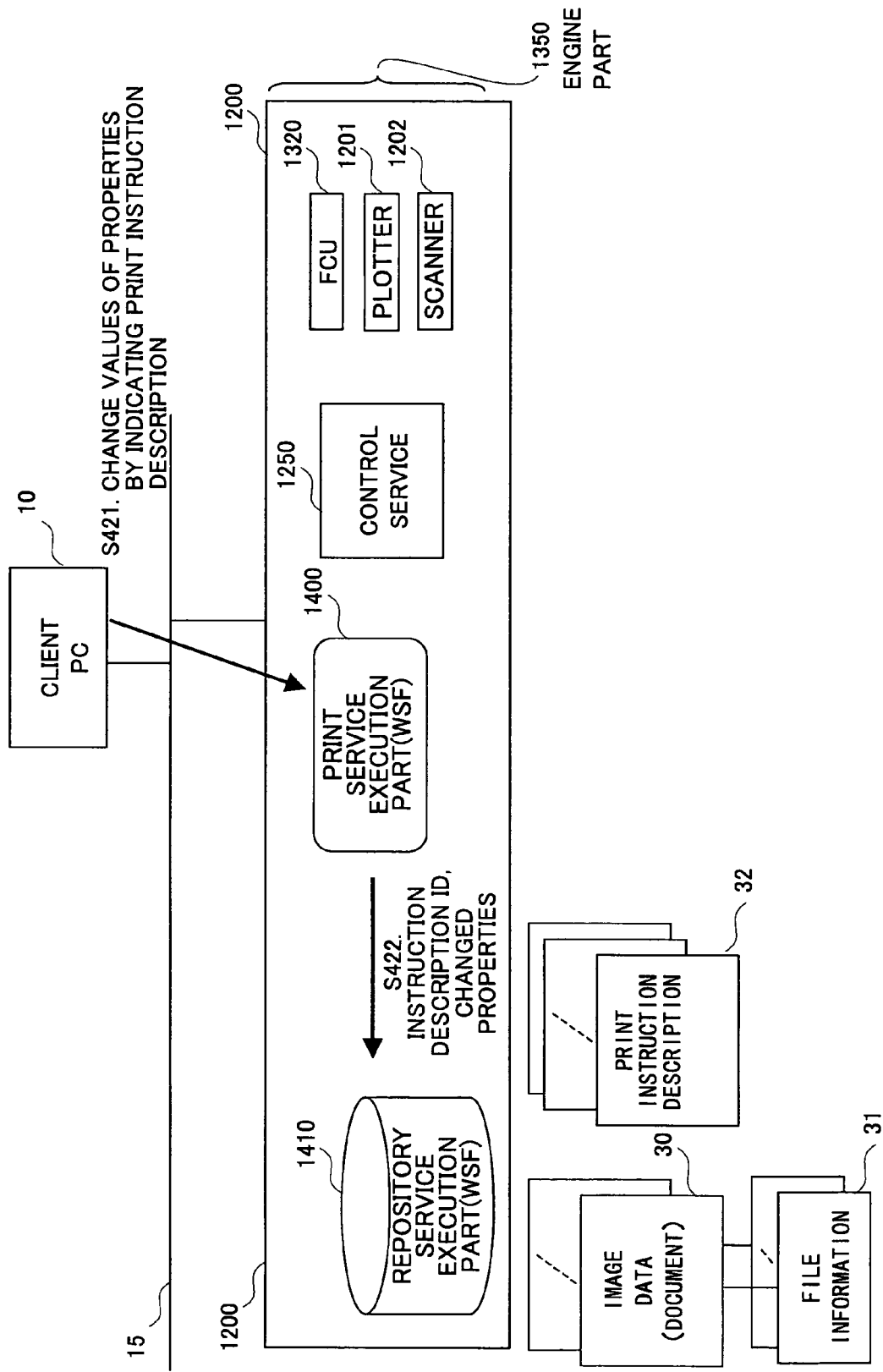
FIG. 49 is a diagram for broadly explaining a third save process for saving the properties of the print instruction description being changed to the repository service execution part according to the second embodiment of the present invention.

Next, a case in that the original print instruction description 32 is replaces with the print instruction description 32 changed by the user and also the file information 31 which is a bases of the print instruction description 32 is changed and saved will be described with reference to FIG. 49. FIG. 49 is a diagram for broadly explaining a third save process for saving the properties of the print instruction description being changed to the repository service execution part according to the second embodiment of the present invention.

In FIG. 49, the client PC 10 instructs the print service execution part 1400 to change the values of the properties being changed by the user (step S421). The print service execution part 1400 informs the print instruction description ID and the values of the properties changed by the user and received from the client PC 10, to the repository service execution part 1410, and request to change the print instruction description 32 (step S421). The repository service execution part 1410 changes the values of the properties corresponding to the print instruction description ID, changes the file information 31 by which the print instruction description 32 is created, based on the values of the properties, and saves the file information 31.

In FIG. 49, when the print instruction description 32 does not include the document ID, the client PC 10 may indicate the document ID in the step S421. Moreover, in the step S422, the print service execution part 1400 may informs the print instruction description ID, the values of the properties changed by the user and received from the client PC 10, the document ID, and information indicating to change the file information 31 to the repository service execution part 1410.

As described above, it is possible to change the print instruction description 32 and the file information 31 maintained by the repository service execution part 1410 by the values of the properties changed by the user.

Figure 50:
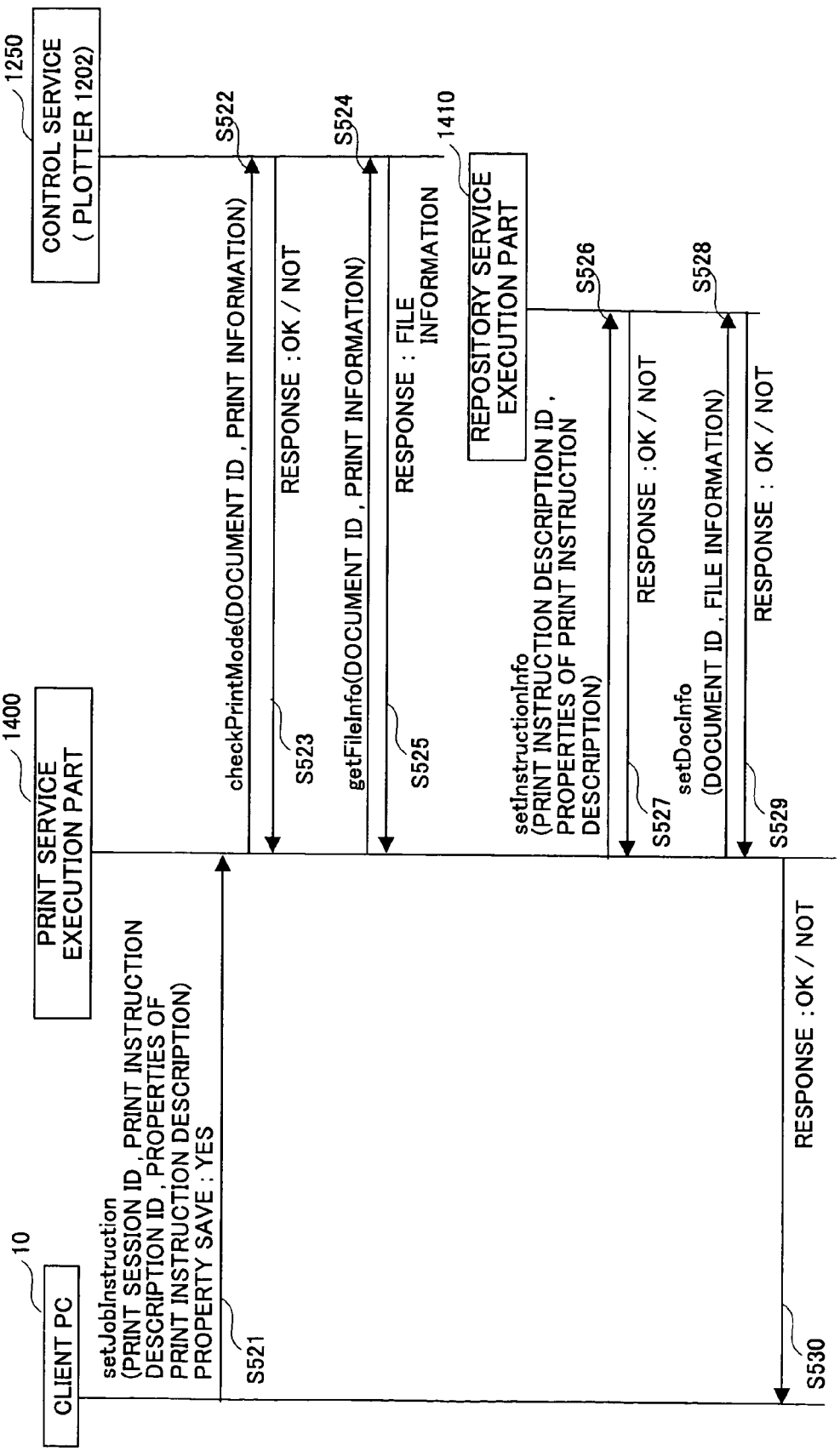
FIG. 50 is a diagram showing a command flow in the third save process for saving the print instruction description according to the second embodiment of the present invention.

FIG. 50 is a diagram showing a command flow in the third save process for saving the print instruction description according to the second embodiment of the present invention. In FIG. 50, the client PC 10 sends a command setJobInstruction(print session ID, print instruction description ID, properties of print instruction description 32) setting the property save to "YES" to the print service execution part 1400 of the multi-functional apparatus 1200 (step S521). When the print instruction description 32 does not include the document ID, the document ID may be indicated by the command getJobInstruction.

When the print service execution part 1400 receives the command getJobInstruction in which the property save is set to "YES", the print service execution part 1400 sends a command checkPrintMode(document ID, print information 33) to the control service 1250 (step S522). The control service 1250 determines whether or not the printing process can be conducted in accordance with the print information 33 indicated by the command checkPrintMode, and sends a determination result showing "OK" (possible) or "NOT" (impossible) to the print service execution part 1400 as a response (step S523).

When the determination result shows "OK" (possible), the print service execution part 1400 sends a command getFileInfo(document ID, print information 33) to the control service 1250 (step S524). The control service 1250 retrieves the print information 33 from the command getFileInfo, converts into the file information 31, and responds by the file information 31 to the print service execution part 1400 (step S525).

Moreover, the print service execution part 1400 sends a command getInstructionInfo(print instruction description ID, properties of the print instruction description 32) to the repository service execution part 1410 (step S526). The repository service execution part 1410 retrieves the properties of the print instruction description 32 from the command getInstructionInfo received from the print service execution part 1400, changes the properties of the print instruction description 32 corresponding to the print instruction description ID, saves the changed properties, and responds by responds by a save process result showing "OK" (save completion) or "NOT" (save error) to the print service execution part 1400 (step S527) When the save process result shows "OK" (save completion), the print service execution part 1400 sends a command getDocInfo (document ID, file information 31) to the repository service execution part 1410 in order to change and save the file information 31 (step S528) The repository service execution part 1410 saves the file information 31 by corresponding to the document ID and responds by the save process result showing "OK" (save completion) or "NOT" (save error) to the print service execution part 1400 (step S529).

The print service execution part 1400 informs the save process result showing "OK" (save completion) or "NOT" (save error) informed from the repository service execution part 1410 to the client PC 10 as a response to the step S521 (step S540).

Figure 51:
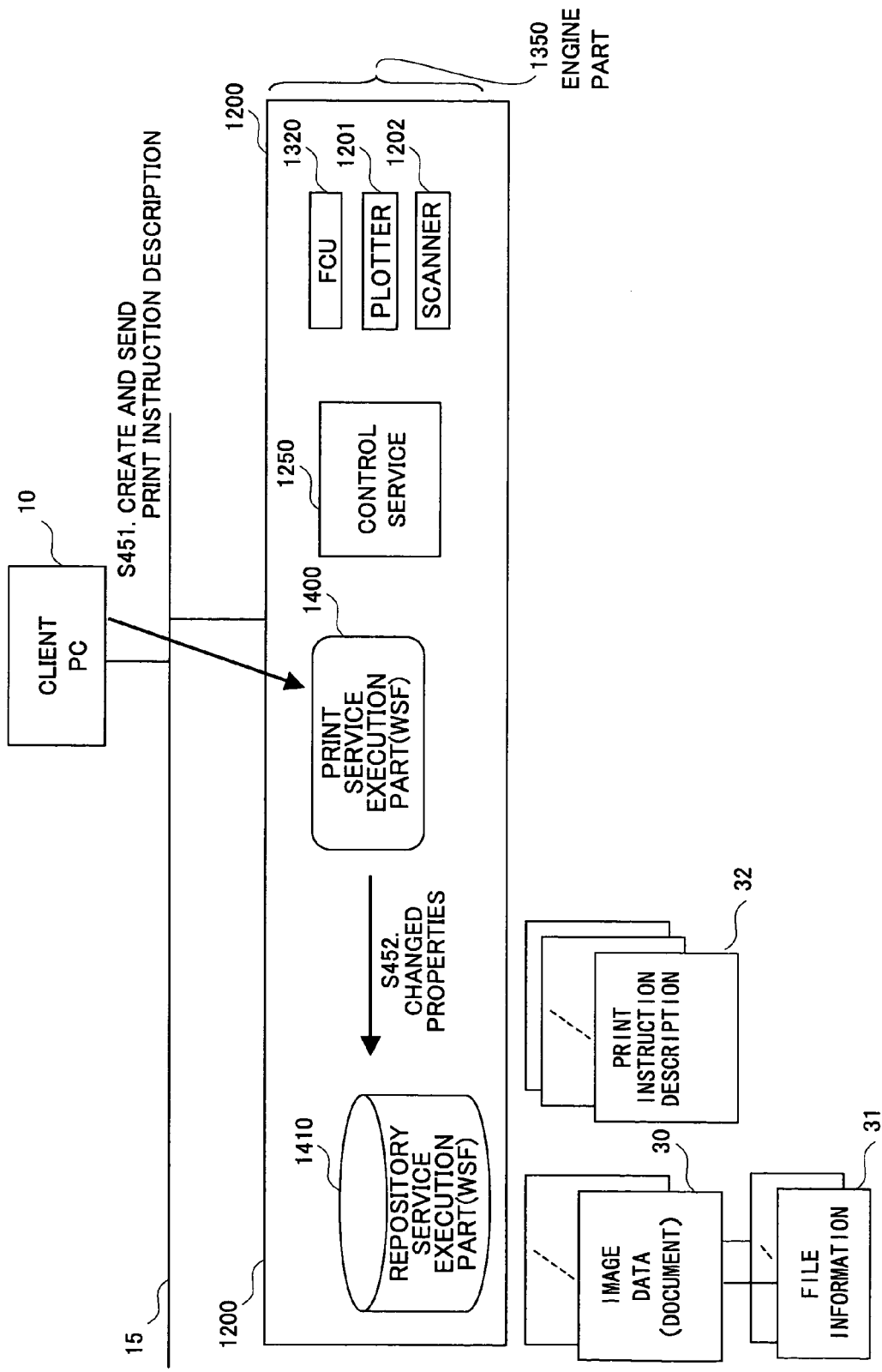
FIG. 51 is a diagram for broadly explaining a fourth save process for saving the properties of the print instruction description being changed to the repository service execution part according to the second embodiment of the present invention

Next, a case in that the print instruction description 32 being changed is saved as a new print instruction description 32 and also the file information 31 based on which the print instruction description 32 is created will be described with reference to FIG. 51. FIG. 51 is a diagram for broadly explaining a fourth save process for saving the properties of the print instruction description being changed to the repository service execution part according to the second embodiment of the present invention.

In FIG. 51, the client PC 10 creates the print instruction description showing values of the properties set by the user and instructs the print service execution part 1400 so as to save as a new print instruction description 32 (step S451). The print service execution part 1400 informs the values of the properties changed by the user and received from the client PC 10 to the repository service execution part 1410 and requests to save as a new print instruction description 32 (step S452). The repository service execution part 1410 saves the values of the properties of the print instruction description 32 received from the client PC 10 as a new print instruction description 32, and also changes and saves the file information 31 based on which the print instruction description 32 is created, by the changed properties.

In FIG. 51, when the print instruction description 32 does not include the document ID, the client PC 10 may indicate the document ID in the step S451. In addition, in the step S452, the print service execution part 1400 may informs the print instruction description 32 showing the values of the properties change by the user, the document ID, and information indicating to change the file information 31, which are received from the client PC 10, to the repository service execution part 1410.

As described above, it is possible to create and save a new print instruction description 32 based on the valued of the properties changed by the user to maintain by the repository service execution part 1410, and also save the file information 31.

Figure 52:
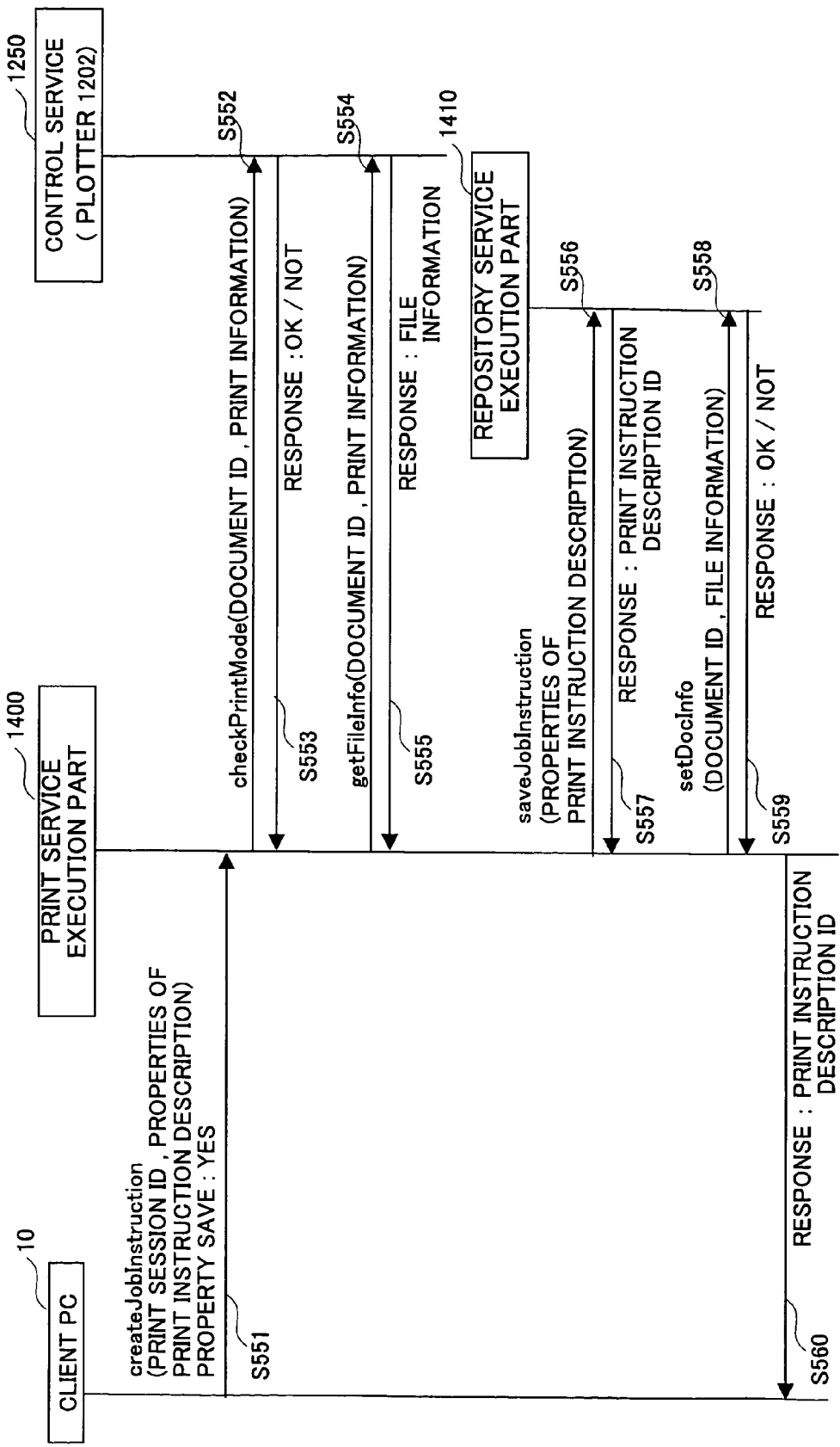
FIG. 52 is a diagram showing a command flow in the fourth save process for saving the print instruction description according to the second embodiment of the present invention.

FIG. 52 is a diagram showing a command flow in the fourth save process for saving the print instruction description according to the second embodiment of the present invention. In FIG. 52, the client PC 10 sends a command createJobInstruction(print session ID, properties of print instruction description 32) in which the property save is set to "YES" to the print service execution part 1400 (step S551). When the print instruction description 32 does not include the document ID, the document ID may be indicated by the command createJobInstruction.

When the print service execution part 1400 receives the command createJobInstruction in which the property save is set to "YES", the print service execution part 1400 sends a command checkPrintMode (document ID, print information 33) to the control service 1250 (step S552). The control service 1250 determines whether or not the printing process can be conducted in accordance with the print information 33 indicated by the command checkPrintMode, and sends a determination result showing "OK" (possible) or "NOT" (impossible) to the print service execution part 1400 as a response (step S553).

When the determination result shows "OK" (possible), the print service execution part 1400 sends a command getFileInfo(document ID, print information 33) to the control service 1250 (step S554). The control service 1250 retrieves the print information 33 from the command getFileInfo received from the print service execution part 1400, converts into the file information, and responds by the file information 31 to the print service execution part 1400 (step S555).

Moreover, the print service execution part 1400 sends a command saveInstructionInfo(properties of print instruction description 32) to the control service 1250 (step S556). The control service 1250 retrieves the properties of the print instruction description 32 from the command saveInstructionInfo received from the print service execution part 1400, saves as a new print instruction description 32, and responds to the print service execution part 1400 by a save process result showing "OK" (save completion) or "NOT" (save error) (step S557).

When the save process result shows "OK" (save completion), the print service execution part 1400 sends a command getDocInfo (document ID, file information 31) to the repository service execution part 1410 in order to change and save the file information 31 (step S558). The repository service execution part 1410 saves the file information 31 by corresponding to the document ID and responds by the save process result showing "OK" (save completion) or "NOT" (save error) to the print service execution part 1400 (step S559) The print service execution part 1400 informs the save process result showing "OK" (save completion) or "NOT" (save error) informed from the repository service execution part 1410 to the client PC 10 as a response to the step S521 (step S560).

Figure 53:
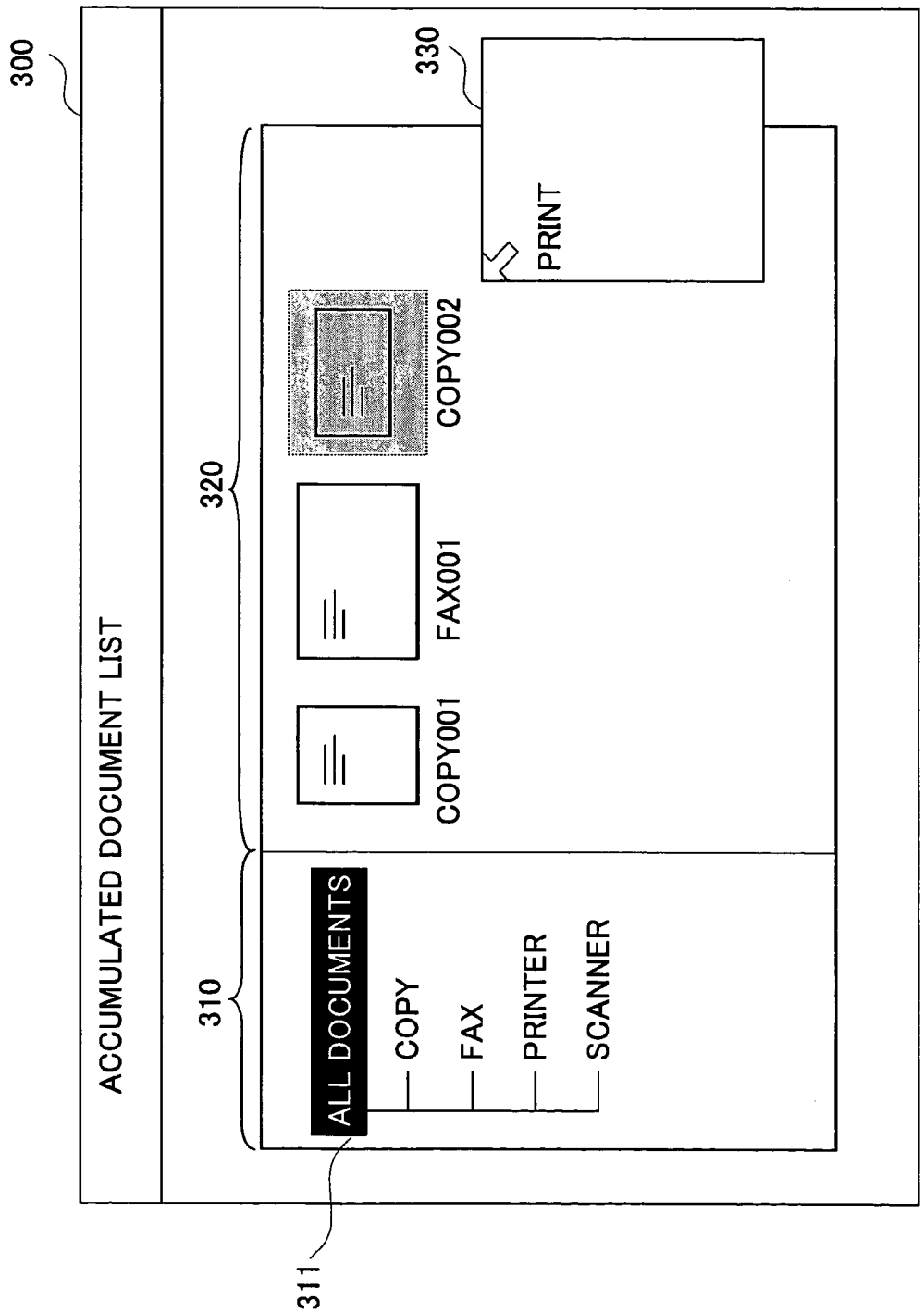
FIG. 53 is a diagram showing an accumulated document list screen provided from the repository service execution part according to the first embodiment of the present invention.

Next, screens, which are provided from the print service execution part 1400 or the repository service execution part 1410 to the client PC 10 will be described with reference to FIG. 53 through FIG. 56. FIG. 53 is a diagram showing an accumulated document list screen provided from the repository service execution part according to the first embodiment of the present invention. In FIG. 53, the accumulated document list screen 300 includes a display area 310 for displaying a list of document names and a display area for displaying documents by thumb-nails.

For example, in the display area 310, the list of document names which documents are accumulated in the repository service execution part 1410 is displayed when the user selects "all documents" 311 by using a mouse or a like. Alternatively, in the display area 310, a plurality of folder names may be displayed first, and a list of document names may be displayed when the user selects a desired folder.

In the display 320, the thumb-nails representing the documents accumulated in the multi-functional apparatus 1200 and the document names are displayed in response to a selection of the user at the display area 310. The user selects one of the thumb-nails for the desired document, and selects "PRINT" from a menu 330 that is displayed when the user clicks a right side of the mouse. Then, the printing process is started at the multi-functional apparatus 1200. The user can conduct the printing process for a plurality of documents all at once by selecting a plurality of thumb-nails.

Figure 54:
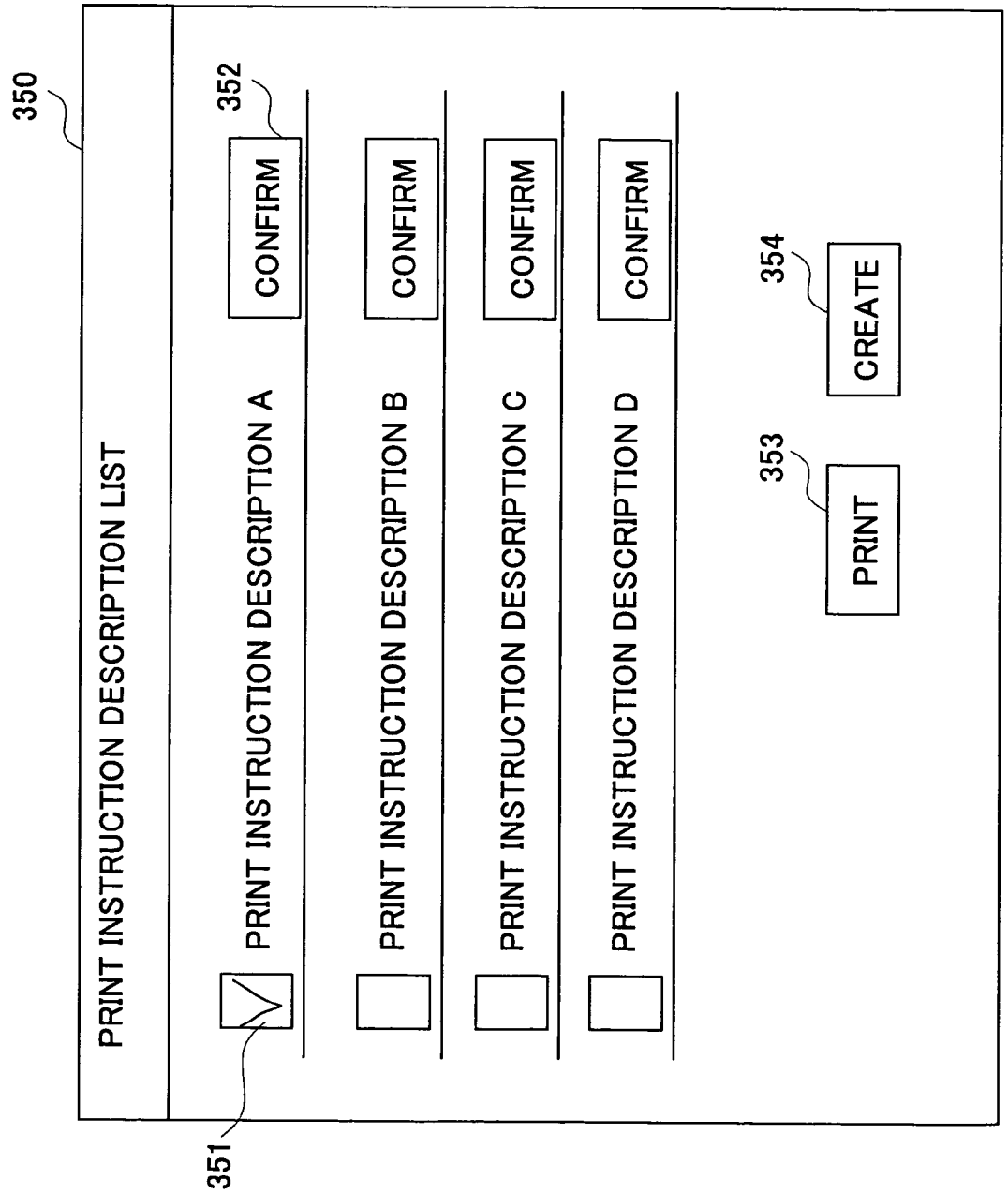
FIG. 54 is a diagram showing a screen displaying a print instruction description list according to the second embodiment of the present invention.

FIG. 54 is a diagram showing a screen displaying a print instruction description list according to the second embodiment of the present invention. In FIG. 54, a screen 350 displaying a list of print instruction descriptions 32 includes a check box 351, a print instruction description name, a "CONFIRM" button 352 for confirming contents of the print instruction description 32, a "PRINT" button 353 for conducting the printing process, a "CREATE" button 354 for creating a new print instruction description 32, and a like.

For example, the screen 350 displays from "PRINT INSTRUCTION DESCRIPTION A" to "PRINT INSTRUCTION DESCRIPTION B" as a list of the print instruction description names.

When the user selects "PRINT INSTRUCTION DESCRIPTION A", clicks the check box 351 by a mouse or a like, and clicks the "PRINT" button 353, the printing process is executed in accordance with "PRINT INSTRUCTION DESCRIPTION A" by the multi-functional apparatus 1200.

When the user creates a new print instruction description 32, the user clicks "CREATE" button 354. At a screen displaying print options, the user selects the print options desired by the user, and can save the print options to the multi-functional apparatus 1200.

When the user selects "PRINT INSTRUCTION DESCRIPTION A" and confirms the contents, the user clicks the "CONFIM" button 352. By this click of the user, the client PC 10 sends the command getJobInstruction to the print service execution part 1400. Then, for example, a print screen is displayed as shown in FIG. 55.

FIG. 55 is a diagram showing the print screen for the accumulated documents provided from the print service execution part according to the second embodiment of the present invention. In FIG. 55, the print screen 400a for the accumulated documents shows previous settings when the print screen 400a is provided from the print service execution part 1400.

The print screen 400a for the accumulated documents includes a display area 401 for displaying the list of document names selected by the user to print out, an input area 402 for inputting print volumes, a check area 403 for saving the properties, a check area 404 for allowing the multi-functional apparatus 1200 to partially omit the print information 33, a setting area 405 for setting the print options, a display area 406 for displaying a list of the print options which are set at the setting area 405, a button 407 for starting a print, a button 408 for canceling a print, a button 409a for changing the print options, a button 409b for saving the print options as a new print instruction description 32 and a like.

The user can print out desired documents while referring to the list of the document names displayed at the display area 401. The input area 402 shows the print volume "1" previously set by the user but the user can change a value of the print volume.

When the user checks the check area 403, the properties (setting contents) changed by the user are saved from the print service execution part 1400 of the multi-functional apparatus 1200 to the repository service execution part 1410. When the user checks the check area 404, the user allows the multi-functional apparatus 1200 to automatically omit the print information 33. In this case, the check areas 402 and 403 were not checked at a previous time.

For example, at the setting area 405, the user can select "DOUBLE SIDES" or "SINGLE SIDE", "SORT" or "STACK", "COVER PAPER" or "INSERTING PAPER", and "STAPLE" or "PUNCH" as the print options. The print options selected by the user at the display area 405 are displayed as a print setting list at the display area 406. This case shows that "DOUBLE SIDES" and "SORT" were previously selected.

FIG. 56 is a diagram showing the print screen for the accumulated documents provided from the print service execution part when the values of the properties are changed, according to the second embodiment of the present invention. In FIG. 56, numerals 501 through 509b correspond to the numerals 401 through 4089b in FIG. 55 and the explanation thereof will be omitted.

The document names displayed at the display area 501 in FIG. 56 are the same as the document names displayed at the display area 401 in FIG. 55. In the input area 502, the print volume is changed by the user from "1" to "2", and the check areas 503 and 504 corresponding to the check areas 403 and 404 are checked by the user. By checking the check area 503, the properties currently change by the user are saved to the repository service execution part 1410. By checking the check area 504, the print service execution part 1400 of the multi-functional apparatus 1200 is allowed to automatically omit as described in the first embodiment of the present invention.

In the print service execution part 1400, if the printing process cannot be conducted in accordance with the print options set by the user, it is determined which print options can be omitted. This determination is conducted when the user of the client PC 10 checks the check area 504. When the check area 504 is checked, the print options which can be omitted are omitted and the print instruction description 32 is created. When the check area 504 is not checked, the print instruction description 32 is not created and an error is informed to the client PC 10.

In addition, in the setting area 505, "BOTH SIDES", "STACK", and "STAPLE" are currently selected. By these changes, the print setting list displayed at the display area 506 is changed. By current changes, "VOLUME: 1", "SETTING SAVE INDICATION", "BOTH SIDES", "STACK", and "STAPLE".

When the user clicks the button 507, the printing process is conducted in accordance with the list of the print options shown in the display area 506. When the user clicks button 508, the print options set by the user at the setting area 505 are cancelled. When the user clicks the button 509a, the print instruction description 32 is changed and saved in accordance with the list of the print options shown in the display area 506. When the user clicks the button 509b, a new print instruction description 32 is created in accordance with the list of the print options shown in the display area 506.

As described above, according to the present invention, the multi-functional apparatus separately maintains the image data 30 (document) directed to the printing process and a plurality of the print instruction descriptions 32.

Moreover, the user using the client PC 10 can repeatedly select and utilize the print instruction description 32. Also, the user can change the print instruction description 32 and replace with the changed print instruction description 32 or save as a new print instruction description 32.

Furthermore, the file information 31 corresponding to the image data 30, based on which the print instruction description 32 is created, can be replaced based on the changed print instruction description 32.

Moreover, an information processing apparatus as the client PC 10 according to the present invention can be realized by installing or downloading a computer-executable program for causing a computer functioned as an information processing apparatus to conduct a process instruction to an apparatus for executing a process, the program including the codes for: (a) obtaining specific information specifying an object data set directed to a process and a process instruction description setting process items from an apparatus for executing the process; and (b) indicating the specific information obtained by the code (a) and sending a process instruction indicating an execution of the process to the apparatus.

The present invention is not limited to the specifically disclosed embodiments, and variations and modifications may be made without departing from the scope of the present invention.

The present application is based on the Japanese Priority Applications No.2003-076609 filed on Mar. 19, 2003, No. 2004-71990 filed on Mar. 15, 2004 and No. 2004-71991 filed on Mar. 15, 2004, the entire contents of which are hereby incorporated by reference.

What is claimed is:

1. An image forming apparatus for forming an image, comprising:
a receiving part configured to receive, from a requesting device, a ticket showing a use permission of an object data set, the ticket being obtained by the requesting device from a repository apparatus;
a sending part configured to send the received ticket to the repository apparatus and to receive, in response, a document identification corresponding to the object data set;
a process indication receiving part configured to receive, from the requesting device, a process instruction that requests execution of a process corresponding to the object data set; and
a process executing part configured to execute the process in accordance with a process instruction description specified by an instruction description identification indicated by the process instruction.

2. The image forming apparatus as claimed in claim 1, further comprising:
a process item sending part configured to send process items to the requesting device in response to an obtain request for obtaining the process items set in the process instruction description from the requesting device.

3. The image forming apparatus as claimed in claim 1, further comprising:
a change request receiving part configured to receive a change request indicating subject process items of the process instruction description, said subject process items which are subjects of changing;
an instruction changing part configured to change the process instruction description in accordance with the subject process items of changing,
wherein when said process instruction receiving part is configured to receive the process instruction, and said process executing part is configured to execute the process in accordance with the process instruction description changed by said instruction description changing part.

4. The image forming apparatus as claimed in claim 1, further comprising:
an instruction description sending part configured to send the process instruction description to the requesting device in response to an obtain request of the process instruction description from the requesting device.

5. The image forming apparatus as claimed in claim 4, further comprising:
a process instruction description receiving part receiving the process instruction description sent from the requesting device,
wherein when the process instruction receiving part receives the process instruction, the process executing part executes the process in accordance with the process instruction description received by said process instruction description receiving part.

6. The image forming apparatus as claimed in claim 2, further comprising:
an instruction description storing part storing contents of the process instruction description executed by said process executing part to a predetermined storage area.

7. The image forming apparatus as claimed in claim 6, wherein:
the predetermined storage area is externally provided and is externally accessed through a network; and
said instruction description storing part stores contents of the process instruction description to the predetermined storage area through the network.

8. The image forming apparatus as claimed in claim 1, further comprising:
a changing part obtaining information concerning executable process items from said process executing part and changing the process instruction description to an executable process instruction description,
wherein said process executing part executes the process in accordance with the executable process instruction changed by said changing part.

9. The image forming apparatus as claimed in claim 1, further comprising:
a communication controlling part configured to control a communication with the requesting device by a structural description language using a tag.

10. The image forming apparatus as claimed in claim 1, further comprising:
a providing part specifying the object data set based on a ticket identification indicated by the process instruction received by said process instruction receiving part, and providing the object data set and the process instruction description to said process executing part.

11. The image forming apparatus as claimed in claim 1, further comprising:
a use permission determining part determining a use permission based on a password indicated by a use permission request received from the requesting device, the use permission request requesting the use permission of the object data set directed to the process.

12. An image forming method executable in an image forming system for executing a process in response to a request from a requesting device, comprising the steps of:
receiving, from the requesting device, a ticket showing a use permission of an object data set, the ticket being obtained by the requesting device from a repository apparatus;
sending the received ticket to the repository apparatus and receiving, in response, a document identification corresponding to the object data set;
receiving, from the requesting device, a process instruction that requests execution of the process corresponding to the object data set; and
executing the process in accordance with a process instruction description including process items to execute in response to the process instruction, said process items indicated by the process instruction.

13. An information processing apparatus, comprising:
an obtaining part configured to obtain, from a repository apparatus, a ticket showing a use permission of an object data set;
a sending part configured to send the obtained ticket to an image processing apparatus for executing a process corresponding to the object data set;
an identification obtaining part configured to obtain an instruction description identification specifying a process instruction description from the image processing apparatus for executing the process, said instruction description identification including process items; and
a process instruction sending part configured to send a process instruction instructing an execution of the process to the image processing apparatus, the process instruction including the instruction description identification obtained from the identification obtaining part, the information processing apparatus further including an instruction description obtaining part configured to obtain the process instruction description from the image processing apparatus;
an instruction description creating part configured to create a second process instruction description in which the process items set in the process instruction description obtained by said instruction description obtaining part are changed; and
an instruction description sending part configured to send the second process instruction description created by the instruction description creating part to the image processing apparatus.

14. The information processing apparatus as claimed in claim 13, further comprising:
a process item obtaining part configured to obtain the process items set in the process instruction description from the image processing apparatus; and
a change request sending part configured to send a change request causing process items of the process instruction description to change.

15. A computer-readable recording medium recorded with a program for causing a computer functioned as an information processing apparatus to conduct a process instruction to an image processing apparatus for executing a process, said program comprising the codes for:
obtaining, from a repository apparatus, a ticket showing a use permission of an object data set;
sending the obtained ticket to the image processing apparatus for executing a process corresponding to the object data set;
obtaining an instruction description identification specifying a process instruction description from the image processing apparatus for executing the process, said instruction description identification including process items;
sending a process instruction instructing an execution of the process to the image processing apparatus, the process instruction including the instruction description identification obtained by the code for obtaining;
obtaining the process instruction description from the image processing apparatus;
creating a second process instruction description in which the process items set in the process instruction description are changed; and
sending the second process instruction description to the image processing apparatus.

* * * * *